US012738430B2

(12) United States Patent
Hoshi

(10) Patent No.: US 12,738,430 B2
(45) Date of Patent: Sep. 15, 2026

(54) MOVABLE UNIT, SWITCHOVER SWITCH, AND PRODUCTION METHOD FOR THE SWITCHOVER SWITCH

(71) Applicant: ALPS ALPINE CO., LTD., Tokyo (JP)

(72) Inventor: Naoki Hoshi, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 330 days.

(21) Appl. No.: 18/677,033

(22) Filed: May 29, 2024

(65) Prior Publication Data

US 2024/0312737 A1 Sep. 19, 2024

Related U.S. Application Data

(63) Continuation of application No. PCT/JP2022/045886, filed on Dec. 13, 2022.

(30) Foreign Application Priority Data

Dec. 15, 2021 (JP) ................................ 2021-203680

(51) Int. Cl.
*H01H 13/20* (2006.01)
*H01H 11/00* (2006.01)
(Continued)

(52) U.S. Cl.
CPC ............ *H01H 13/20* (2013.01); *H01H 11/00* (2013.01); *H01H 13/04* (2013.01); *H01H 13/10* (2013.01); *H01H 13/14* (2013.01)

(58) Field of Classification Search
CPC ........... H01H 2013/00; H01H 2013/02; H01H 2013/50; H01H 2013/52; H01H 2205/00;
(Continued)

(56) References Cited

U.S. PATENT DOCUMENTS 6,717,084 B1 * 4/2004 Lu .......................... H01H 13/28 200/462
11,289,285 B2 * 3/2022 Uozumi ................. H01H 11/06
2021/0082641 A1 3/2021 Uozumi et al.

FOREIGN PATENT DOCUMENTS

EP 2996127 3/2016
JP 2008-066082 3/2008
(Continued)

OTHER PUBLICATIONS

International Search Report for PCT/JP2022/045886 mailed on Feb. 21, 2023.

*Primary Examiner* — Anthony R Jimenez
(74) *Attorney, Agent, or Firm* — IPUSA, PLLC

(57) ABSTRACT

A movable unit is to be provided in an interior of a switchover switch that includes a casing and a slider. The movable unit includes: a cam configured to be rotationally moved downward by a tip end portion of the cam being depressed in response to the slider being depressed; a retaining member configured to retain a movable contact member and support a rotational movement pivotal portion of a base end portion of the cam so as to be movable rotationally and slidable in an upward-downward direction; and a biasing member interposed between the cam and the retaining member and configured to bias the cam upward.

13 Claims, 47 Drawing Sheets

(51) Int. Cl.
*H01H 13/04* (2006.01)
*H01H 13/10* (2006.01)
*H01H 13/14* (2006.01)

(58) Field of Classification Search
CPC ......... H01H 2205/002; H01H 2221/00; H01H 2221/014; H01H 2300/046; H01H 2300/048; H01H 13/00; H01H 13/12; H01H 13/14; H01H 13/20; H01H 13/22; H01H 13/28; H01H 13/26; H01H 13/32; H01H 13/50; H01H 13/52; H01H 2003/00; H01H 2003/02; H01H 2003/12; H01H 2003/32; H01H 13/04; H01H 13/10; H01H 13/42; H01H 11/00; H01H 5/06; H01H 3/00; H01H 3/02; H01H 3/12; H01H 5/00; H01H 5/04; H01H 5/14; H01H 5/16
USPC .......................................................... 200/341
See application file for complete search history.

(56) References Cited

FOREIGN PATENT DOCUMENTS

| | | |
|---|---|---|
| JP | 2013-239372 | 11/2013 |
| JP | 2016-058271 | 4/2016 |
| WO | 2019/230079 | 12/2019 |

* cited by examiner

MOVABLE UNIT, SWITCHOVER SWITCH, AND PRODUCTION METHOD FOR THE SWITCHOVER SWITCH

CROSS-REFERENCE TO RELATED APPLICATIONS

This application is a continuation application of International Application No. PCT/JP2022/045886, filed on Dec. 13, 2022, and designated the U.S., which is based upon and claims priority to Japanese Patent Application No. 2021-203680, filed on Dec. 15, 2021, the entire contents of which are incorporated herein by reference.

BACKGROUND

1. Field of the Invention

The present invention relates to a movable unit, a switchover switch, and a production method for the switchover switch.

2. Description of the Related Art

A switchover switch configured to perform switching between a first conduction state and a second conduction state via a snap action by a slider being moved in an upward-downward direction through depression, is known. See, for example, Japanese Laid-Open Patent Application No. 2016-058271.

SUMMARY

A movable unit according to an embodiment is a movable unit to be provided in an interior of a switchover switch that includes a casing and a slider. The movable unit includes: a cam configured to be rotationally moved downward by a tip end portion of the cam being depressed in response to the slider being depressed; a retaining member configured to retain a movable contact member and support a rotational movement pivotal portion of a base end portion of the cam so as to be movable rotationally and slidable in an upward-downward direction; and a biasing member interposed between the cam and the retaining member and configured to bias the cam upward. The retaining member performs a snap-action movement by the action of a biasing force applied from the biasing member upon the cam being rotationally moved downward, thereby performing switching of a contact target of the movable contact member from a first stationary contact to a second stationary contact. By the base end portion being depressed in a state in which the cam is opened upward, the cam is locked in a state in which the cam is rotationally moved downward and the rotational movement pivotal portion slides downward.

DETAILED DESCRIPTION OF THE DISCLOSURE

Figure 1:
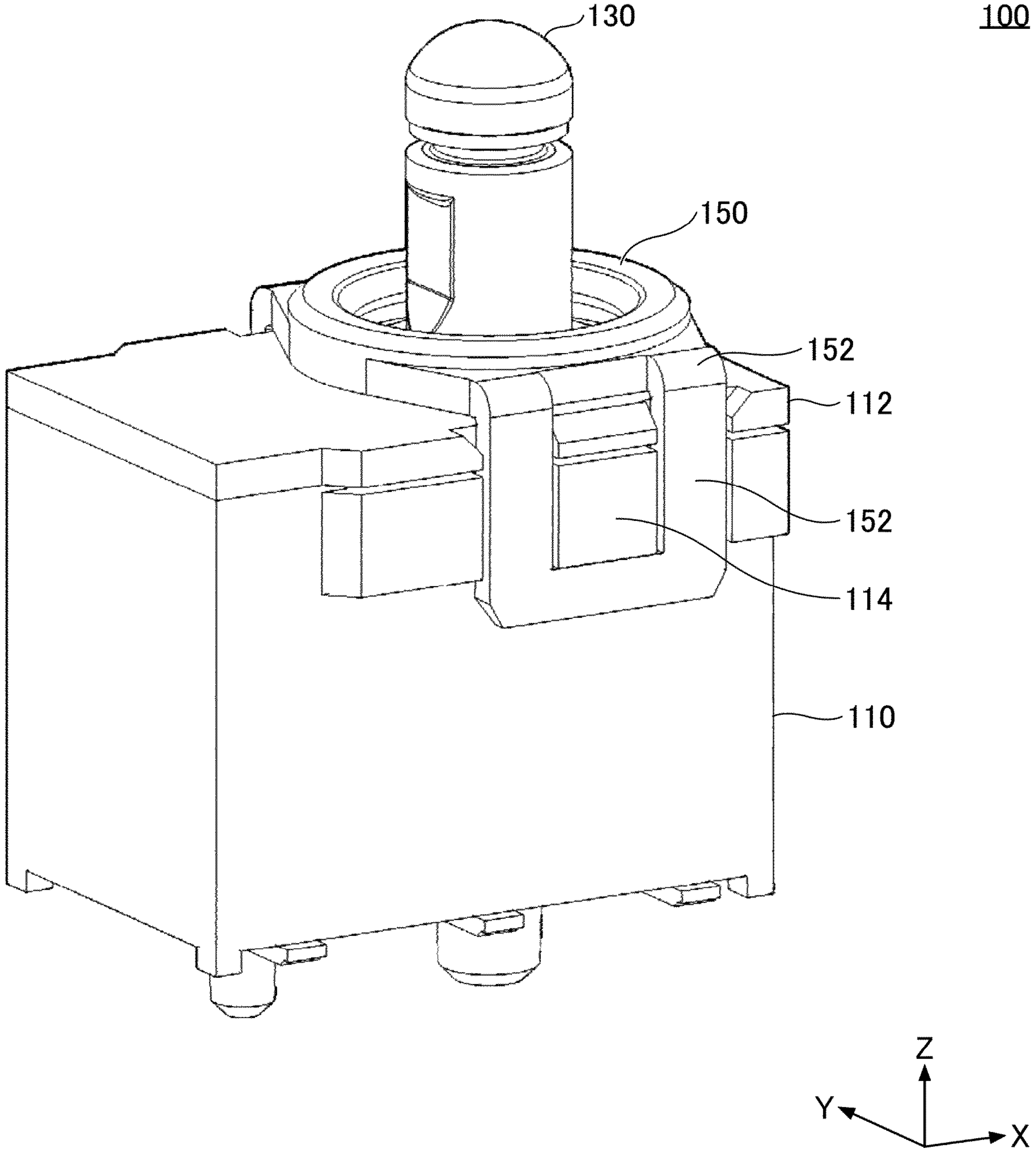
FIG. 1 is a perspective view of an outer appearance of a switchover switch according to an embodiment.

Existing snap-action type switchover switches employ a configuration in which a slider is biased in the return direction by use of a coil spring disposed so as to elastically deform in the horizontal direction. Therefore, the horizontal size of the switchover switches cannot be reduced, and further downsizing of the switchover switches cannot be achieved. In an attempt to achieve further downsizing of the switchover switches, it is an important requirement to enhance simplicity in assembling.

Hereinafter, an embodiment will be described with reference to the drawings. In the following description, for the sake of convenience, a Z-axis direction (a sliding direction of a slider 130) in the drawings is defined as an upward-downward direction, and a Y-axis direction (a transverse direction of a casing 110) in the drawings is defined as a leftward-rightward direction.

(Outline of Switchover Switch 100)

Figure 2:
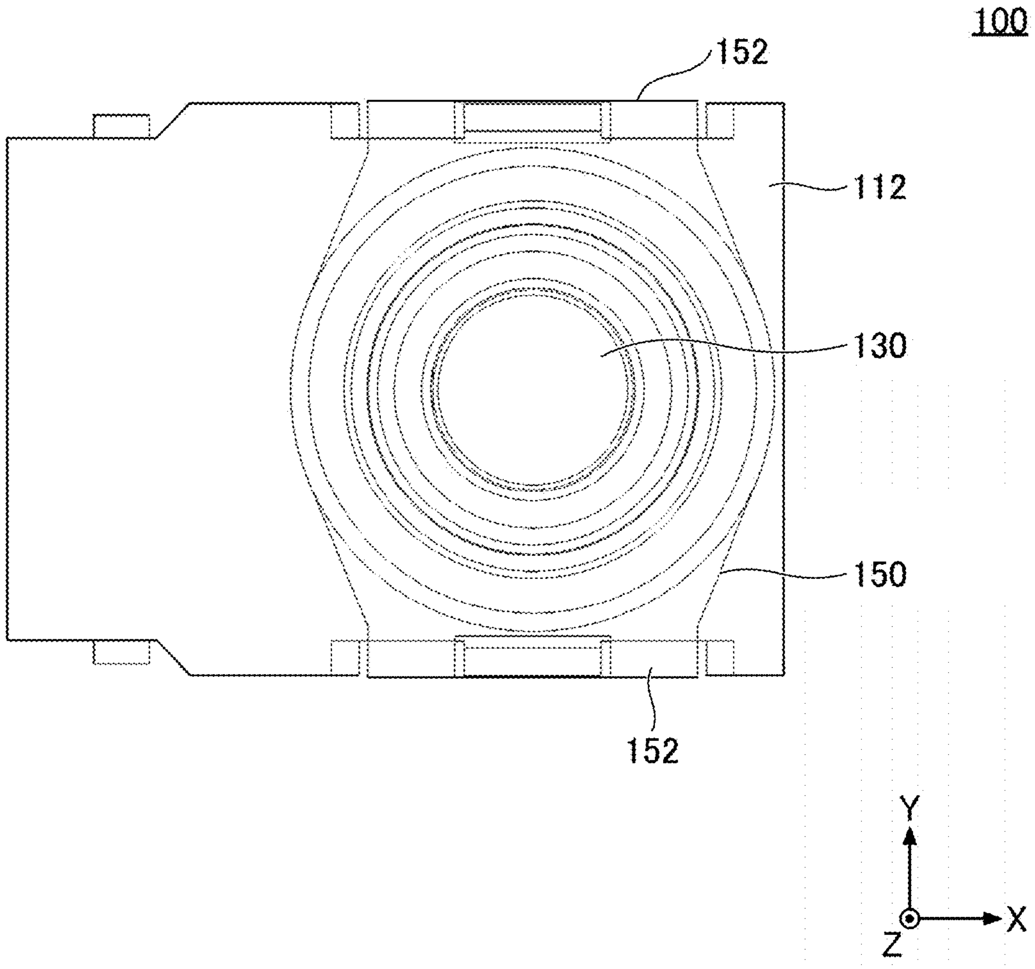
FIG. 2 is a plan view of the switchover switch according to the embodiment.
Figure 3:
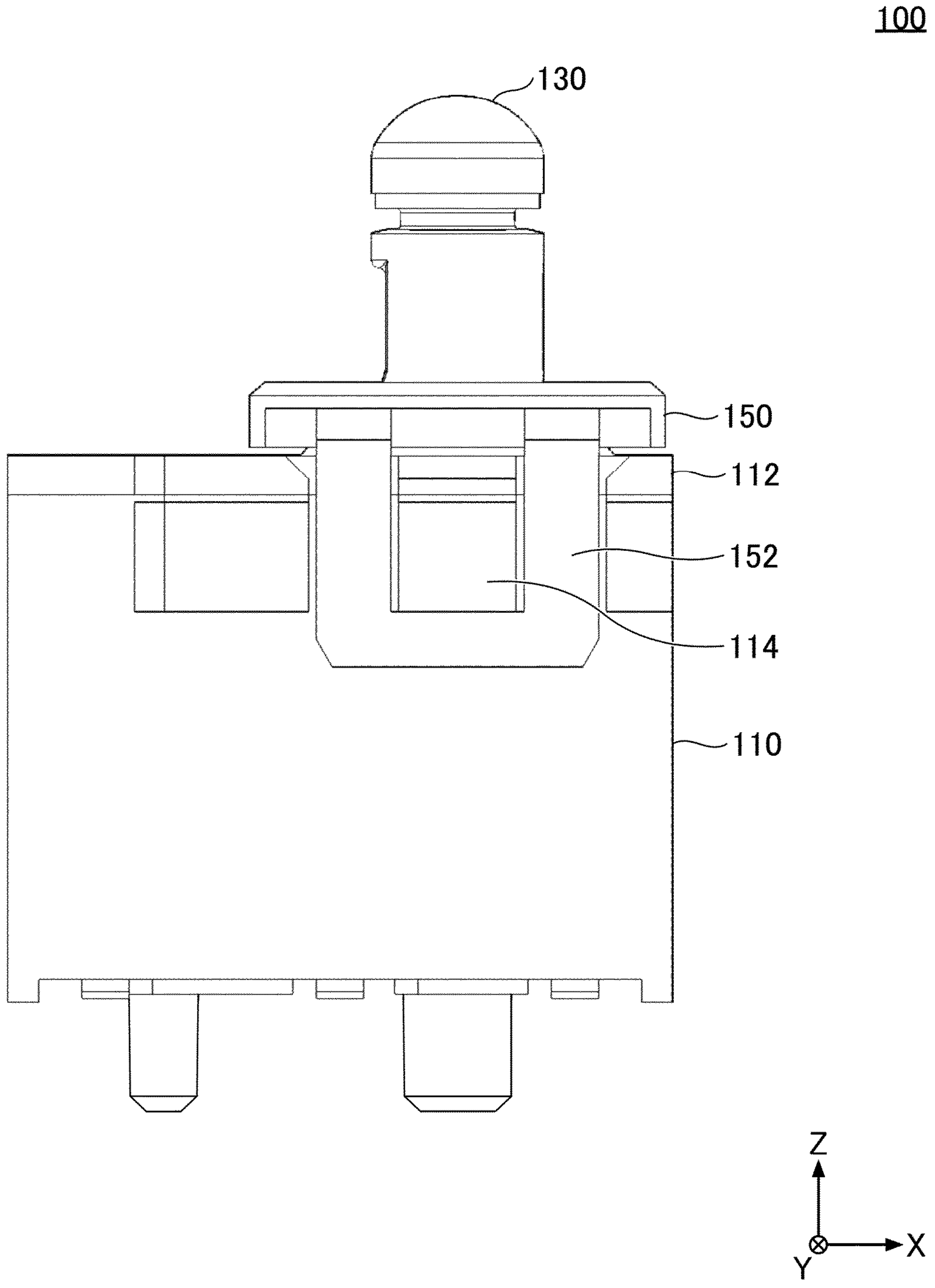
FIG. 3 is a side view of the switchover switch according to the embodiment.

FIG. 1 is a perspective view of an outer appearance of a switchover switch 100 according to the embodiment. FIG. 2 is a plan view of the switchover switch 100 according to the embodiment. FIG. 3 is a side view of the switchover switch 100 according to the embodiment.

As illustrated in FIG. 1, the switchover switch 100 includes a casing 110, a slider 130, and a holder 150.

The casing 110 has a hollow structure with an upper opening and a rectangular parallelepiped shape. The upper opening of the casing 110 is closed by a flat-plate cover 112. The cover 112 has a circular opening 112A (see FIG. 4) through which the slider 130 passes. The lower surface of the cover 112 is provided with a columnar support 112B that is hanging downward. The lower end of the support 112B is provided with a first pivotal portion 112C (see FIG. 30) that has a curved tip end portion and is projecting downward. The first pivotal portion 112C contacts an upper bearing surface 161A (see FIGS. 10 and 11) of a first actuator 161 included in a movable unit 160, thereby pivotally supporting the first actuator 161 from above the first actuator 161.

The slider 130 is an approximately cylindrical member that is to be depressed. The slider 130 is provided so as to pass through the opening 112A of the cover 112, and a part thereof is provided projecting upward of the upper surface of the cover 112. The slider 130 is provided so as to be slidable in the upward-downward direction (Z-axis direction) with respect to the casing 110.

The switchover switch 100 can switch the conduction state when the slider 130 is depressed. Specifically, the switchover switch 100 is in a first conduction state when the slider 130 is not depressed. When the slider 130 is depressed, the switchover switch 100 is switched to a second conduction state.

The holder 150 is an annular member that covers the upper surface of the cover 112 and encloses the slider 130. The holder 150 has a pair of hooks 152 hanging downward from the outer periphery thereof. The pair of hooks 152 are respectively engaged with a pair of claws 114 provided on a pair of parallel side surfaces of the casing 110. Thereby, the holder 150 is attached to the casing 110. Thus, the holder 150 fixes the cover 112 to the casing 110. The holder 150 is formed, for example, by machining a metal plate.

(Configuration of the Switchover Switch 100)

Figure 4:
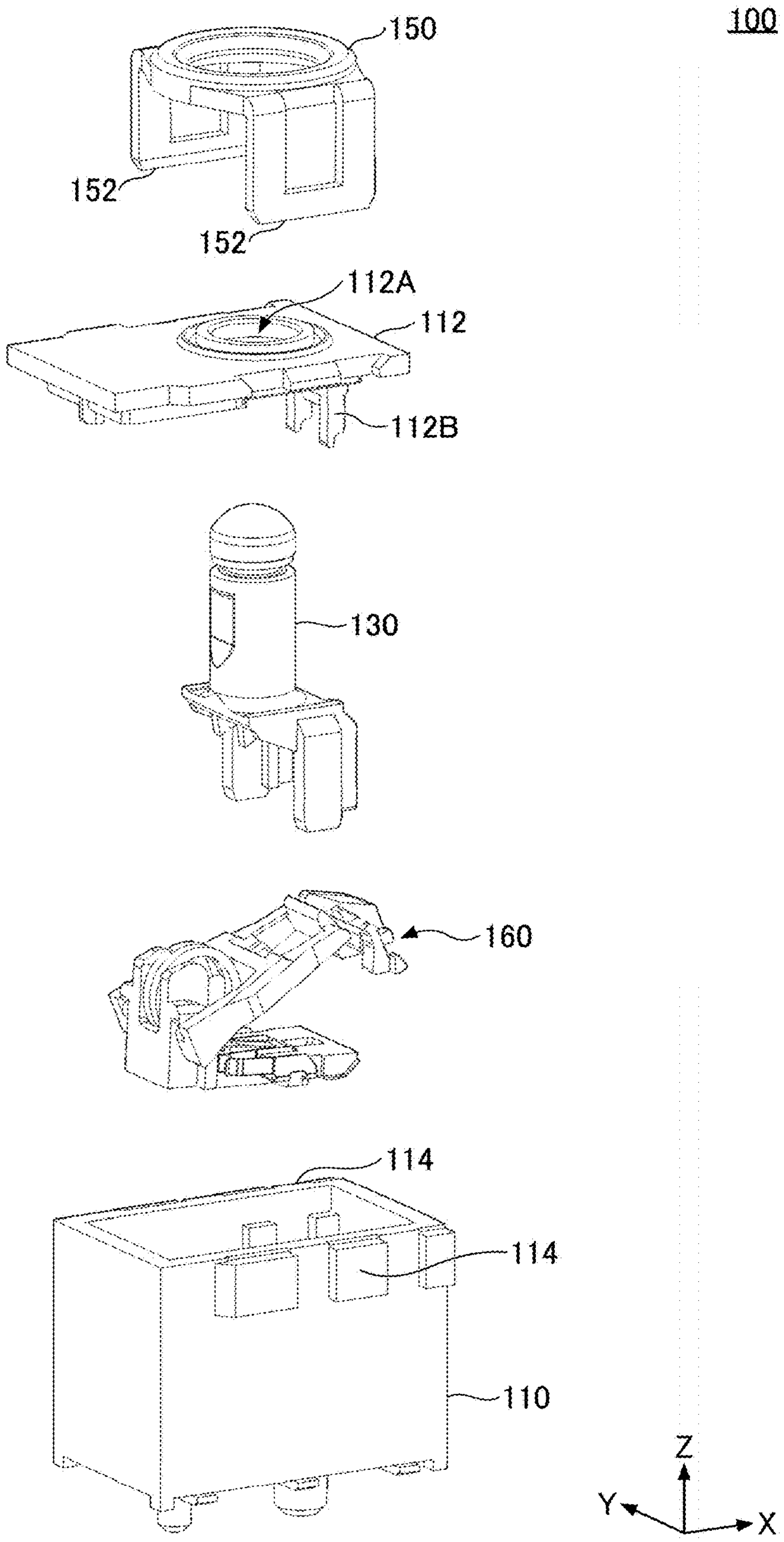
FIG. 4 is an exploded perspective view of the switchover switch according to the embodiment.
Figure 5:
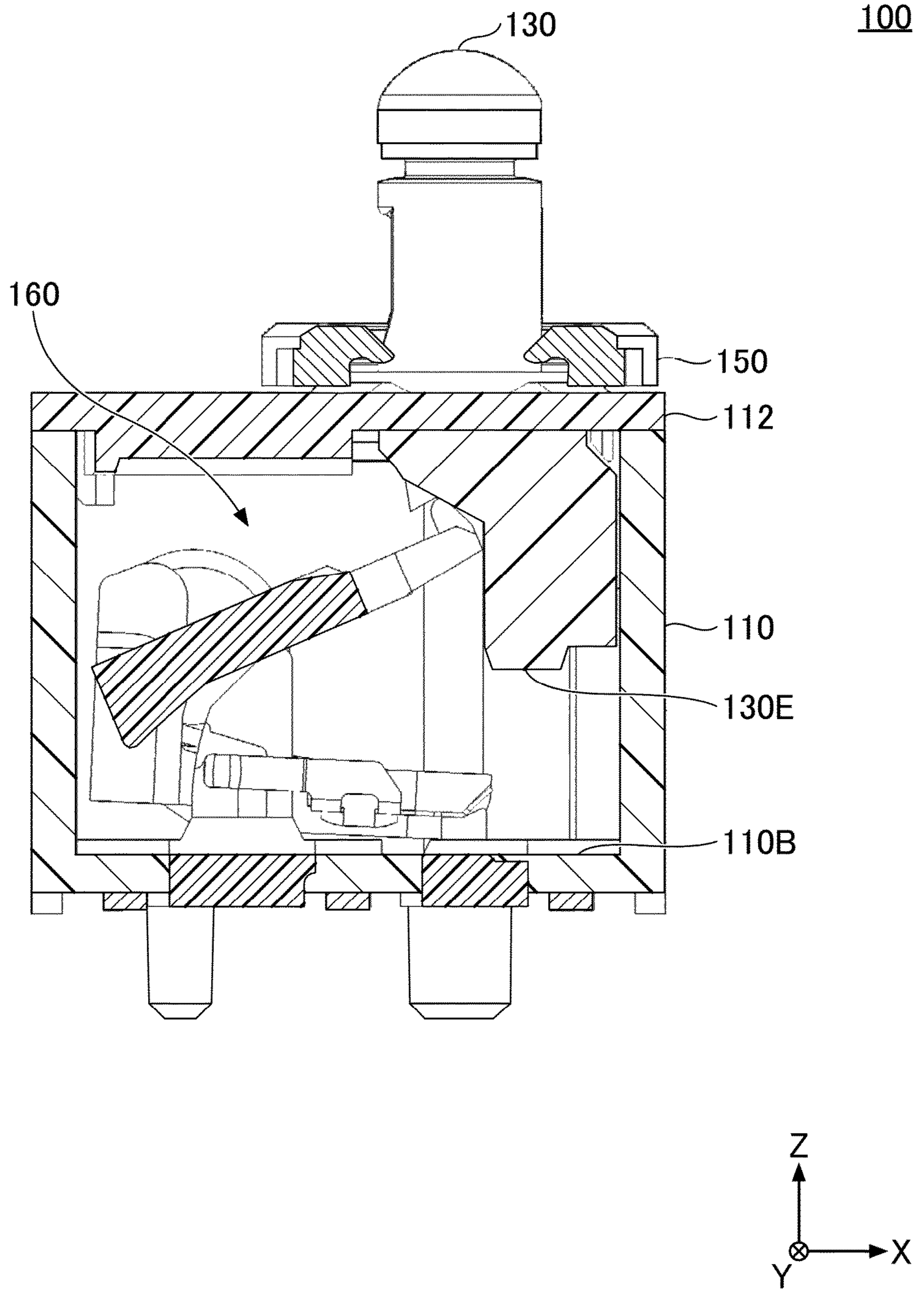
FIG. 5 is a cross-sectional view of the switchover switch according to the embodiment.
Figure 6:
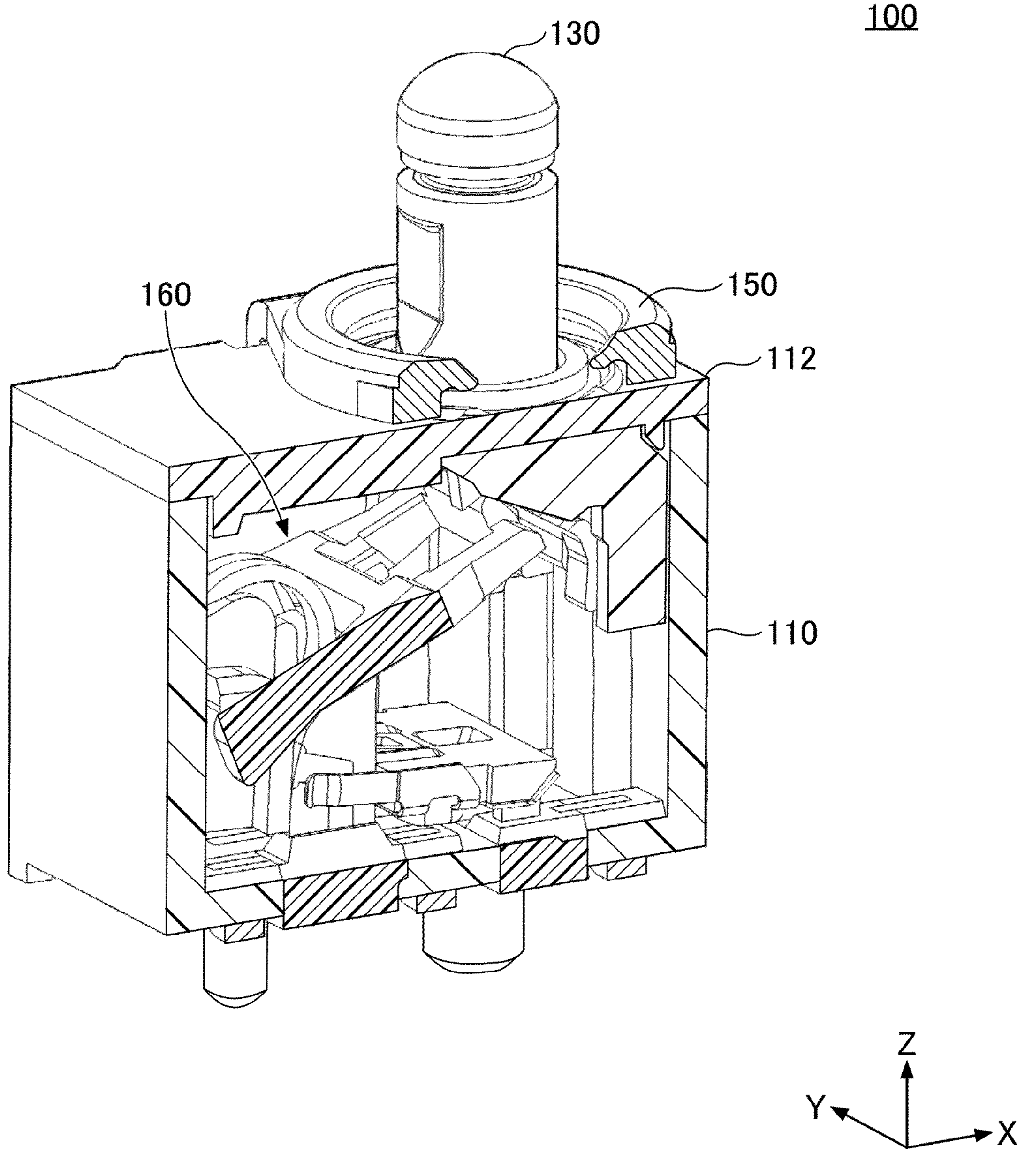
FIG. 6 is a cross-sectional perspective view of the switchover switch according to the embodiment.

FIG. 4 is an exploded perspective view of the switchover switch 100 according to the embodiment. FIG. 5 is a cross-sectional view of the switchover switch 100 according to the embodiment. FIG. 6 is a cross-sectional perspective view of the switchover switch 100 according to the embodiment.

As illustrated in FIGS. 4 to 6, the switchover switch 100 includes the holder 150, the cover 112, the slider 130, the movable unit 160, and the casing 110. That is, the switchover switch 100 further includes the movable unit 160 in addition to the configuration as described in FIGS. 1 to 3.

The movable unit 160 is provided in the interior of the casing 110. The movable unit 160 is formed of multiple movable parts that are combined with each other. By a vertical movement of the slider 130 in response to the slider 130 being depressed, the movable unit 160 moves and performs switching of the switchover switch 100 between the first conduction state and the second conduction state by a snap action. A specific configuration of the movable unit 160 will be described below with reference to FIGS. 10 and 11.

(Internal Configuration of the Casing 110)

Figure 7:
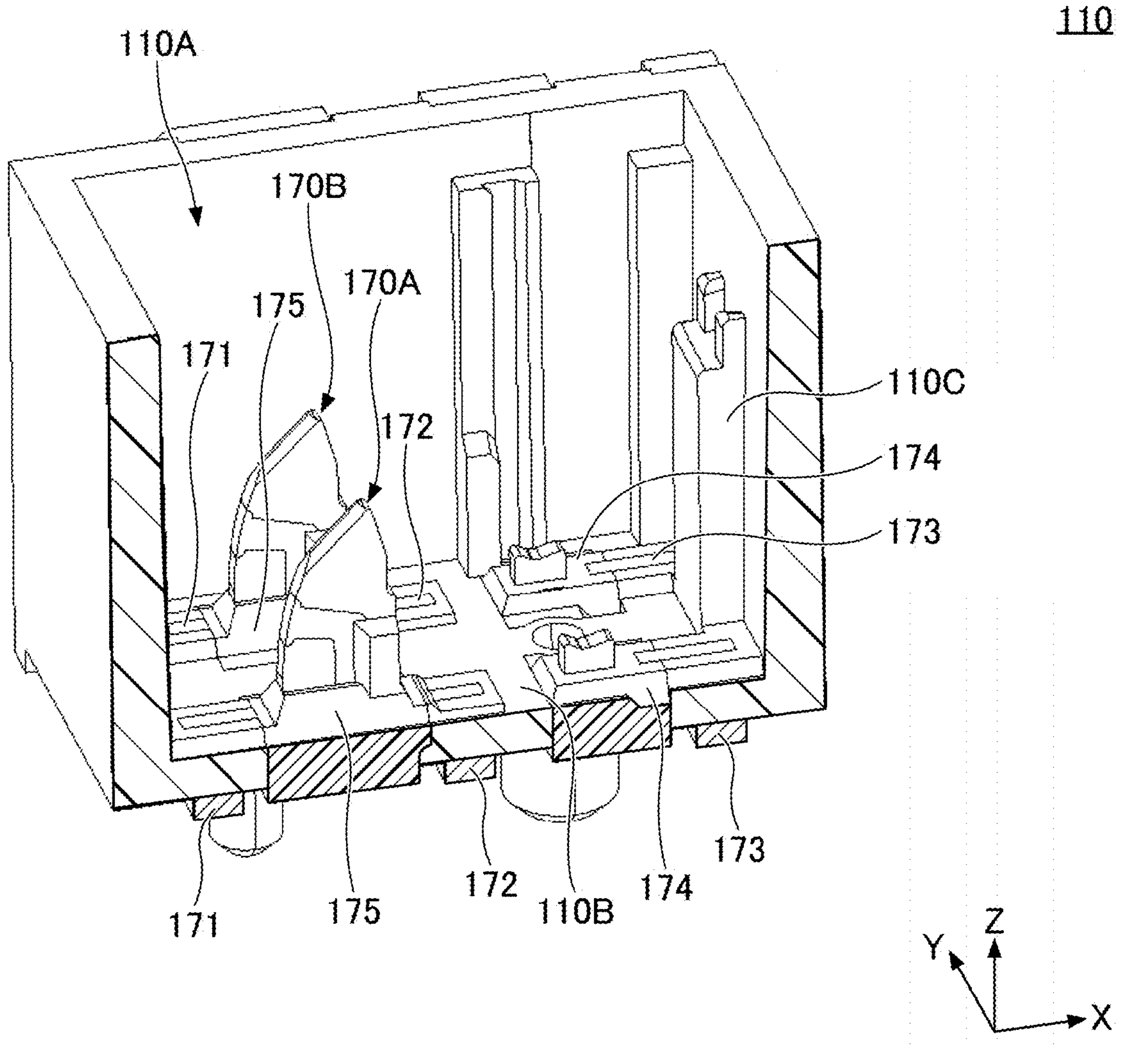
FIG. 7 is a cross-sectional view of a casing included in the switchover switch according to the embodiment.
Figure 8:
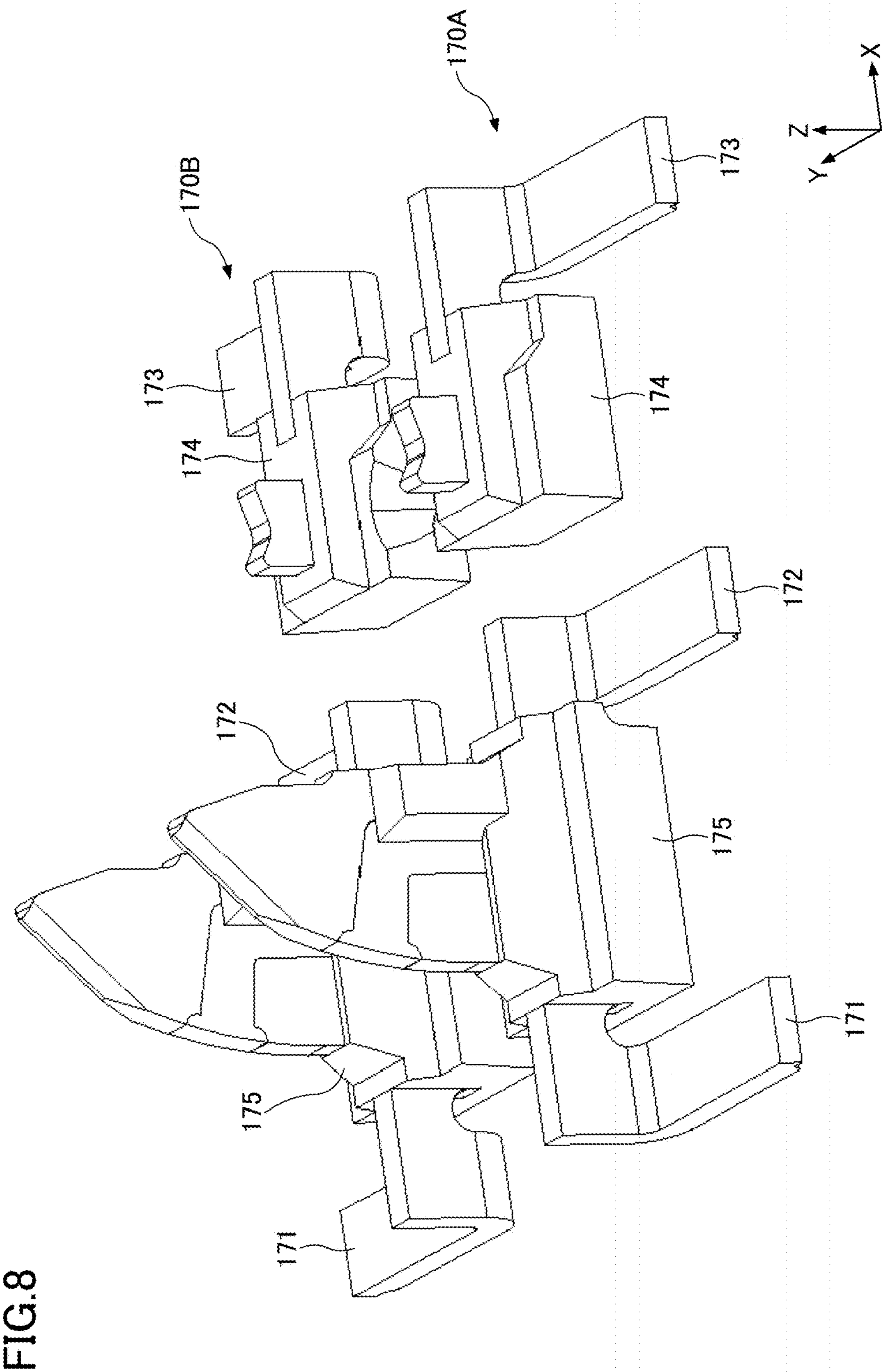
FIG. 8 is a perspective view of an outer appearance of a terminal portion included in the switchover switch according to the embodiment.
Figure 9:
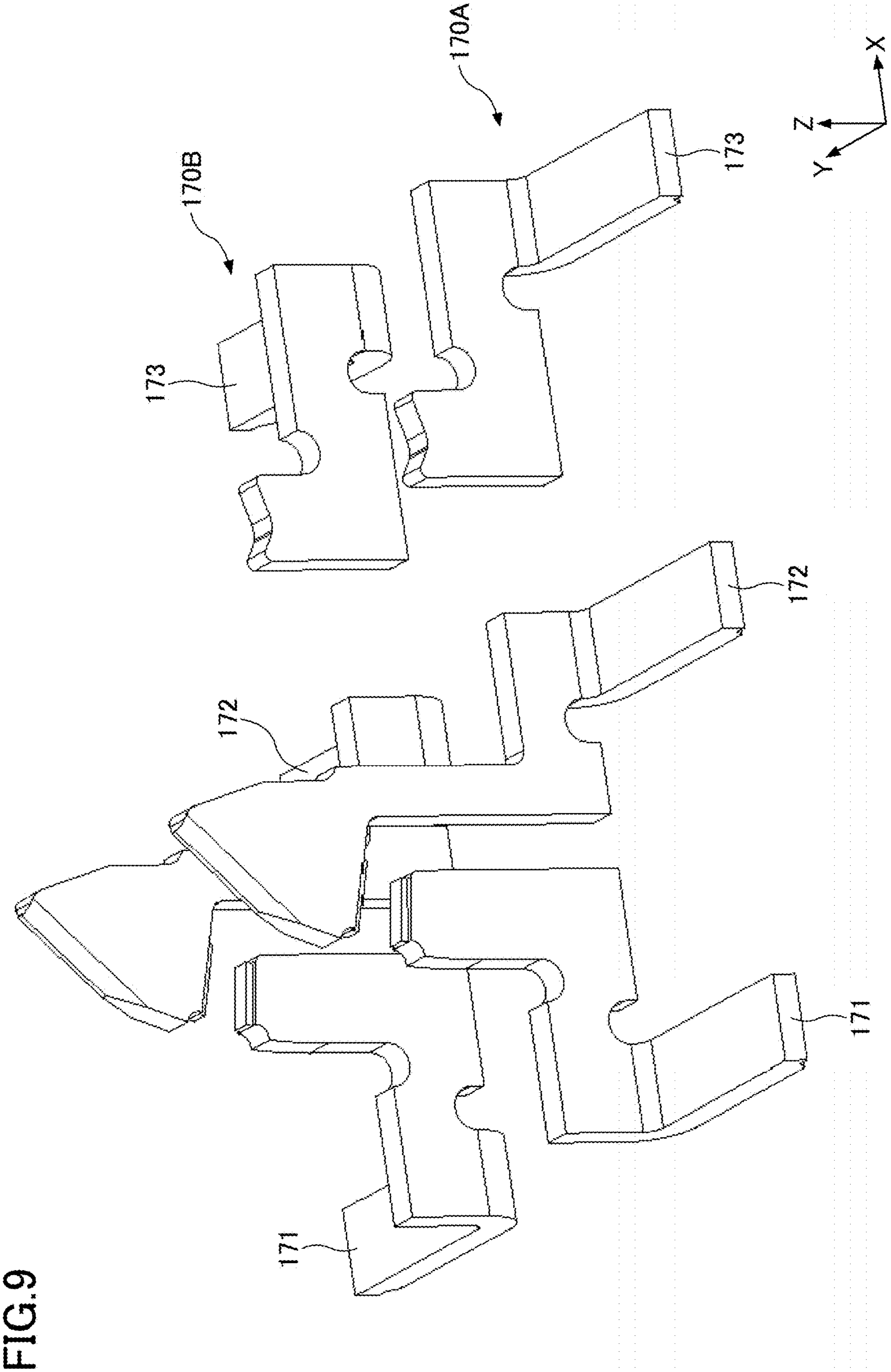
FIG. 9 is a perspective view of the outer appearance of the terminal portion included in the switchover switch according to the embodiment (in a state in which a terminal holder is omitted)

FIG. 7 is a cross-sectional view of the casing 110 included in the switchover switch 100 according to the embodiment. FIG. 8 is a perspective view of the outer appearance of a terminal portion 170 included in the switchover switch 100 according to the embodiment. FIG. 9 is a perspective view of the outer appearance of the terminal portion 170 included in the switchover switch 100 according to the embodiment (in a state in which terminal holders 174 and 175 are omitted).

As illustrated in FIG. 7, the casing 110 has a space 110A with an upper opening. The space 110A houses a part of the lower portion of the slider 130, and the movable unit 160. For example, the casing 110 is formed through injection molding of a relatively hard insulating material (e.g., a hard resin or the like).

As illustrated in FIG. 7, a positive X-axis side-inner wall surface of the casing 110 exposed to the space 110A is provided with a guide rib 110C having a constant width in the Y-axis direction and linearly extending in the upward-downward direction (Z-axis direction). The guide rib 110C is provided for guiding the downward slide of the first actuator 161. A second pivotal portion 110D (see FIG. 25) formed at the upper corner of the guide rib 110C contacts a lower bearing surface 161F of the first actuator 161, thereby pivotally supporting the first actuator 161 from below the first actuator 161.

As illustrated in FIG. 7, a bottom 110B exposed to the space 110A in the casing 110 is provided with two sets of terminal portions 170 (terminal portions 170A and 170B) arranged in the leftward-rightward direction (Y-axis direction). The terminal portion 170A is provided on a negative Y-axis side of the bottom 110B. The terminal portion 170B is provided on a positive Y-axis side of the bottom 110B. The terminal portions 170A and 170B are line symmetric with respect to a symmetric line that is a straight line extending in an X-axis direction along the middle position therebetween.

As illustrated in FIGS. 7 to 9, the terminal portions 170A and 170B each include a first stationary contact 171, a second stationary contact 172, a third stationary contact 173, a terminal holder 174, and a terminal holder 175.

Each of the stationary contacts 171 to 173 is formed by machining (e.g., pressing) a metal plate. The stationary contacts 171 to 173 have an upright shape that is vertically provided on the bottom 110B at one end thereof. At the other end thereof, the stationary contacts 171 to 173 have a shape that penetrates the bottom 110B and juts out from the casing 110 along the bottom surface of the casing 110.

The stationary contacts 171 to 173 included in the terminal portion 170A have a shape that juts out on the negative Y-axis side of the casing 110. The stationary contacts 171 to 173 included in the terminal portion 170B have a shape that juts out on the positive Y-axis side of the casing 110.

The third stationary contact 173 is provided at the bottom 110B on the positive X-axis side of the center in the X-axis direction. The third stationary contact 173 is held by the terminal holder 174. The terminal holder 174 is formed integrally with the third stationary contact 173 using an insulating material.

The second stationary contact 172 is provided at the center in the X-axis direction at the bottom 110B. The first stationary contact 171 is provided on the negative X-axis side relative to the center in the X-axis direction at the bottom 110B. The second stationary contact 172 and the first stationary contact 171 are held by a terminal holder 175. The terminal holder 175 is formed integrally with the second stationary contact 172 and the first stationary contact 171 using an insulating material.

In the first conduction state (a state in which the slider 130 is not depressed), the switchover switch 100 has a state in which the first stationary contact 171 and the third stationary contact 173 make a conduction via a movable contact member 165 (see FIGS. 10 and 11) included in the movable unit 160.

In the second conduction state (a state in which the slider 130 is depressed), the switchover switch 100 has a state in which the second stationary contact 172 and the third stationary contact 173 make a conduction via the movable contact member 165 included in the movable unit 160.

(Configuration of the Movable Unit 160)

Figure 10:
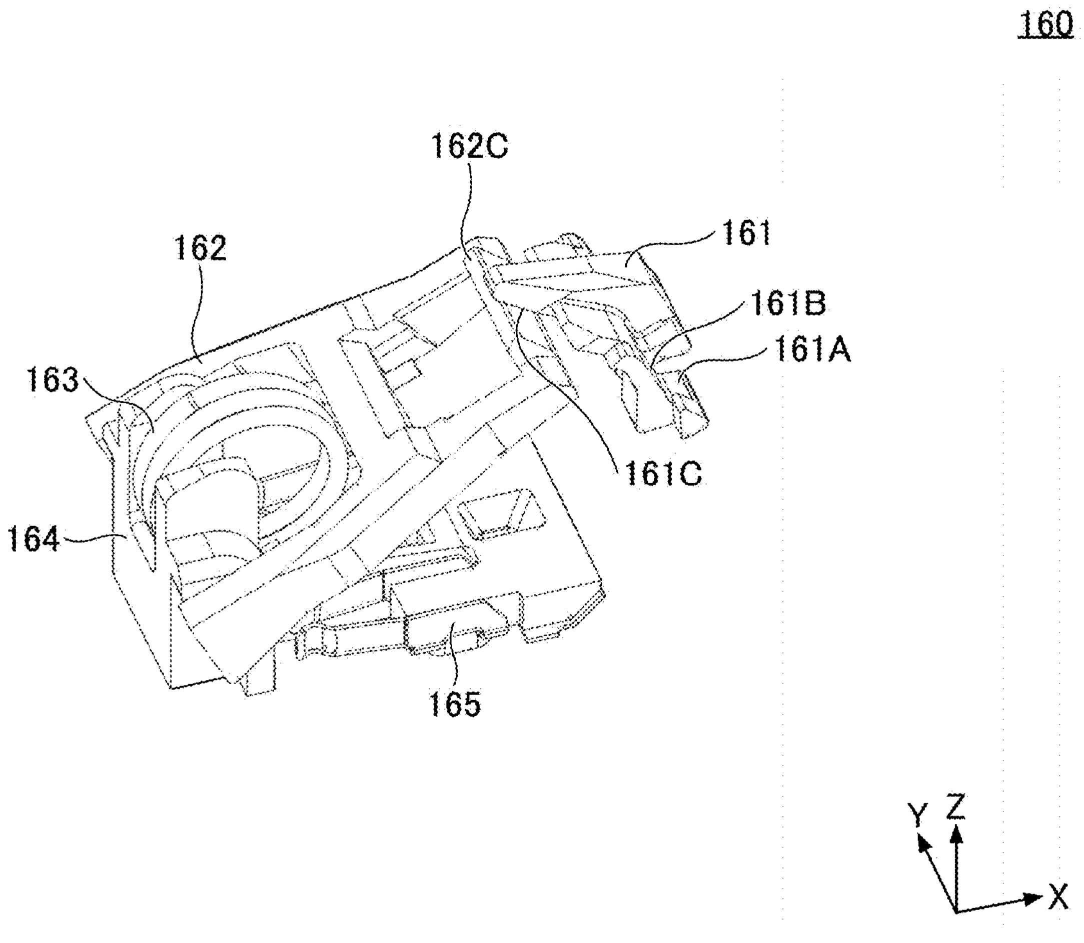
FIG. 10 is a perspective view of an outer appearance of a movable unit included in the switchover switch according to the embodiment.
Figure 11:
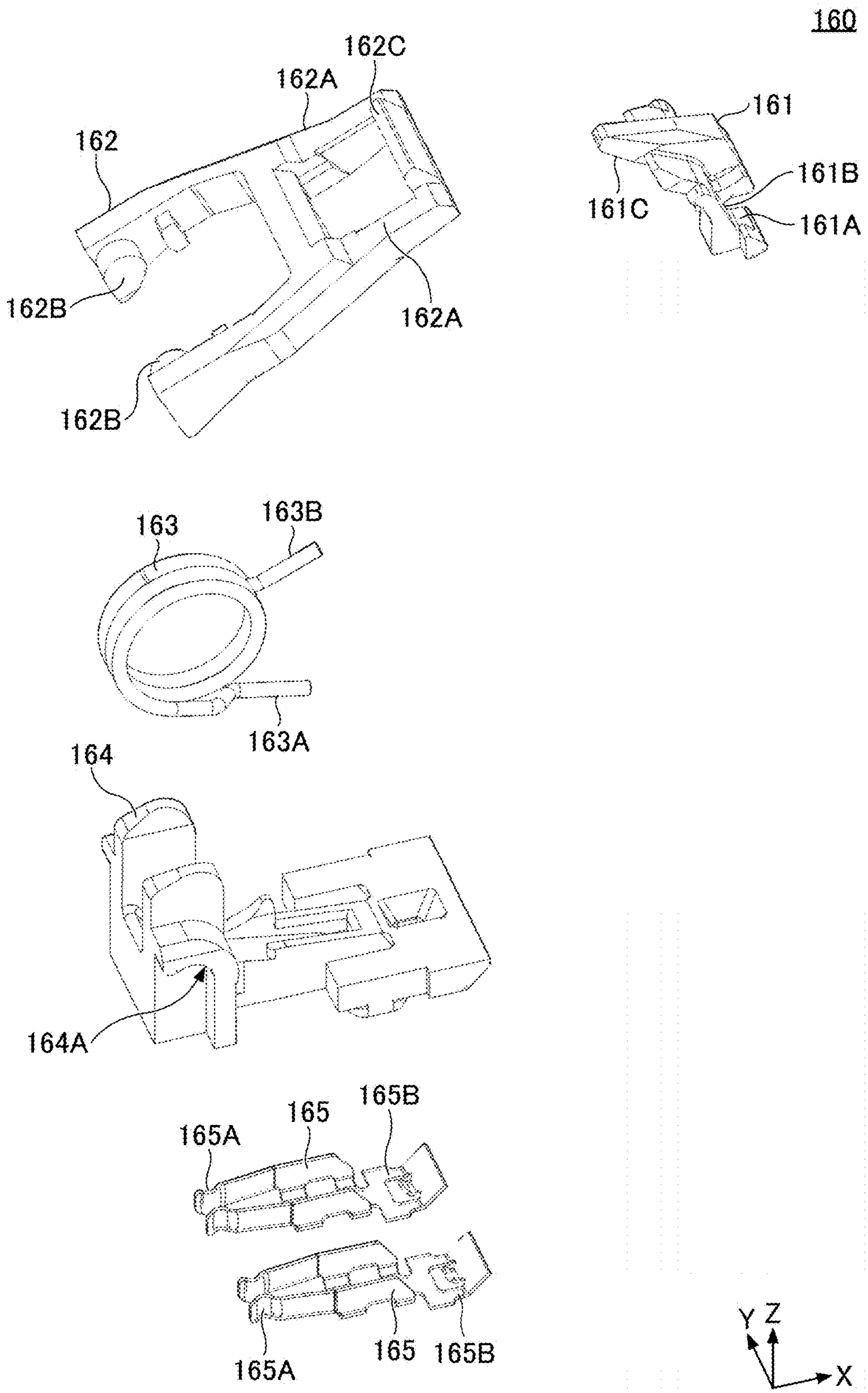
FIG. 11 is an exploded perspective view of the movable unit included in the switchover switch according to the embodiment.

FIG. 10 is a perspective view of the outer appearance of the movable unit 160 included in the switchover switch 100 according to the embodiment. FIG. 11 is an exploded perspective view of the movable unit 160 included in the switchover switch 100 according to the embodiment.

As illustrated in FIGS. 10 and 11, the movable unit 160 includes the first actuator 161, a cam 162, a torsion spring 163, a second actuator 164, and the pair of movable contact members 165. Of these components, the cam 162, the torsion spring 163, the second actuator 164, and the pair of movable contact members 165 are combined together and integrated, as illustrated in FIG. 10.

The first actuator 161 is an arm-shaped member extending from the positive X-axis side of the casing 110 toward the negative X-axis side. The first actuator 161 is provided to be rotationally movable with respect to the inner wall surface of the casing 110 on the positive X-axis side, with the center of the rotational movement being the upper bearing surface 161A, provided at a rear end portion of the first actuator 161, and the lower bearing surface 161F (see FIG. 24). A configuration in which the first actuator 161 is rotationally movable will be described below with reference to FIG. 23 and the subsequent drawings. The first actuator 161 is rotationally moved downward by the slider 130 being depressed at upper contact surfaces 161B provided at respective steps on both sides in the leftward-rightward direction (Y-axis direction). At this time, the first actuator 161 presses the cam 162 downward at a lower tilt surface 161C provided on the lower side of the center on the tip end portion side (negative X-axis side). Once the first actuator 161 is rotationally moved downward by a predetermined angle, the first actuator 161 is restricted from doing any further downward rotational movement by the slider 130. When the first actuator 161 is further depressed downward by the slider 130 in the state in which the downward rotational movement is restricted (i.e., upon over-stroke of the slider 130), the first actuator 161 slides downward together with the slider 130 along the guide rib 110C (see FIG. 7) formed on the inner wall surface of the casing 110 on the positive X-axis side, while maintaining the state in which the first actuator 161 is rotationally moved by the predetermined angle.

The cam 162 is a rotationally movable arm-shaped member extending obliquely upward from the negative X-axis side toward the positive X-axis side in the space 110A of the casing 110. The cam 162 includes a pair of left and right arms 162A each extending obliquely upward from the negative X-axis side toward the positive X-axis side. The rear end portion (end portion on the negative X-axis side) of each of the pair of arms 162A is provided with a rotational movement pivotal portion 162B projecting inward. According to the cam 162, the rotational movement pivotal portion 162B is pivotally supported by a pivotal support 164A. The pivotal support 164A is provided at the rear end portion (end portion on the negative X-axis side) of the second actuator 164. The cam 162 is biased upward by the torsion spring 163 that is the biasing member. The cam 162 includes a cam projection 162C at the tip end portion (end portion on the positive X-axis side). The cam projection 162C has a curved tip end portion and has a shape projecting upward. By the cam projection 162C being depressed while sliding over the lower tilt surface 161C of the first actuator 161, the cam 162 is rotationally moved downward with the rotational movement pivotal portion 162B being the center of the rotational movement, while elastically deforming the torsion spring 163. According to the cam 162, when the slider 130 is depressed to a predetermined position in height, the cam projection 162C slides up over the lower tilt surface 161C of the first actuator 161, and the rotational movement pivotal portion 162B raises the pivotal support 164A of the second actuator 164. Thereby, the cam 162 performs switching of a contact target of the movable contact member 165 held by the second actuator 164 from the first stationary contact 171 to the second stationary contact 172.

The torsion spring 163 is a metal member with elasticity. The torsion spring 163 biases the upper surface of the second actuator 164 downward by one arm 163A, and biases the cam 162 upward by the other arm 163B.

The second actuator 164 is an example of the "retaining member". The pivotal support 164A of the second actuator 164 pivotally supports the rotational movement pivotal portions 162B of the cam 162. Also, the second actuator 164 retains the pair of movable contact members 165. The second actuator 164 is pressed against the inner bottom surface of the casing 110 by the action of a biasing force applied from the torsion spring 163. When the slider 130 is depressed to a predetermined position in height, the rotational movement pivotal portions 162B of the cam 162 instantaneously raise the pivotal supports 164A of the second actuator 164. Thereby, the second actuator 164 instantaneously performs switching of contact positions of first contact portions 165A, provided at respective rear end portions of the pair of movable contact members 165, from the first stationary contact 171 to the second stationary contact 172, and performs a snap-action movement.

The movable contact member 165 is a conductive member extending in the X-axis direction. A second contact portion 165B, provided at the other end of the movable contact member 165 (the end on the positive X-axis side), contacts the third stationary contact 173. The first contact portion 165A, provided at one end of the movable contact member 165 (the end on the negative X-axis side), contacts the first stationary contact 171 in the first conduction state or contacts the second stationary contact 172 in the second conduction state. For example, the movable contact member 165 is formed by machining a thin metal plate. The first contact portion 165A has a shape that holds the first stationary contact 171 and the second stationary contact 172 from both left and right sides. The first contact portion 165A also has a shape that is elastically deformable in the leftward-rightward direction. Thereby, the first contact portion 165A can reliably hold the first stationary contact 171 and the second stationary contact 172 from both left and right sides. Thus, it is possible to suppress degradation in contact with the first stationary contact 171 and the second stationary contact 172.

(Movements of the Switchover Switch 100)

FIGS. 12 to 22 are views describing the movements of the switchover switch 100 according to the embodiment.

<First State>

Figure 12:
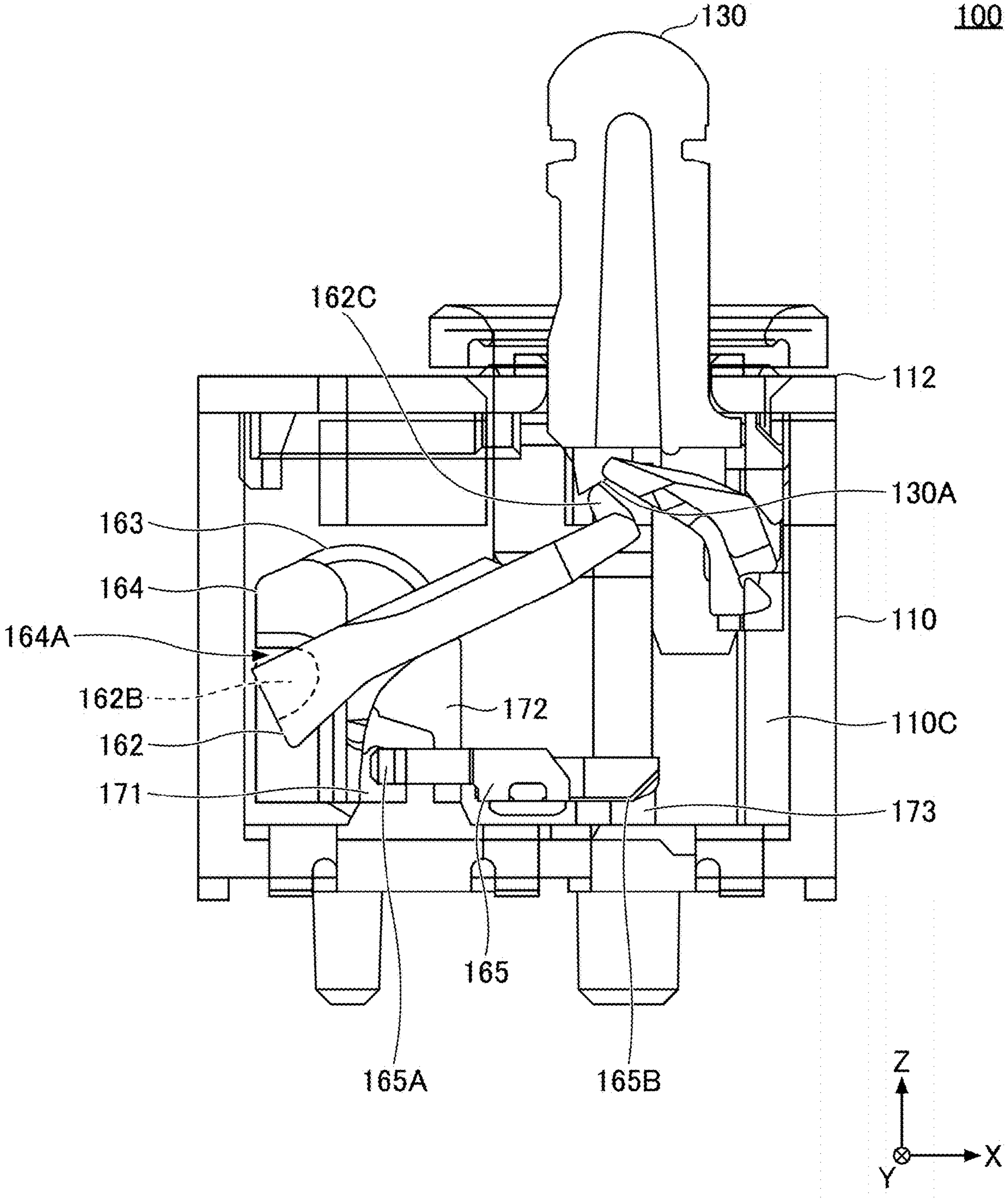
FIG. 12 is a view describing movements of the switchover switch according to the embodiment.

FIG. 12 illustrates a state in which the slider 130 is not depressed (first state). In this first state, a pressing surface 130A provided at the lower end of the slider 130 is in contact with the cam projection 162C provided at the tip end portion of the cam 162. Also, in this first state, the movable contact member 165 retained by the second actuator 164 is in a horizontal state, and the first contact portion 165A is in contact with the first stationary contact 171 and the second contact portion 165B is in contact with the third stationary contact 173. That is, the switchover switch 100 is in the first conduction state.

<Second State>

Figure 13:
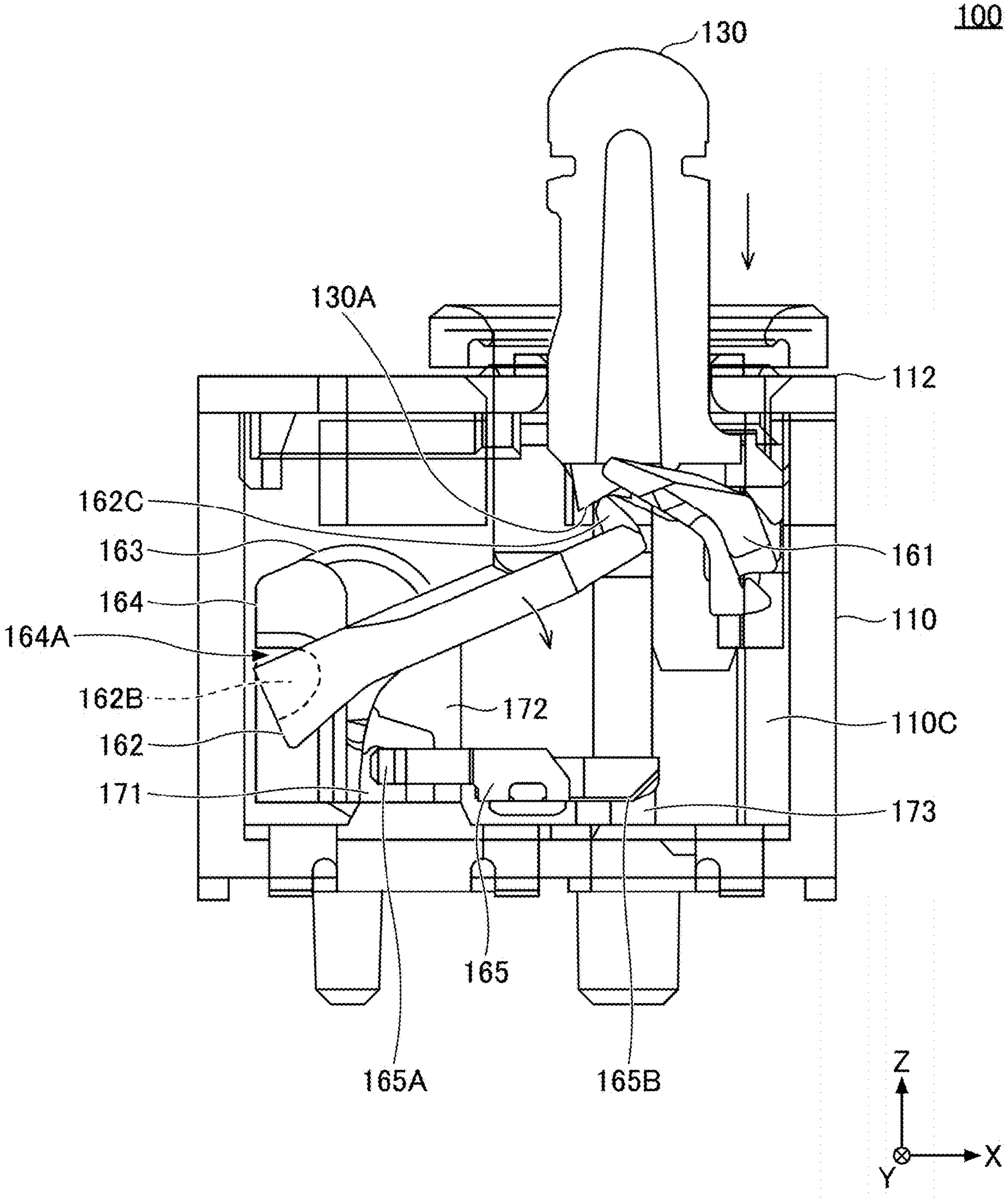
FIG. 13 is a view describing movements of the switchover switch according to the embodiment.

When depression of the slider 130 is started from the first state as illustrated in FIG. 12, the pressing surface 130A of the slider 130 presses downward the cam projection 162C of the cam 162, as illustrated in FIG. 13. Thereby, the cam 162 starts to rotationally move downward, with the center of the rotational movement being the rotational movement pivotal portion 162B pivotally supported by the pivotal support 164A of the second actuator 164.

Then, as illustrated in FIG. 13, when the slider 130 slightly slides downward from the start of the downward slide of the slider 130, respective pressing portions 130B (see FIG. 31) on both sides of the slider 130 in the leftward-rightward direction (Y-axis direction) contact respective upper contact surfaces 161B on both sides of the first actuator 161 in the leftward-rightward direction (Y-axis direction). Thereby, the slider 130 starts to depress the first actuator 161 in addition to depressing the cam 162. By being depressed by the pressing portions 130B of the slider 130, the first actuator 161 starts to rotationally move downward, with the first pivotal portion 112C (see FIG. 20B) being the center of the rotational movement.

<Third State>

Figure 14:
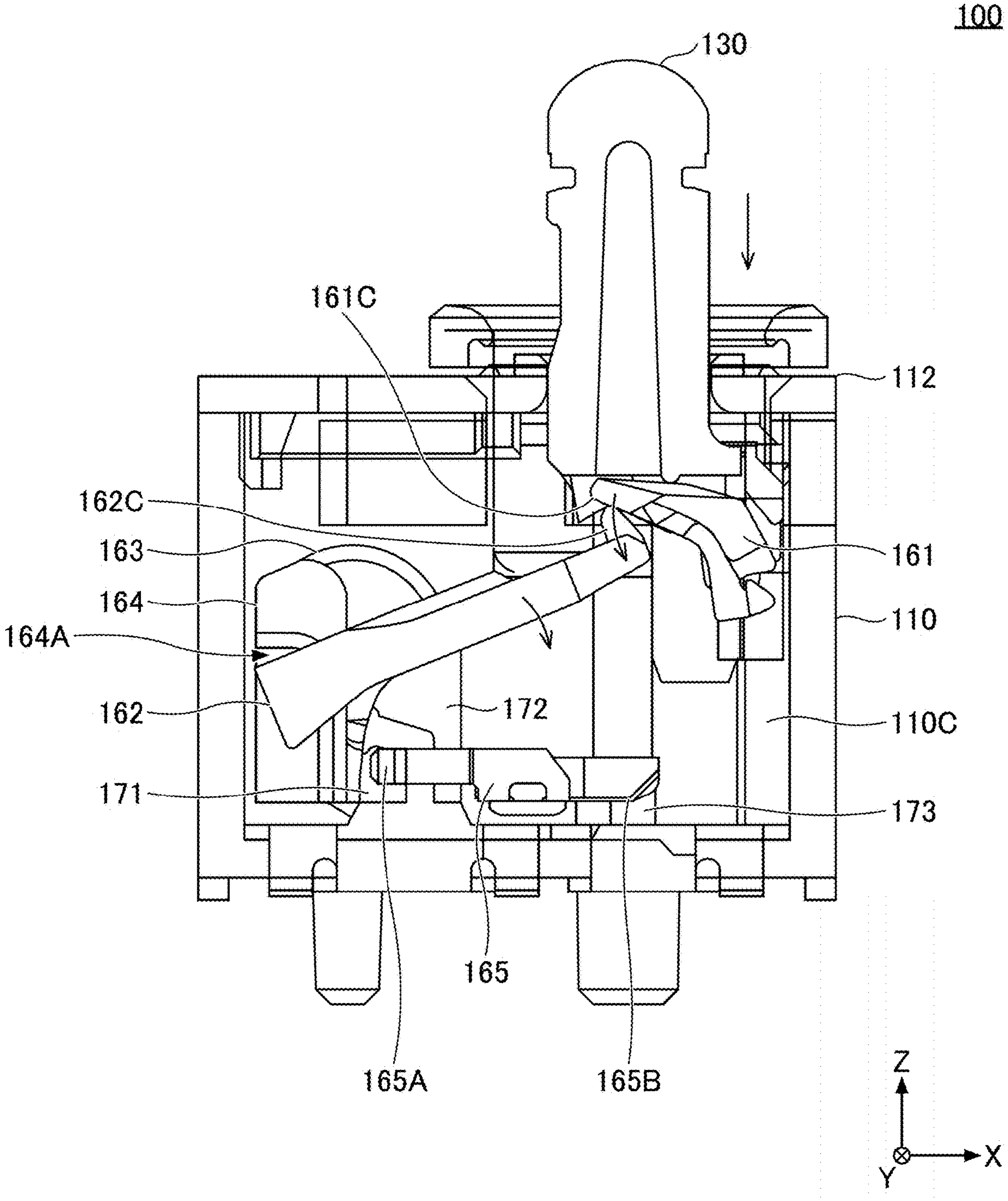
FIG. 14 is a view describing movements of the switchover switch according to the embodiment.

Further, when the slider 130 slightly slides downward from the second state as illustrated in FIG. 13, the lower tilt surface 161C of the first actuator 161 contacts the cam projection 162C of the cam 162, as illustrated in FIG. 14. Subsequently, the cam projection 162C of the cam 162 is away from the pressing surface 130A of the slider 130, and is depressed by the lower tilt surface 161C of the first actuator 161.

<Fourth State>

Figure 15:
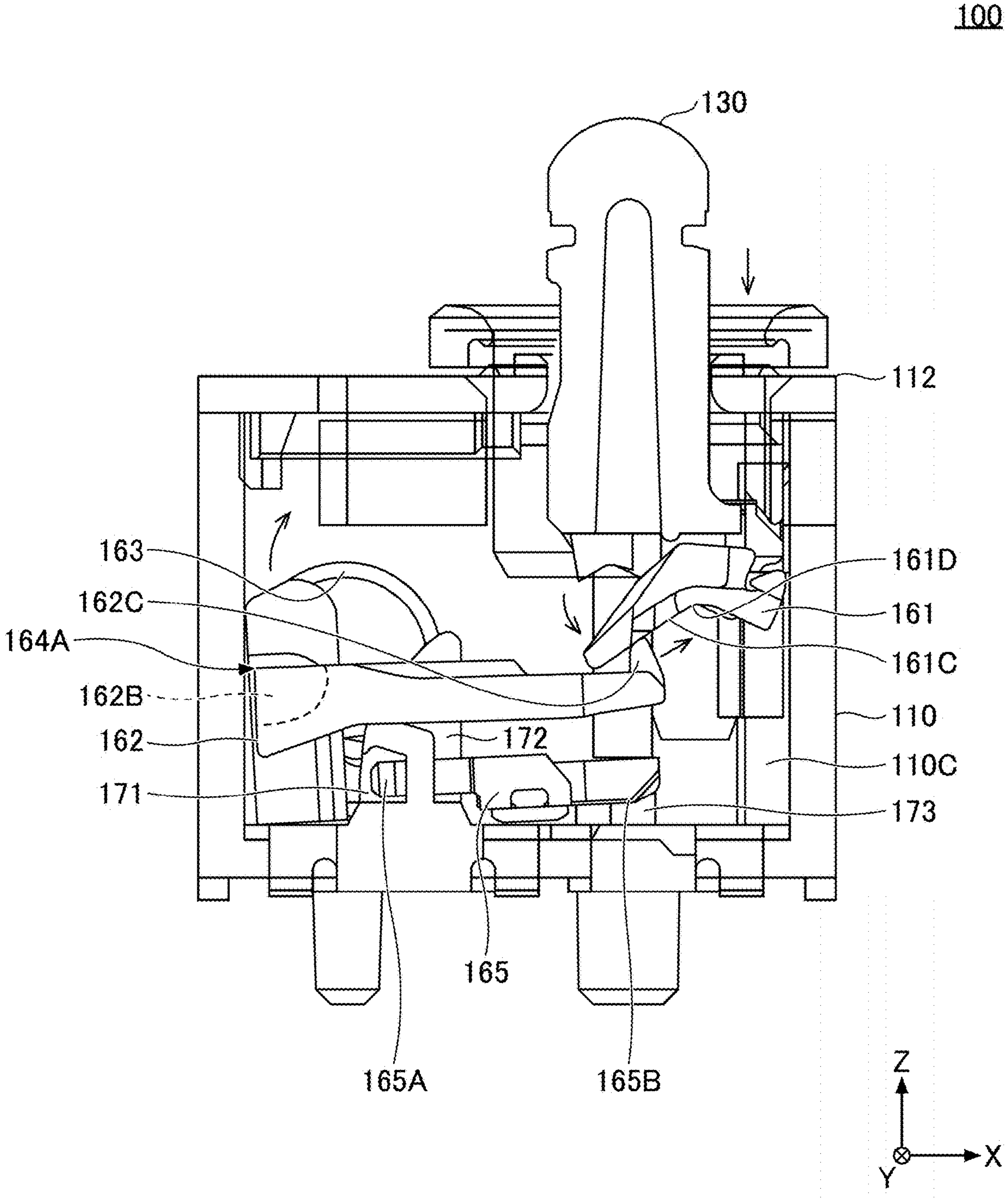
FIG. 15 is a view describing movements of the switchover switch according to the embodiment.

Then, as illustrated in FIG. 15, when the first actuator 161 is rotationally moved downward to a predetermined angle, the rotational movement of the first actuator 161 is restricted. At this time, the biasing force applied from the torsion spring 163 provides the cam projection 162C of the cam 162 with a force to slide up over the lower tilt surface 161C of the first actuator 161. Once this force exceeds friction resistance between the cam projection 162C and the lower tilt surface 161C, the cam projection 162C instantaneously slides up over the lower tilt surface 161C toward a top portion 161D of the lower tilt surface 161C. The cam projection 162C enters the top portion 161D and stops. At this time, the top portion 161D has a smoothly curved shape, and thus the sound produced by contact between the cam projection 162C and the top portion 161D is suppressed.

<Fifth State>

Figure 16:
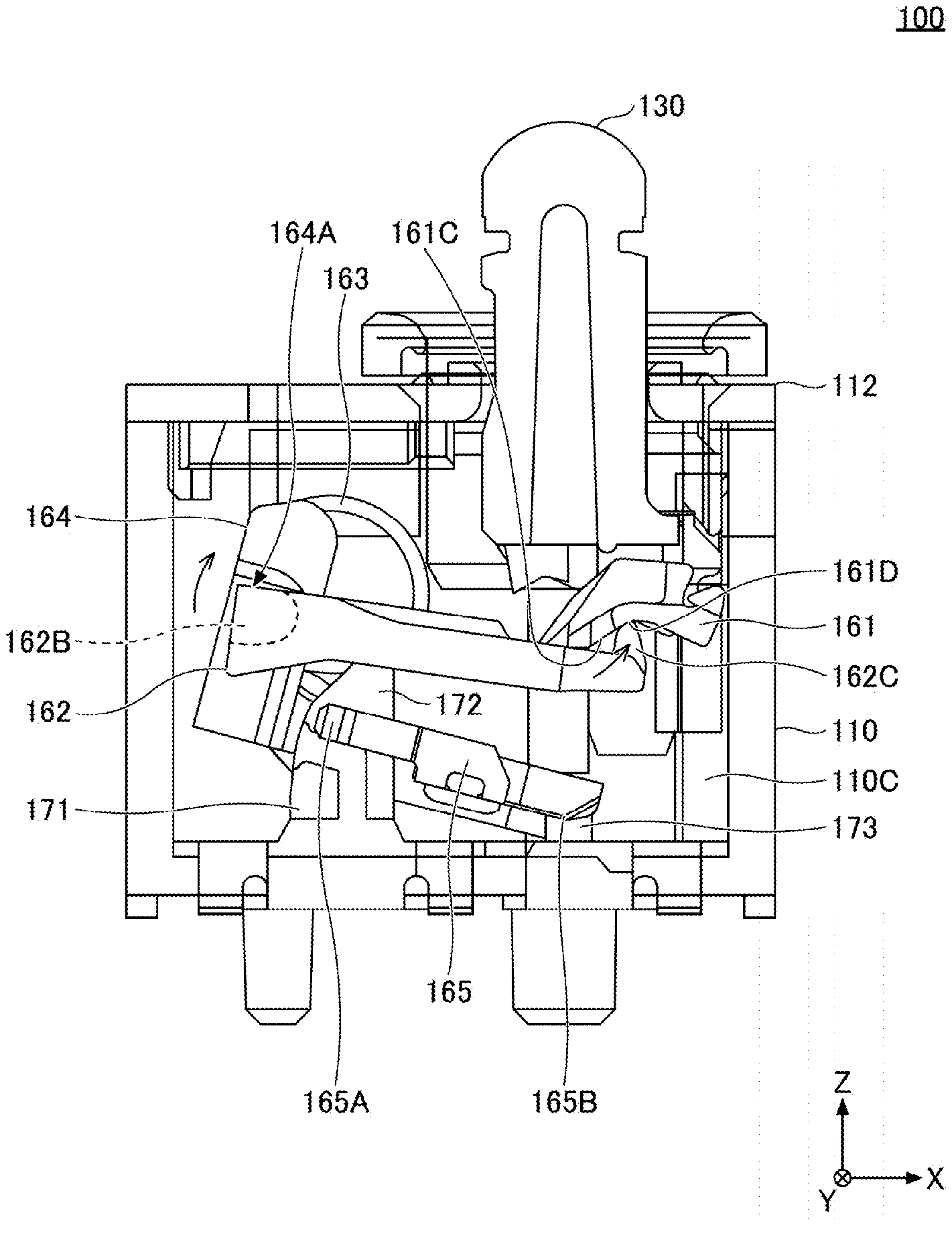
FIG. 16 is a view describing movements of the switchover switch according to the embodiment.

As a result, as illustrated in FIG. 16, the rotational movement pivotal portion 162B of the cam 162 instantaneously raises the pivotal support 164A of the second actuator 164. At this time, the second actuator 164 rotationally moves upward, with the fulcrum being a contact point between the third stationary contact 173 and the second contact portion 165B of the movable contact member 165 held by the second actuator 164 (i.e., a bent portion of the third stationary contact 173). Thereby, the contact position of the first contact portion 165A of the movable contact member 165 held by the second actuator 164 is instantaneously switched from the first stationary contact 171 to the second stationary contact 172. As a result, the second stationary contact 172 and the third stationary contact 173 conduct to each other via the movable contact member 165, i.e., the switchover switch 100 is switched to the second conduction state. Thereby, the switchover switch 100 can perform an instantaneous switchover by a snap action.

<Sixth State>

Figure 17:
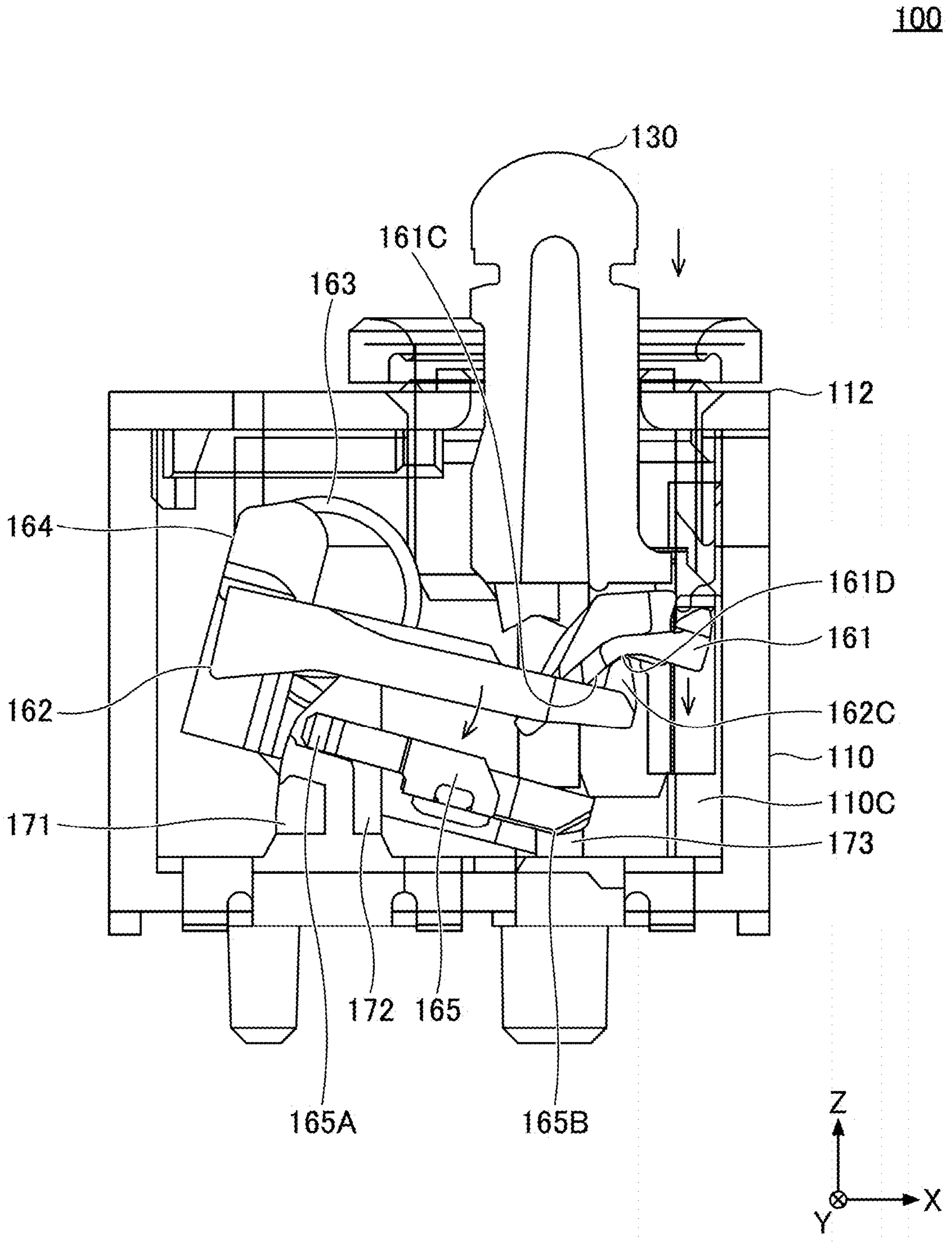
FIG. 17 is a view describing movements of the switchover switch according to the embodiment.

Further, as illustrated in FIG. 17, when the slider 130 is further depressed downward after switching, i.e., by over-stroke in which the slider 130 is further depressed after switching, the first actuator 161 slides downward together with the slider 130 with the angle of the rotational movement being fixed, while depressing the cam projection 162C of the cam 162. At this time, the slide of the first actuator 161 is guided by the guide rib 110C provided at the inner wall surface of the casing 110 on the positive X-axis side. Also, at this time, the first actuator 161 gradually moves downward away from the center of the rotational movement that is the first pivotal portion 112C of the cover 112.

<Seventh State>

Figure 18:
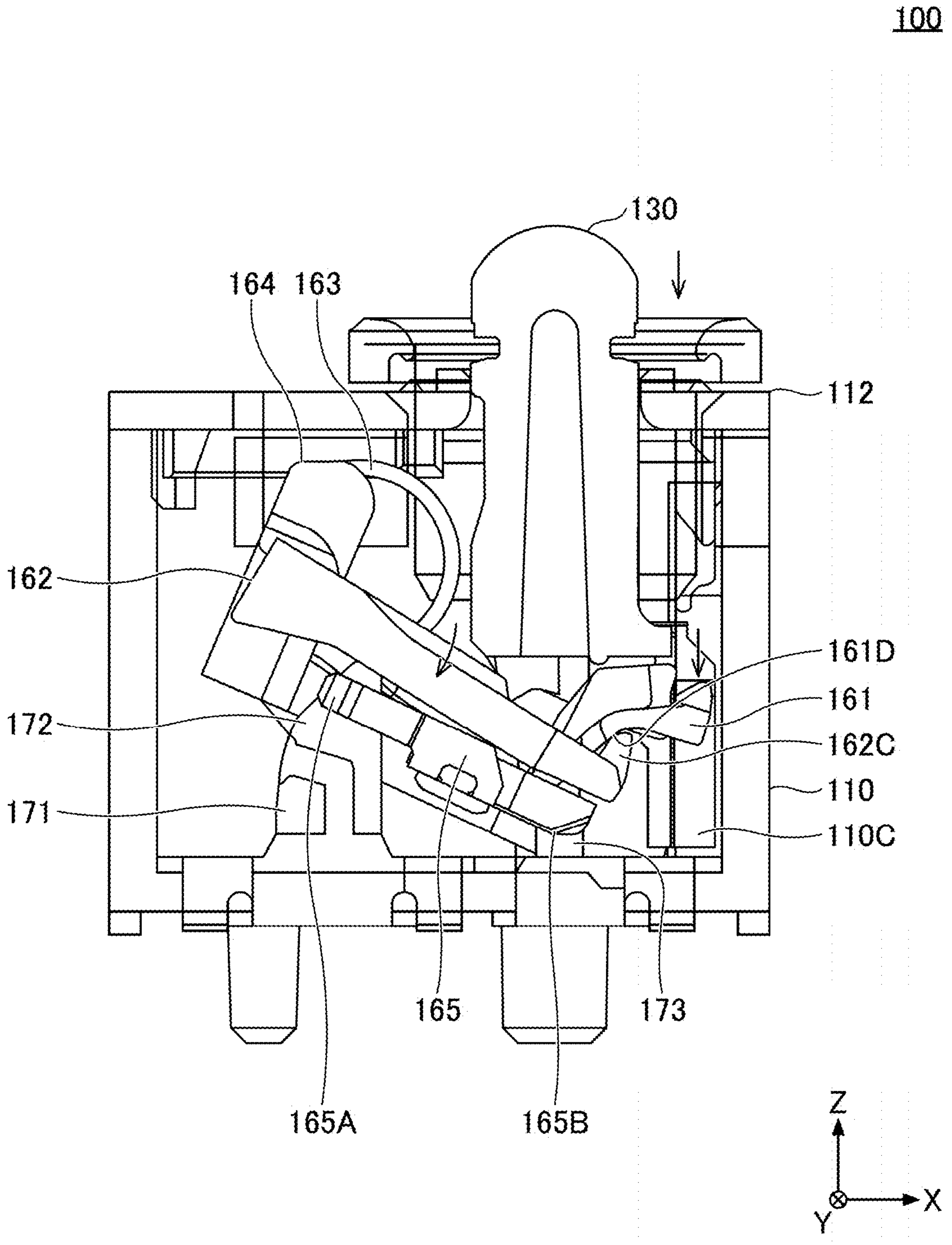
FIG. 18 is a view describing movements of the switchover switch according to the embodiment.

Then, as illustrated in FIG. 18, when the slider 130 is depressed until a lower end 130E of the slider 130, as illustrated in FIG. 5, contacts the bottom 110B of the casing 110, the downward slide of the slider 130 and the first actuator 161 stops. That is, FIG. 18 illustrates a state in which the slider 130 is depressed the most by over-stroke of the slider 130.

Subsequently, when the depression of the slider 130 is released, the biasing force applied from the torsion spring 163 presses the slider 130 upward via the cam 162 and the first actuator 161. The slider 130 is returned to the initial position as illustrated in FIG. 12.

<Eighth State>

Figure 19:
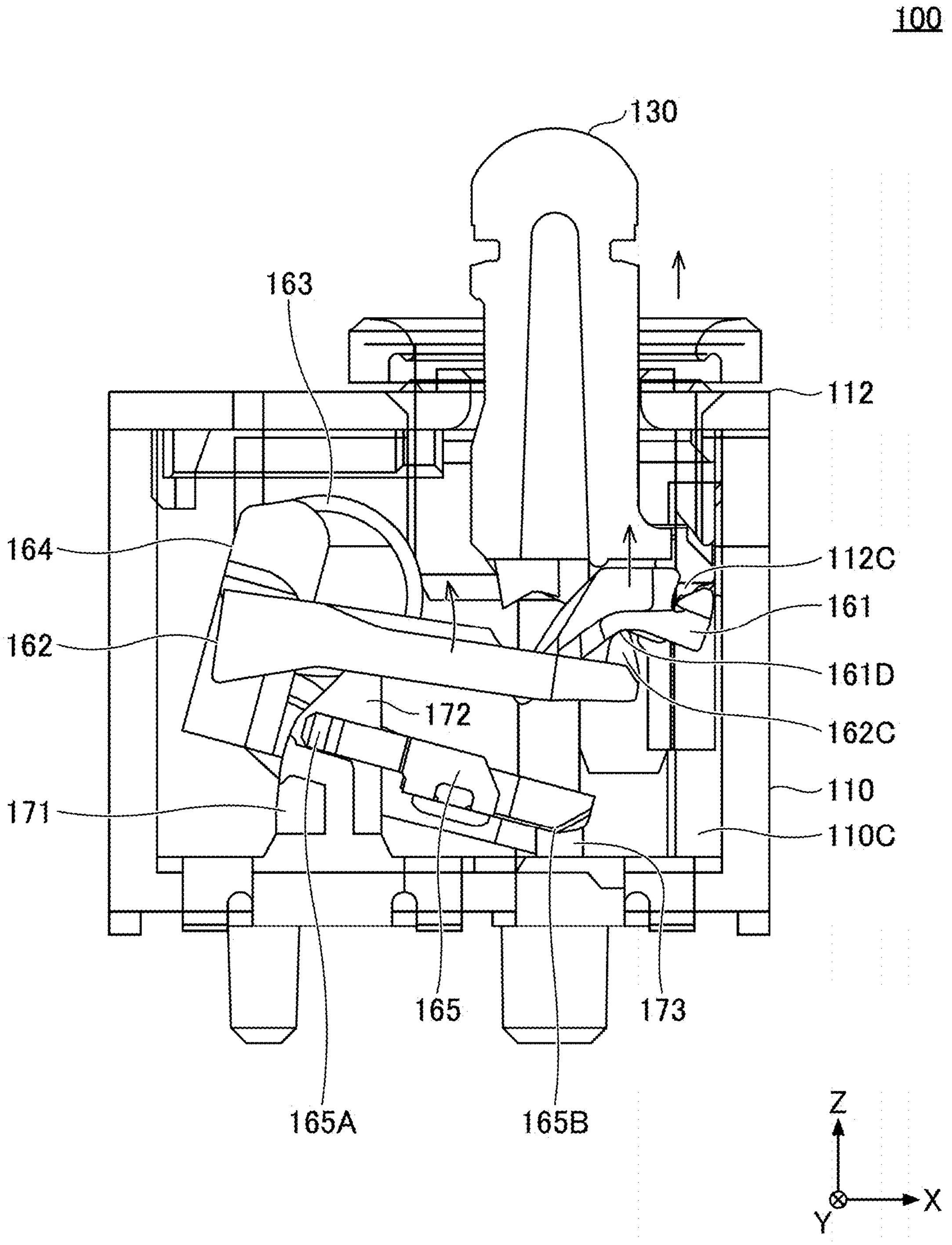
FIG. 19 is a view describing movements of the switchover switch according to the embodiment.

Specifically, by the action of the biasing force applied from the torsion spring 163, as illustrated in FIG. 19, the cam projection 162C of the cam 162 presses the first actuator 161 upward from the seventh state as illustrated in FIG. 18. Thereby, the first actuator 161 slides up with the angle of the rotational movement being fixed, while pressing the slider 130 upward. At this time, the slide of the first actuator 161 is guided by the guide rib 110C provided at the inner wall surface of the casing 110 on the positive X-axis side. As illustrated in FIG. 19, when the first actuator 161 contacts the first pivotal portion 112C of the cover 112, the upward slide of the first actuator 161 stops.

<Ninth State>

Figure 20A:
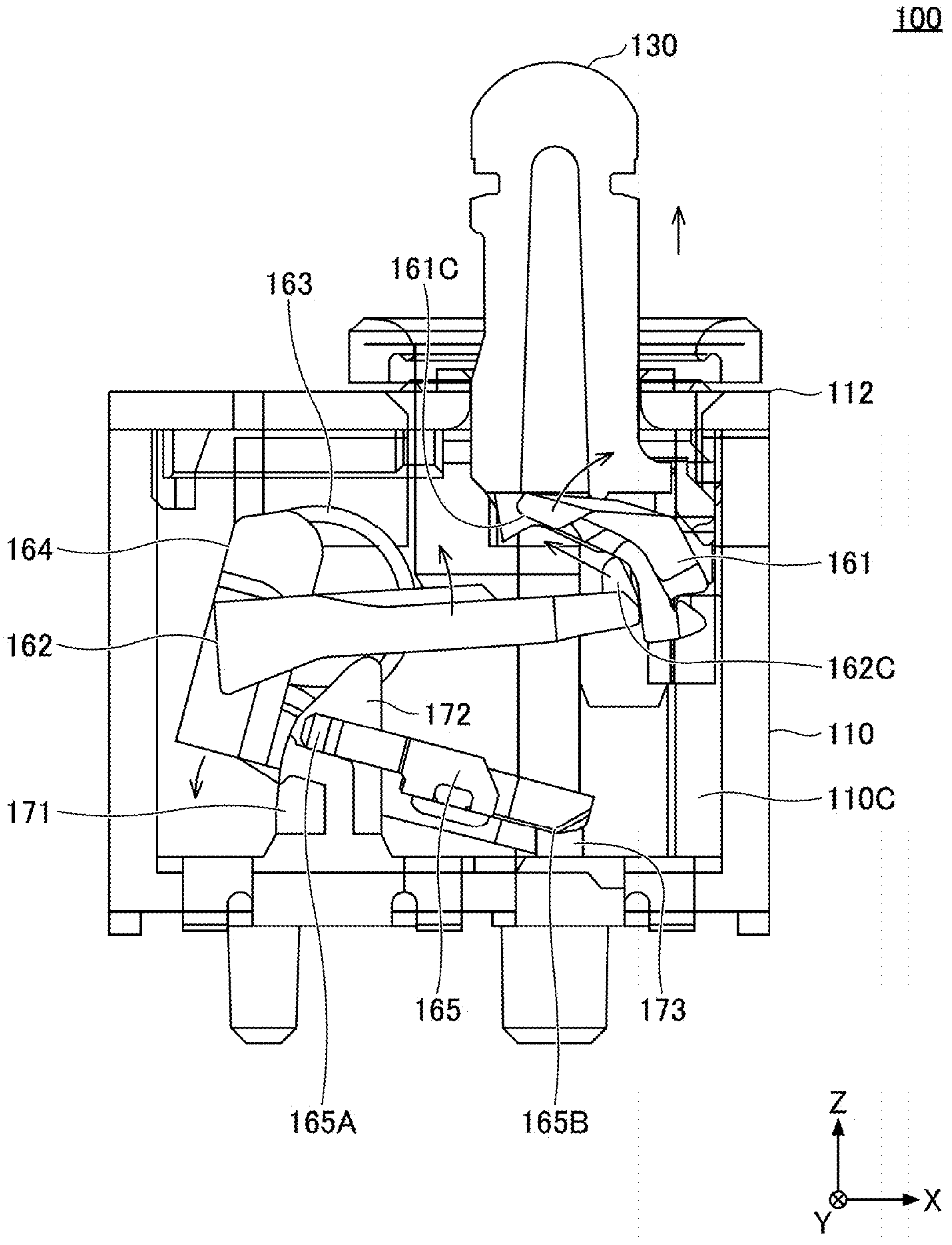
FIG. 20A is a view describing movements of the switchover switch according to the embodiment.
Figure 20B:
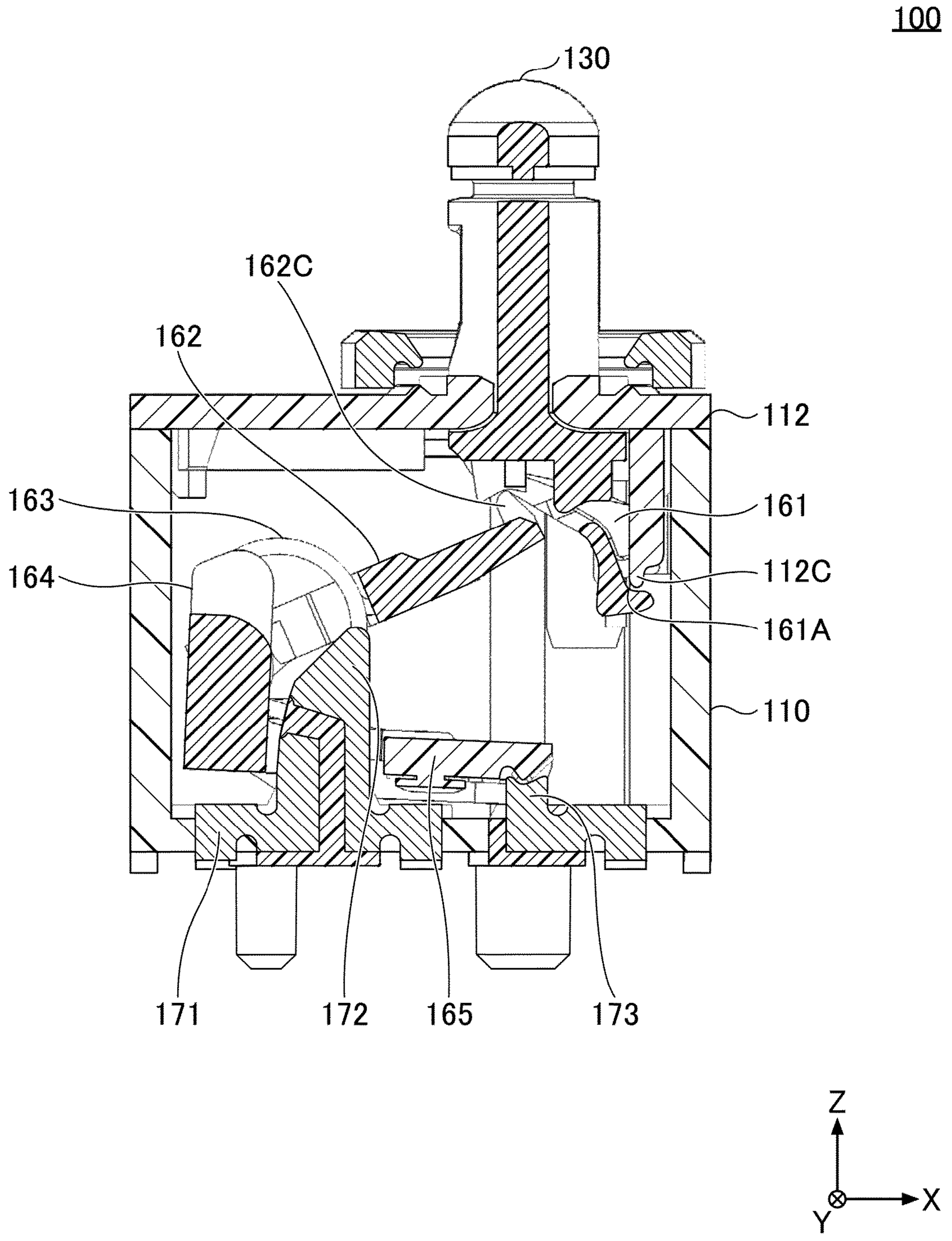
FIG. 20B is a view illustrating a state in which a first actuator is pivotally supported by a first pivotal portion of a cover.

Subsequently, as illustrated in FIG. 20A, when the first actuator 161 is pressed upward by the cam projection 162C of the cam 162, the first actuator 161 rotationally moves upward while being pivotally supported by the first pivotal portion 112C of the cover 112, thereby pressing the slider 130 upward. FIG. 20B illustrates a state in which the first actuator 161 is pivotally supported by the first pivotal portion 112C of the cover 112. At this time, the biasing force applied from the torsion spring 163 provides the cam projection 162C of the cam 162 with a force to slide up over the lower tilt surface 161C of the first actuator 161. Once this force exceeds friction resistance between the cam projection 162C and the lower tilt surface 161C, the cam projection 162C instantaneously slides up over the lower tilt surface 161C toward the tip end portion of the first actuator 161. Accordingly, the raising of the pivotal support 164A of the second actuator 164 by the rotational movement pivotal portion 162B of the cam 162 is released. That is, the second actuator 164 instantaneously rotationally moves downward, with the center of the rotational movement being the contact point between the third stationary contact 173 and the second contact portion 165B of the movable contact member 165.

<Tenth State>

Figure 21:
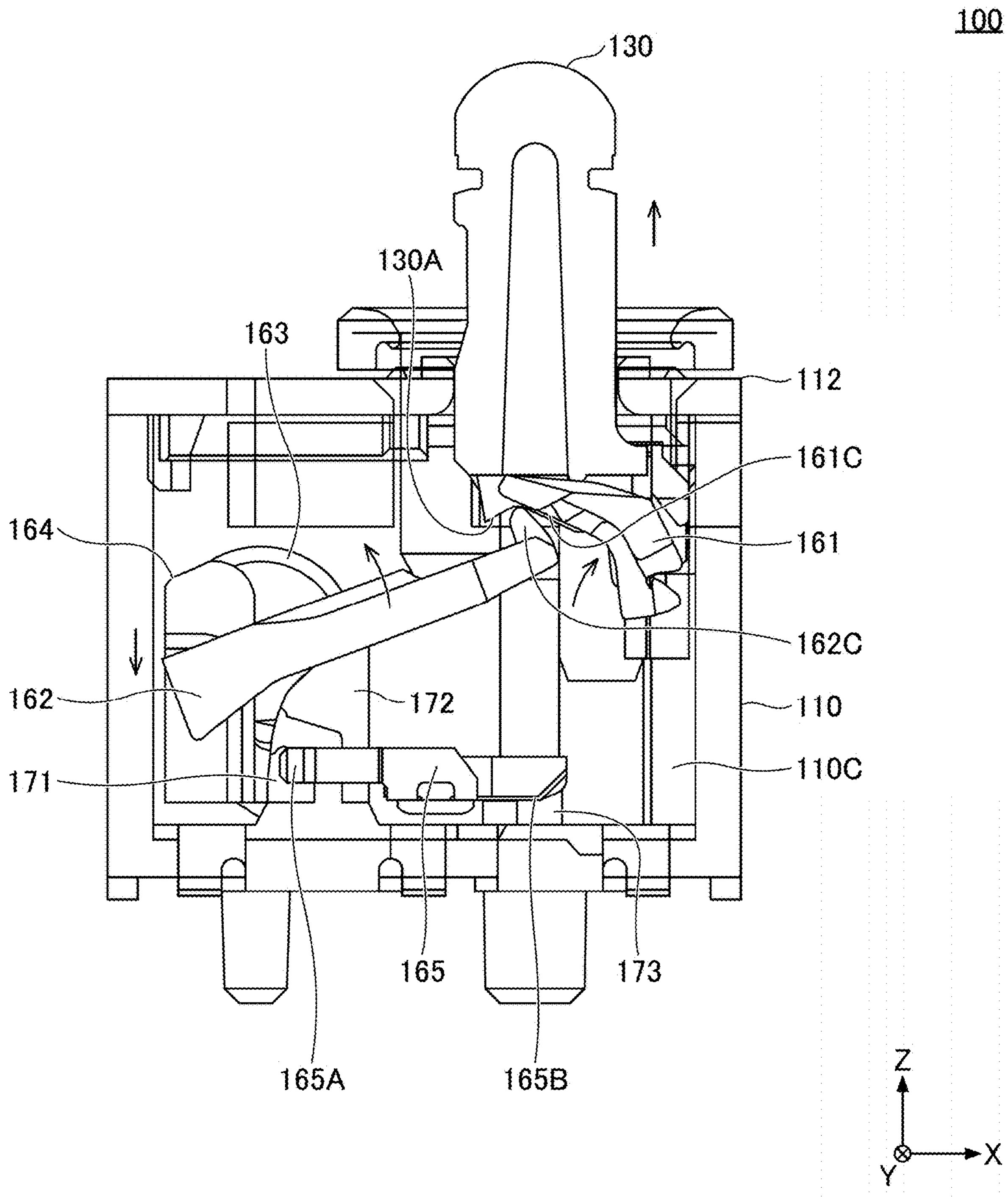
FIG. 21 is a view describing movements of the switchover switch according to the embodiment.

Then, as illustrated in FIG. 21, when the second actuator 164 instantaneously rotationally moves downward, the contact position of the first contact portion 165A of the movable contact member 165 held by the second actuator 164 is instantaneously switched from the second stationary contact 172 to the first stationary contact 171. As a result, the first stationary contact 171 and the third stationary contact 173 conduct to each other via the movable contact member 165, i.e., the switchover switch 100 is instantaneously switched to the first conduction state. Thereby, the switchover switch 100 enables instantaneous switching by a snap action. Also, as illustrated in FIG. 21, when the contact position of the cam projection 162C of the cam 162 is switched from the lower tilt surface 161C of the first actuator 161 to the pressing surface 130A of the slider 130, the upward rotational movement of the first actuator 161 stops, and the cam projection 162C of the cam 162 biases the pressing surface 130A of the slider 130 upward and directly slides the slider 130 upward.

<Eleventh State>

Figure 22:
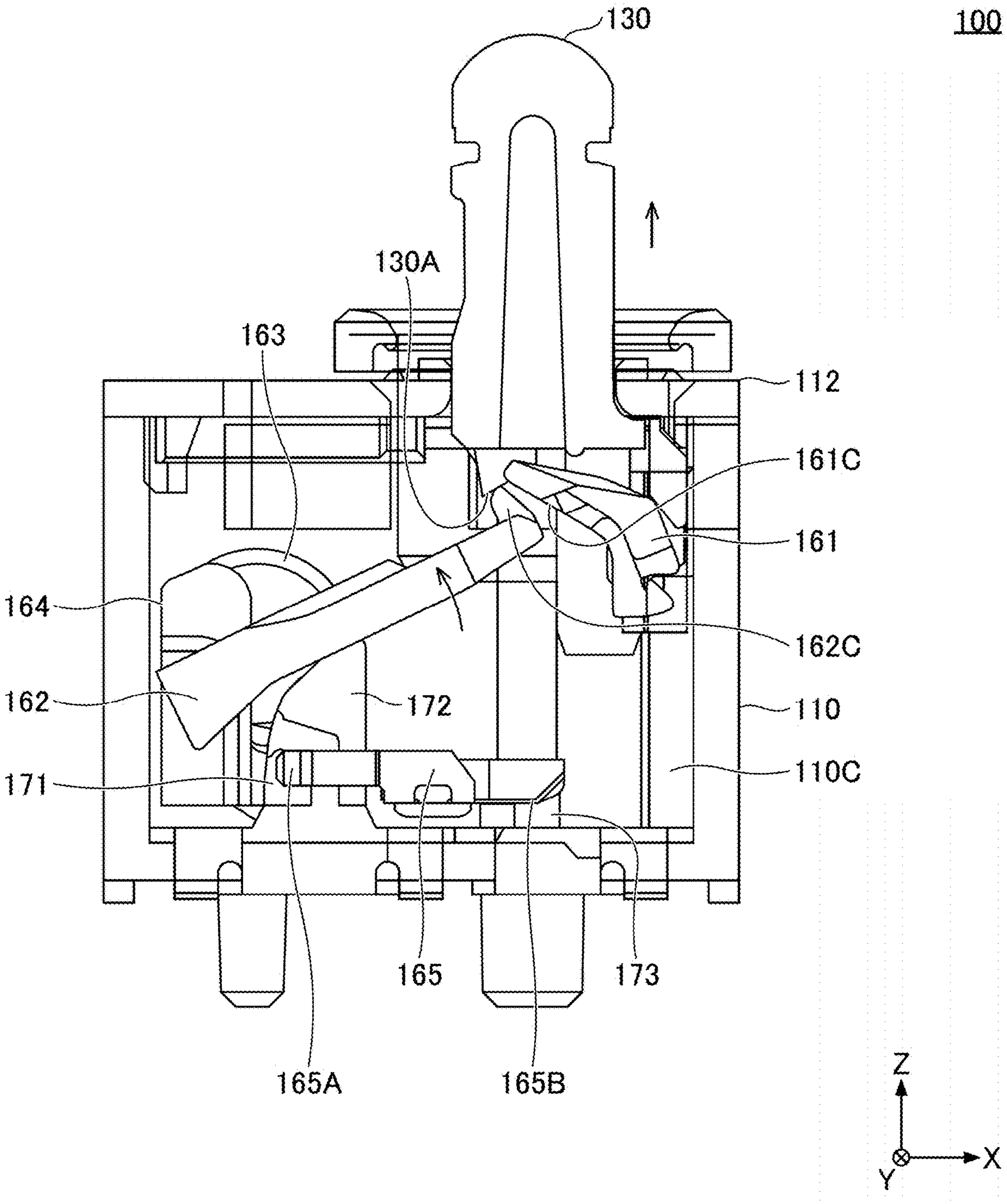
FIG. 22 is a view describing movements of the switchover switch according to the embodiment.

Then, as illustrated in FIG. 22, when the slider 130 contacts the lower surface of the cover 112, the upward slide of the slider 130 stops. That is, FIG. 22 illustrates a state in which the slider 130 is pressed upward the most (initial state).

(Configuration in which the First Actuator 161 is Rotationally Movable)

Next, a configuration in which the first actuator 161 is rotationally movable will be described with reference to FIGS. 23 to 30.

Figure 23:
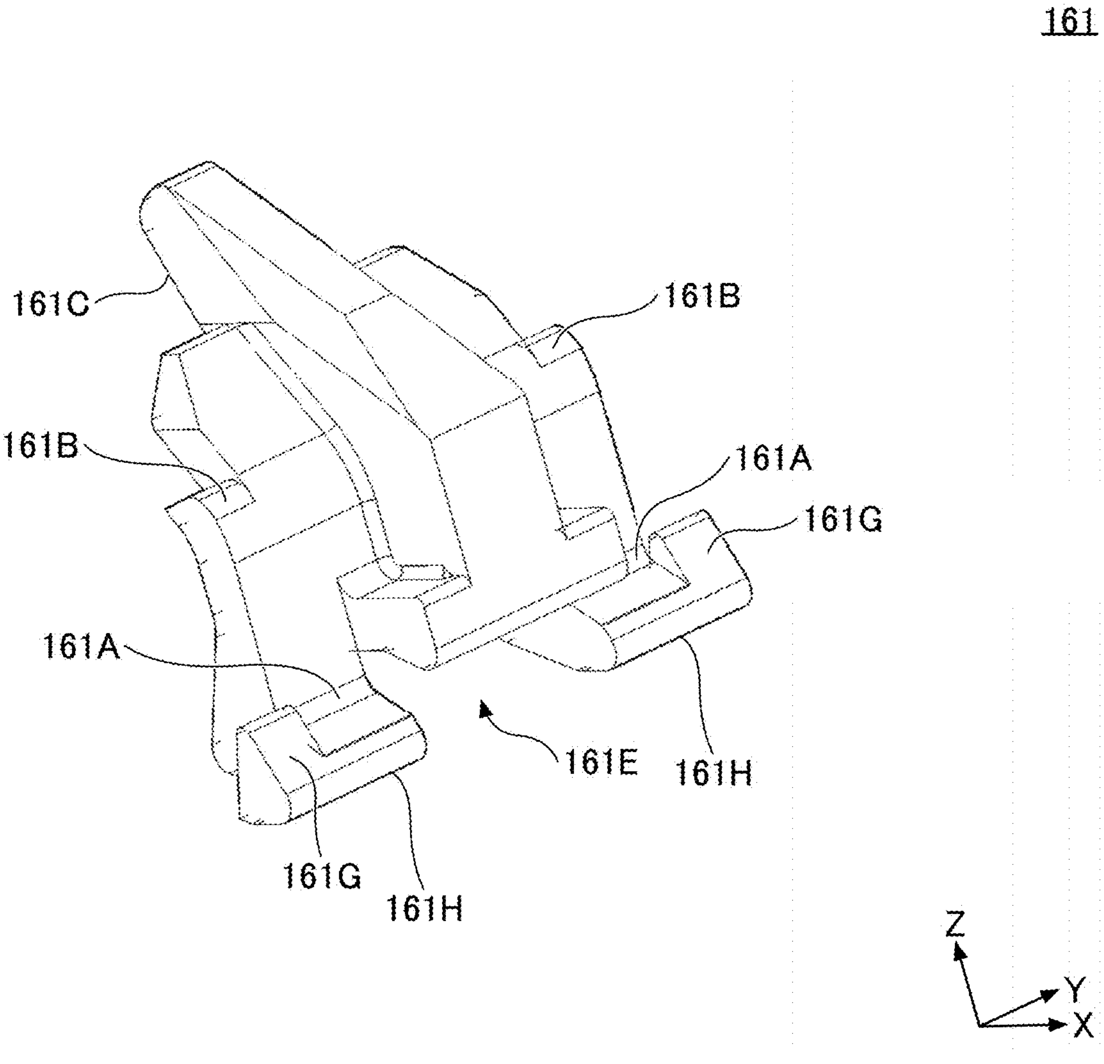
FIG. 23 is a perspective view of an outer appearance of the first actuator according to the embodiment as viewed from above.
Figure 24:
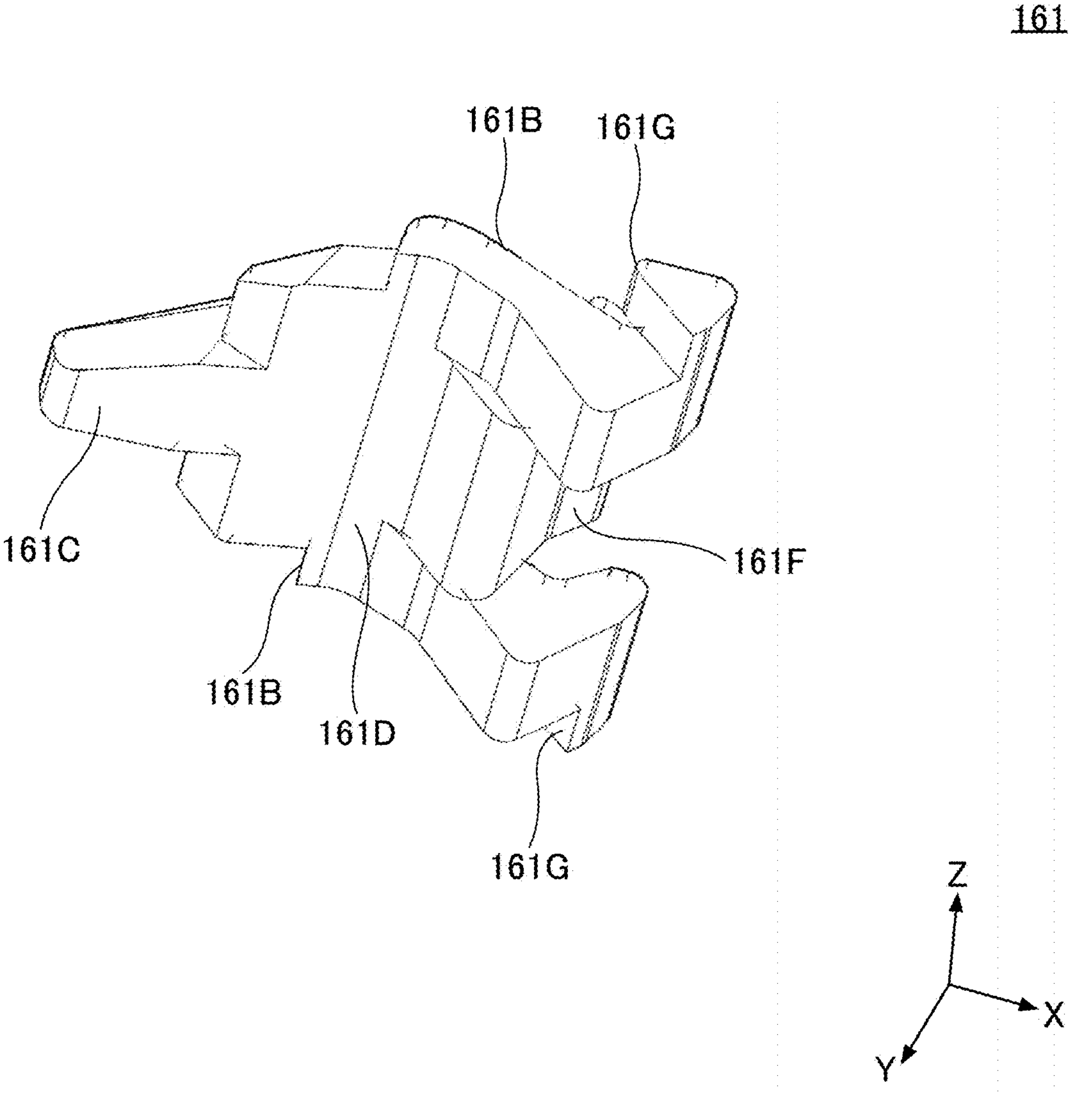
FIG. 24 is a perspective view of an outer appearance of the first actuator according to the embodiment as viewed from below.

FIG. 23 is a perspective view of the outer appearance of the first actuator 161 according to the embodiment as viewed from above. FIG. 24 is a perspective view of the outer appearance of the first actuator 161 according to the embodiment as viewed from below.

As illustrated in FIGS. 23 and 24, the first actuator 161 includes a tip end portion at a center portion in the leftward-rightward direction (Y-axis direction) and on a tip end portion side (negative X-axis side), the tip end portion of the first actuator 161 projecting toward the cam 162 side (negative X-axis side). The upper contact surfaces 161B to be depressed by the slider 130 are formed at the respective steps of the first actuator 161 on both sides in the leftward-rightward direction (Y-axis direction). The lower tilt surface 161C that presses the cam 162 downward is formed on the lower side of the center portion of the tip end portion of the first actuator 161.

As illustrated in FIGS. 23 and 24, the first actuator 161 has a guide groove 161E at a center portion in the leftward-rightward direction (Y-axis direction) and on a rear end portion side (positive X-axis side), the guide groove 161E being formed through cutting-out performed along in a forward-rearward direction (X-axis direction) so as to have a constant width. Thereby, the rear end portion of the first actuator 161 has a shape having a pair of left and right legs 161H with the guide groove 161E being therebetween.

As illustrated in FIG. 23, the pair of legs 161H of the first actuator 161 are provided with the upper bearing surfaces 161A each having a curved plane shape and being exposed upward.

Further, as illustrated in FIG. 24, the first actuator 161 includes the lower bearing surface 161F at the rear end portion at the center portion in the leftward-rightward direction (Y-axis direction), the lower bearing surface 161F having a curved plane shape and being exposed downward (i.e., exposed to the guide groove 161E).

Figure 25:
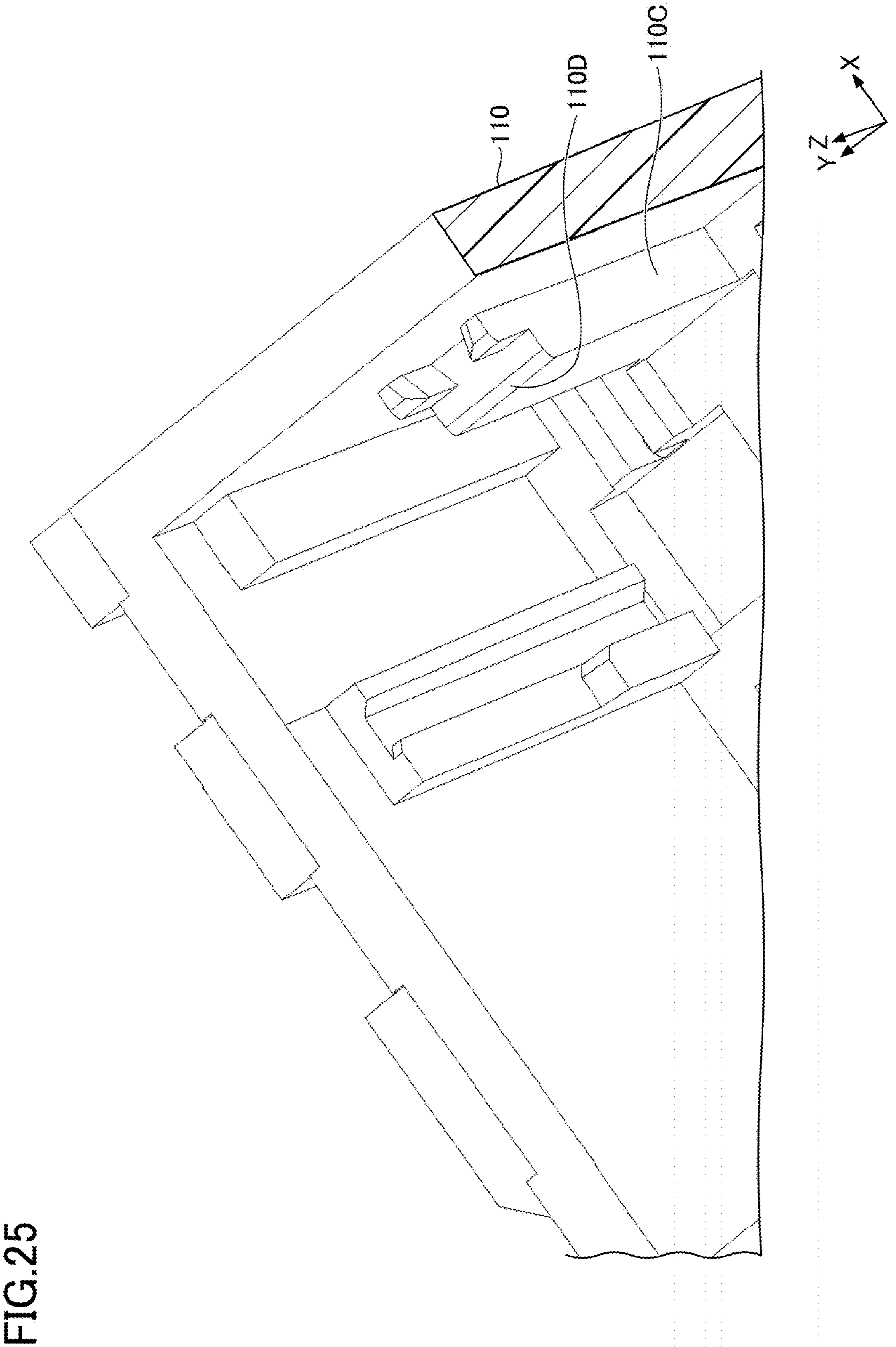
FIG. 25 is a cross-sectional perspective view of the casing according to the embodiment as viewed from above (in a state in which the first actuator is not disposed)
Figure 26:
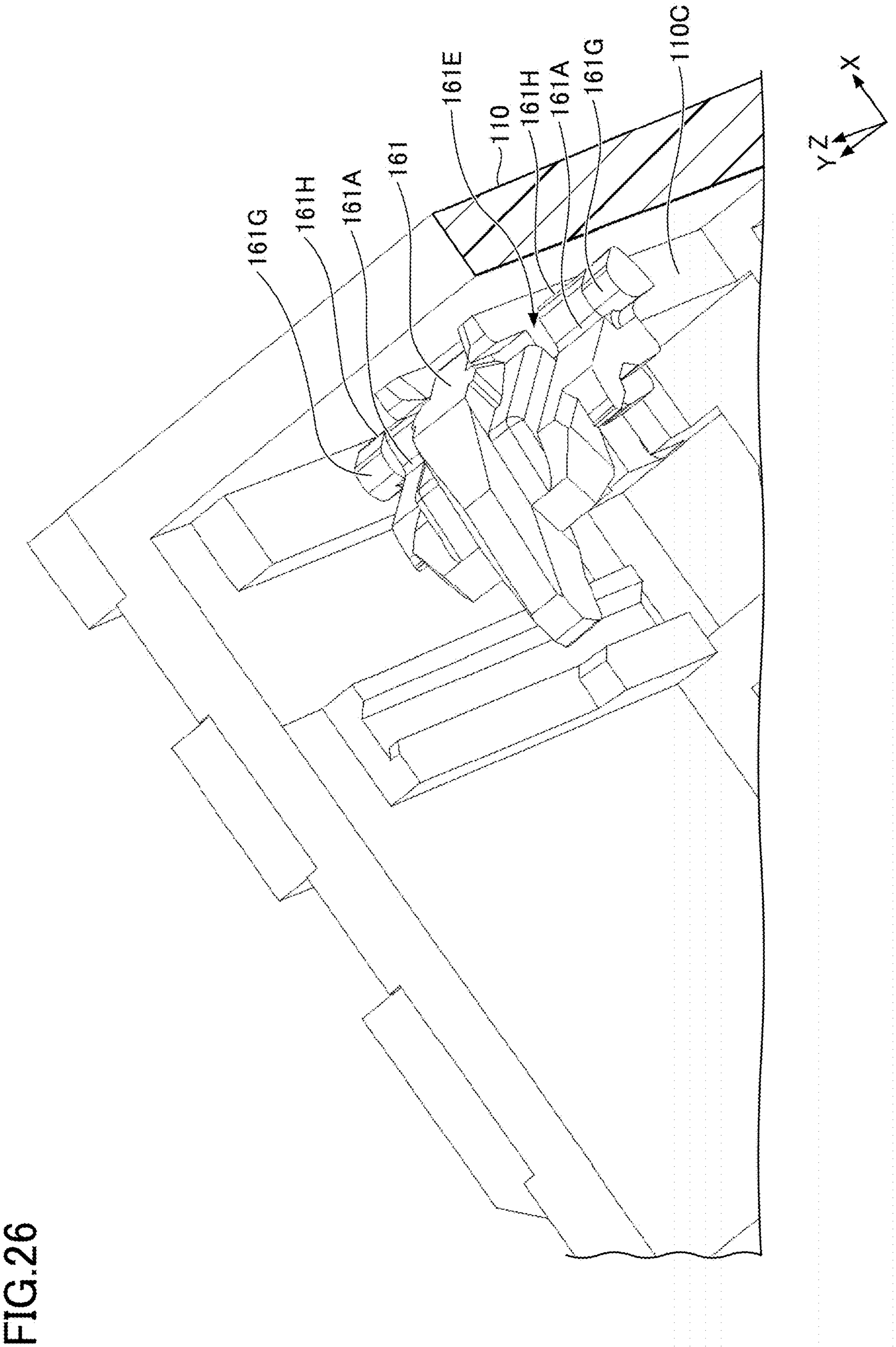
FIG. 26 is a cross-sectional perspective view of the casing according to the embodiment as viewed from above (in a state in which the first actuator is disposed)

FIG. 25 is a cross-sectional perspective view of the casing 110 according to the embodiment as viewed from above (in a state in which the first actuator 161 is not disposed). FIG. 26 is a cross-sectional perspective view of the casing 110 according to the embodiment as viewed from above (in a state in which the first actuator 161 is disposed).

Figure 27:
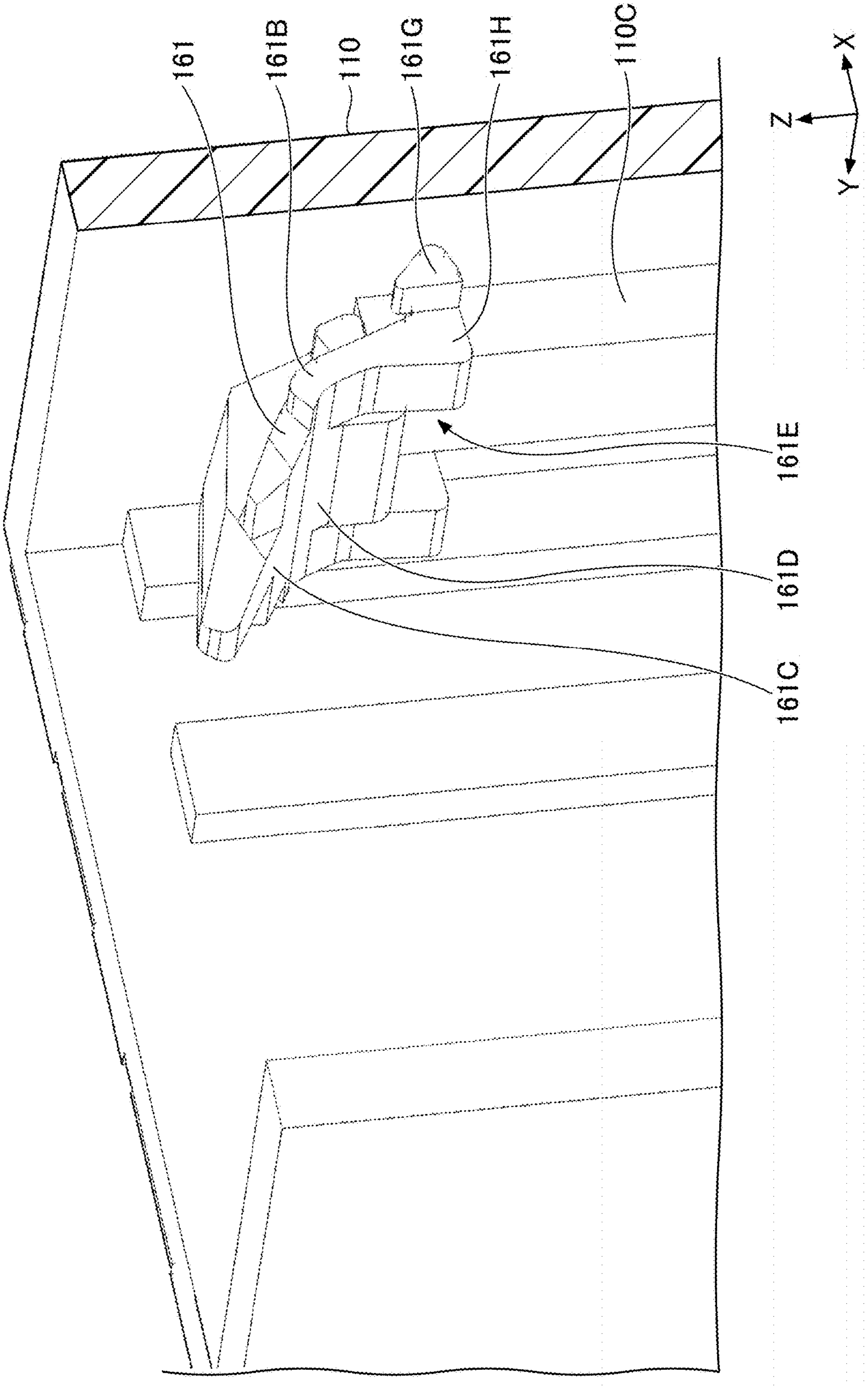
FIG. 27 is a cross-sectional perspective view of the casing according to the embodiment as viewed from side (in a state in which the first actuator is disposed)
Figure 28:
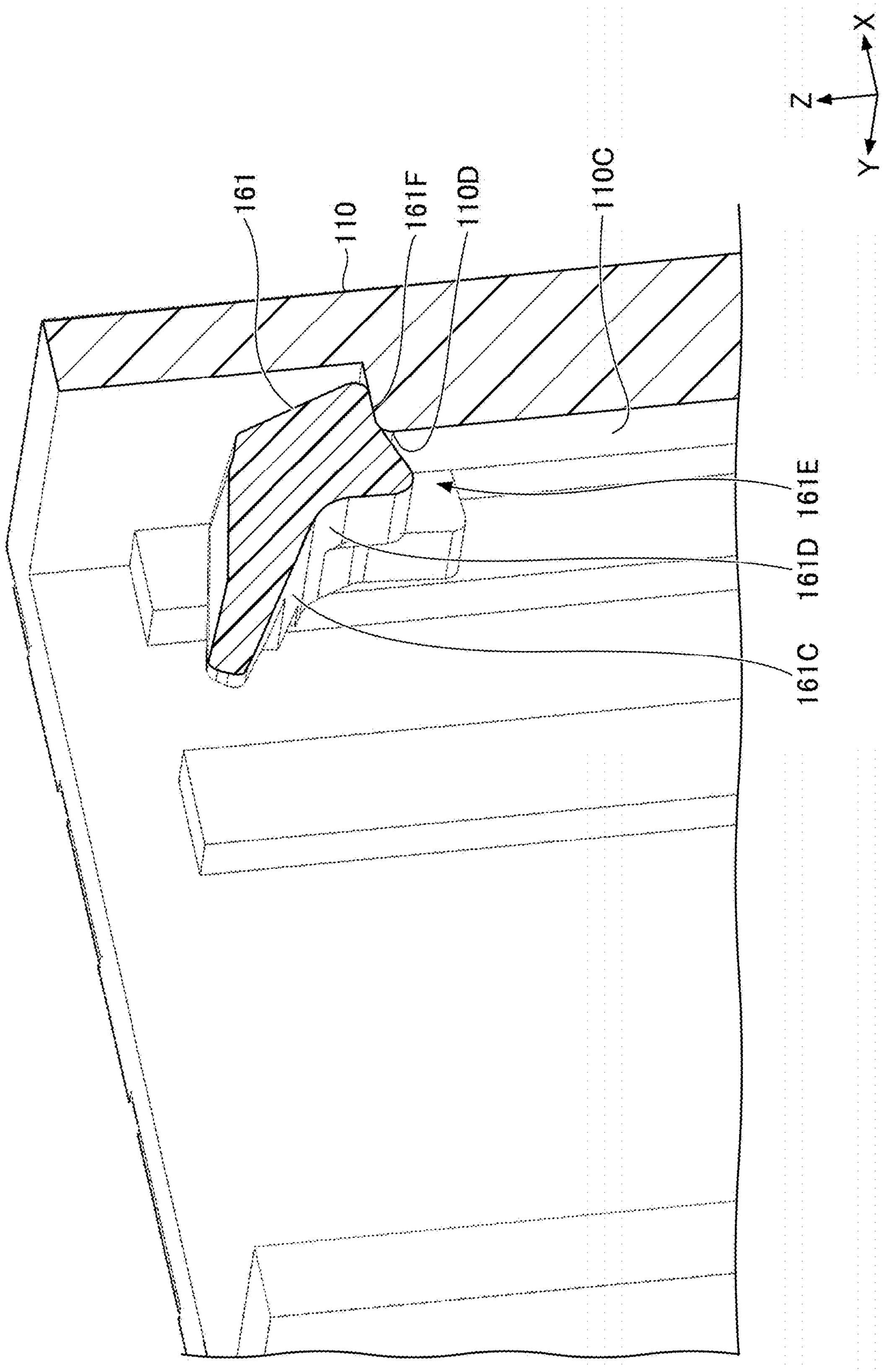
FIG. 28 is a cross-sectional perspective view of the casing according to the embodiment as viewed from side (in a state in which the first actuator is disposed)

FIGS. 27 and 28 are cross-sectional perspective views of the casing 110 according to the embodiment as viewed from side (in a state in which the first actuator 161 is disposed). FIG. 27 illustrates a cross section in which only the casing 110 is cut. FIG. 28 illustrates a cross section in which the center portion of the first actuator 161 in the leftward-rightward direction is cut.

Figure 29:
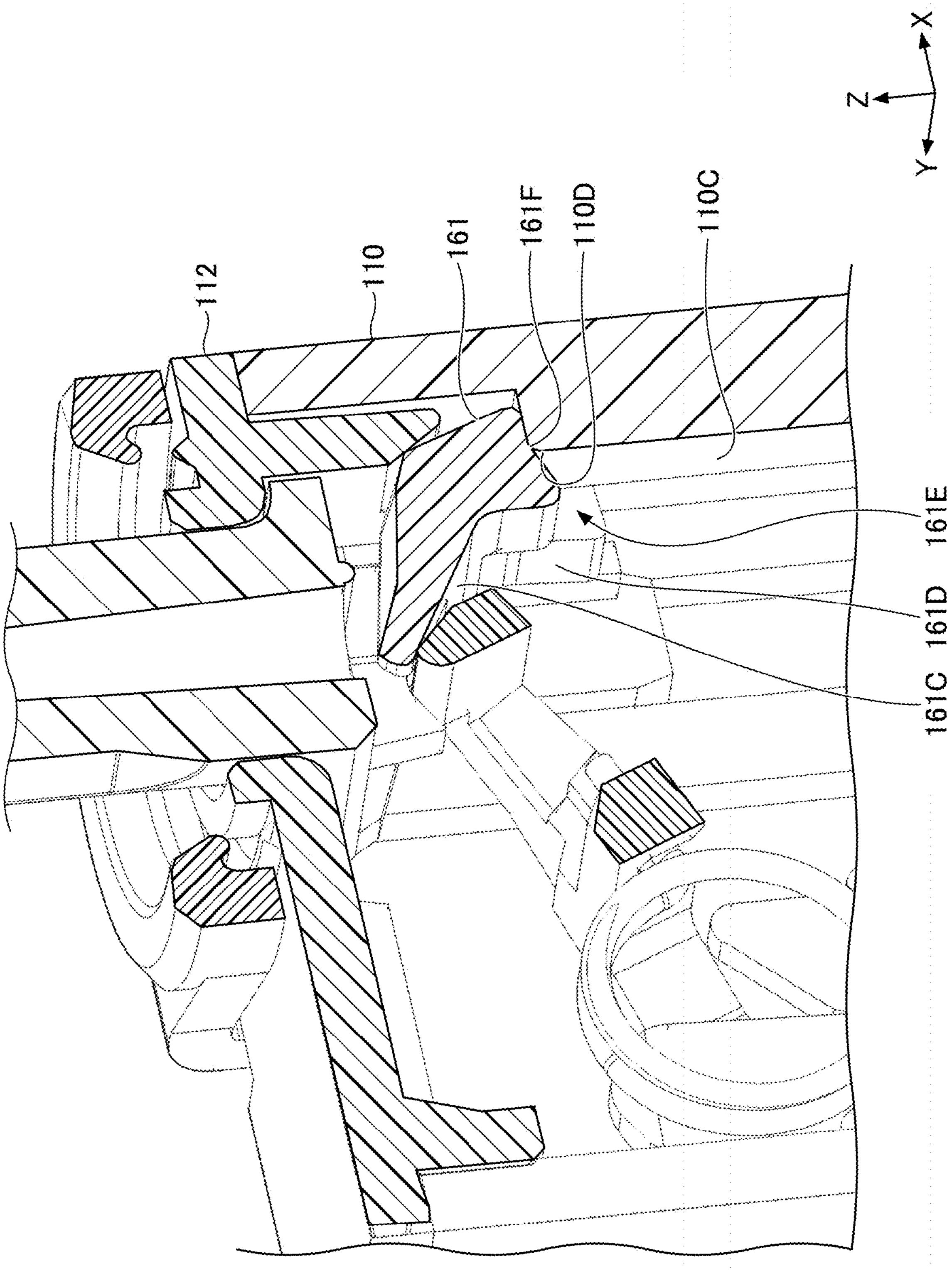
FIG. 29 is a cross-sectional perspective view of the switchover switch according to the embodiment as viewed from side.
Figure 30:
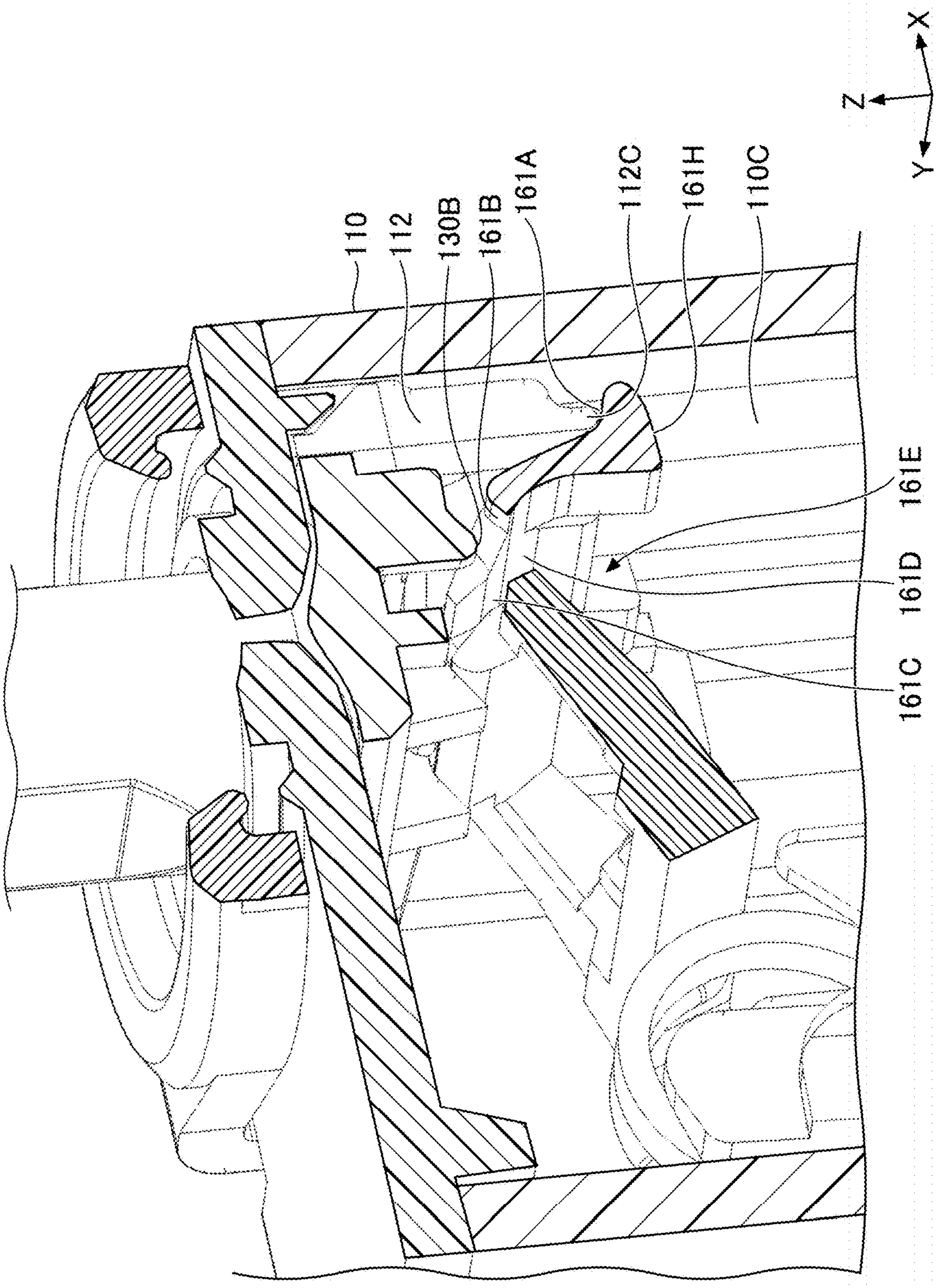
FIG. 30 is a cross-sectional perspective view of the switchover switch according to the embodiment as viewed from side.

FIGS. 29 and 30 are cross-sectional perspective views of the switchover switch 100 according to the embodiment as viewed from side. FIG. 29 illustrates a cross section in which the center portion of the first actuator 161 in the leftward-rightward direction is cut. FIG. 30 illustrates a cross section in which the left leg 161H of the first actuator 161 is cut.

As illustrated in FIGS. 25 to 27, the first actuator 161 is disposed such that the pair of legs 161H hold the guide rib 110C, formed on the inner wall surface of the casing 110 on the positive X-axis side, from both left and right sides (i.e., such that the guide rib 110C is fitted into the guide groove 161E). The width of the guide groove 161E is approximately the same size as the width of the guide rib 110C formed on the inner wall surface of the casing 110 on the positive X-axis side. Thereby, upon the over-stroke of the slider 130, the first actuator 161 can slide along the guide rib 110C in the upward-downward direction (Z-axis direction) while rattling in the leftward-rightward direction (Y-axis direction) is suppressed by the guide rib 110C.

As illustrated in FIGS. 26 to 29, when the first actuator 161 is disposed on the upper end of the guide rib 110C, the lower bearing surface 161F of the first actuator 161 rides on the second pivotal portion 110D formed at the upper corner of the guide rib 110C, thereby bearing the second pivotal portion 110D.

As illustrated in FIG. 30, the upper bearing surface 161A of the first actuator 161 bears the first pivotal portion 112C by contact with the first pivotal portion 112C formed on the lower end of the support 112B (see FIG. 4) disposed hanging downward from the lower surface of the cover 112.

That is, the first actuator 161 is pivotally supported in the following manner. Specifically, the upper bearing surface 161A is pivotally supported by the first pivotal portion 112C from above, and the lower bearing surface 161F is pivotally supported by the second pivotal portion 110D from below. Thereby, the first actuator 161 is disposed to be rotationally movable with respect to the inner wall surface of the casing 110 on the positive X-axis side, with the center of the rotational movement being the upper bearing surface 161A and the lower bearing surface 161F.

(Relationship Between the First Actuator 161 and the Slider 130)

Figure 31:
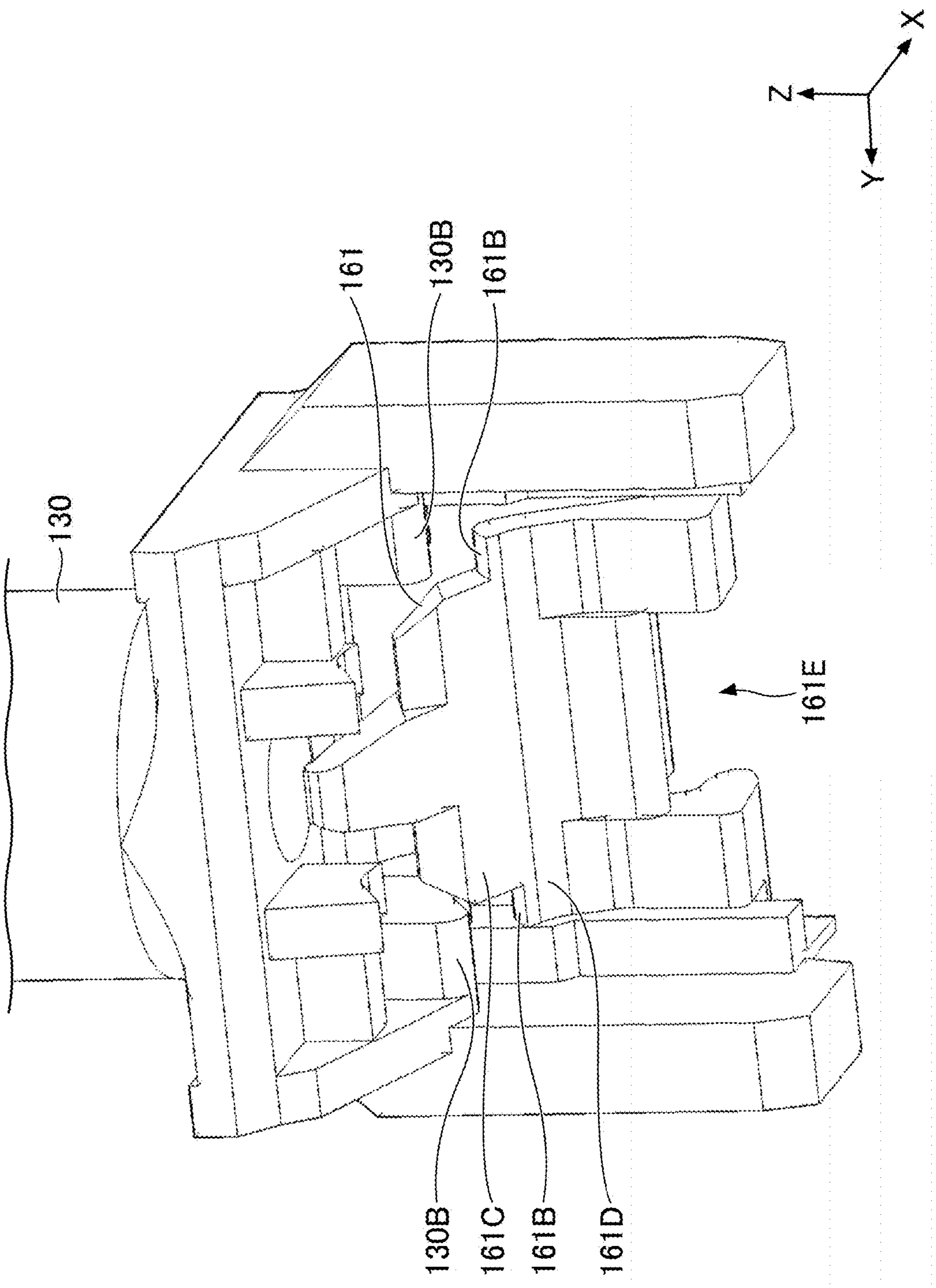
FIG. 31 is a perspective view of an outer appearance of the first actuator and slider according to the embodiment.
Figure 32:
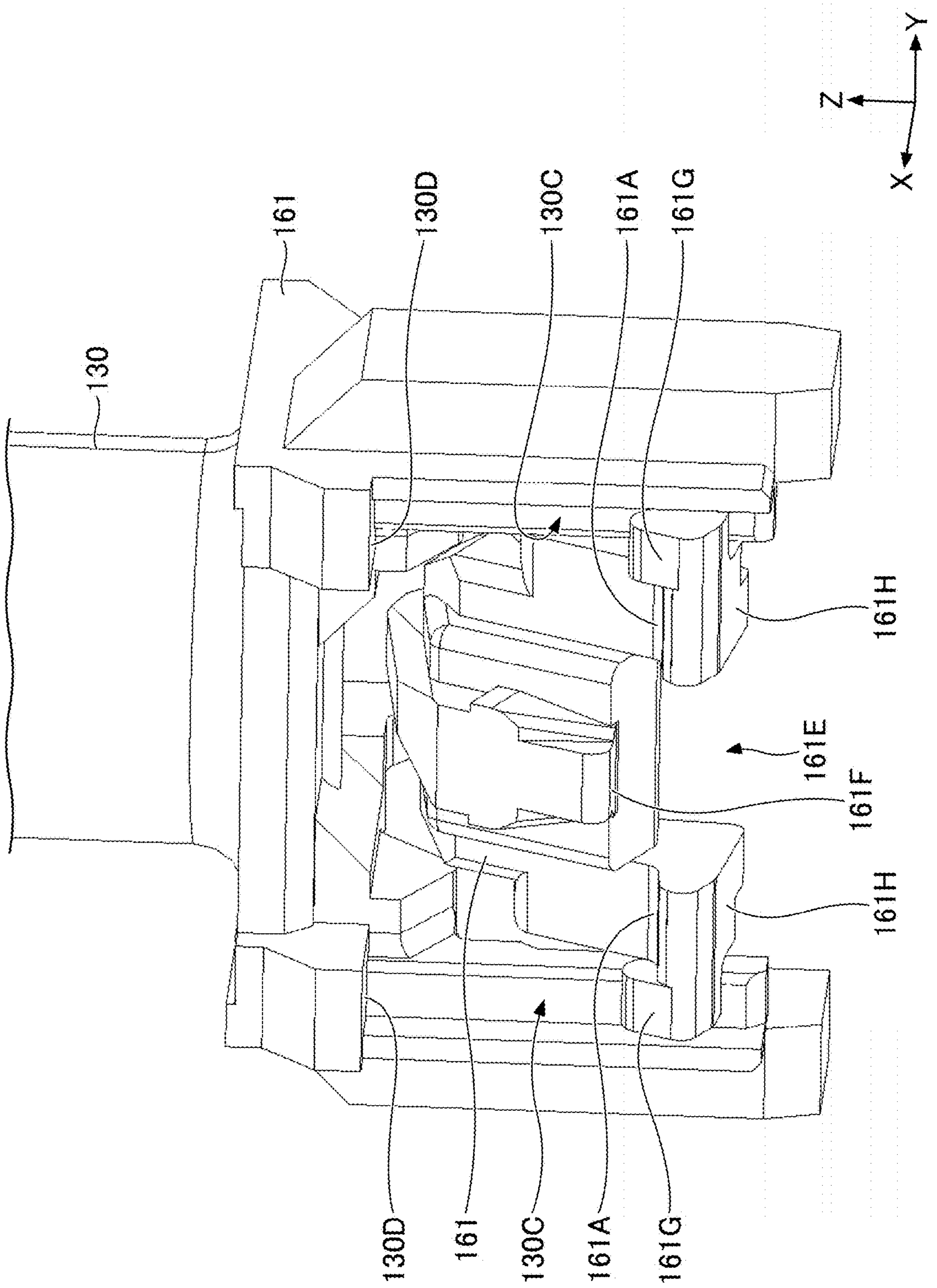
FIG. 32 is a perspective view of the outer appearance of the first actuator and slider according to the embodiment.

FIGS. 31 and 32 are perspective views of the outer appearance of the first actuator 161 and the slider 130 according to the embodiment.

As illustrated in FIG. 32, the first actuator 161 includes an overhanging portion 161G at each of the pair of legs 161H, the overhanging portion 161G projecting outward and being pivotal. The overhanging portion 161G is disposed in a slide groove 130C formed at the slider 130 and extending in the upward-downward direction. The overhanging portion 161G moves rotationally and moves in the upward-downward direction in the slide groove 130C in accordance with the upward-downward slide of the slider 130 and the rotational movement of the first actuator 161.

When the slider 130 is depressed by a predetermined amount and the first actuator 161 is rotationally moved by a predetermined angle, the overhanging portion 161G contacts an upper end surface 130D of the slide groove 130C, thereby restricting a further rotational movement of the first actuator 161.

In this state, the riding of the lower bearing surface 161F of the first actuator 161 on the second pivotal portion 110D, formed at the upper corner of the guide rib 110C, is released. This enables the first actuator 161 to slide downward. Therefore, when the slider 130 is further depressed by the over-stroke of the slider 130, the first actuator 161 slides downward along the guide rib 110C together with the slider 130.

As described above, the switchover switch 100 according to the embodiment includes: the casing 110; the slider 130 configured to slide in the upward-downward direction by being depressed; the first actuator 161 configured to be rotationally moved downward by being depressed by the slider 130; the second actuator 164 configured to retain the movable contact member 165; the first stationary contact 171 and the second stationary contact 172 that are to be contacted by the movable contact member 165; the cam projection 162C that is pivotally supported by the second actuator 164 and configured to contact the lower tilt surface 161C of the first actuator; the cam 162 configured to be rotationally moved downward by the cam projection 162C being depressed while sliding over the lower tilt surface 161C; and the torsion spring 163 configured to bias the cam 162 upward. According to the cam 162, when the first actuator 161 rotationally moves downward by a predetermined angle, the cam projection 162C instantaneously slides up over the lower tilt surface 161C by the action of the biasing force applied from the torsion spring 163. Thereby, the second actuator 164 is raised, and the contact target of the movable contact member 165 is instantaneously switched from the first stationary contact 171 to the second stationary contact 172.

Thereby, according to the switchover switch 100 according to the embodiment, the slider 130 is biased in the return direction using the torsion spring 163. Thus, compared to the existing switchover switch in which the slider is biased in the return direction using a coil spring, the size in the horizontal direction (X-axis direction and Y-axis direction) can be reduced. Therefore, according to the switchover switch 100 according to the embodiment, it is possible to achieve further downsizing of the switchover switch.

Also, according to the switchover switch 100 according to the embodiment, when the second actuator 164 is raised by the cam 162, the movable contact member 165 is rotationally moved upward with the fulcrum being the contact position between the movable contact member 165 and the third stationary contact 173, while contacting the movable contact member 165 with the third stationary contact 173. Thereby, the contact target of the movable contact member 165 is instantaneously switched from the first stationary contact 171 to the second stationary contact 172.

With this configuration, the switchover switch 100 according to the embodiment utilizes, as the fulcrum, the contact position between the movable contact member 165 and the third stationary contact 173. Thus, it is not necessary to separately provide a fulcrum for the rotational movement of the second actuator 164. This enables a relatively simple configuration for the rotational movement of the second actuator 164.

Also, according to the switchover switch 100 according to the embodiment, the second actuator 164 includes the pivotal support 164A supporting the rotational movement pivotal portion 162B of the cam 162, and the rotational movement pivotal portion 162B of the cam 162 raises the pivotal support 164A of the second actuator 164, thereby switching the contact target of the movable contact member 165 from the first stationary contact 171 to the second stationary contact 172.

With this configuration, the switchover switch 100 according to the embodiment utilizes the cam 162 rotationally movably connected to the second actuator 164, and the connected portion therebetween enables the upward rotational movement of the second actuator 164. This enables a relatively simple configuration for the rotational movement of the second actuator 164.

Also, according to the switchover switch 100 according to the embodiment, the second actuator 164 is pressed against the inner bottom of the casing 110 by the action of the biasing force applied from the torsion spring 163.

With this configuration, the switchover switch 100 according to the embodiment has a relatively simple configuration using the single torsion spring 163, and enables both of biasing the slider 130 in the return direction and pressing the second actuator 164 against the inner bottom of the casing 110.

Also, according to the switchover switch 100 according to the embodiment, once the slider 130 is moved downward to a predetermined position in height, any further downward rotational movement of the first actuator 161 is restricted.

Thereby, the switchover switch 100 according to the embodiment can prevent the first actuator 161 from rotationally moving downward too much.

Also, according to the switchover switch 100 according to the embodiment, the slider 130 has a slide groove in which the overhanging portion 161G of the first actuator 161 slides in the upward-downward direction, and once the slider is moved downward to a predetermined position in height, any further downward rotational movement of the first actuator 161 is restricted by the overhanging portion 161G contacting the upper end surface of the slide groove.

Thereby, the switchover switch 100 according to the embodiment has a relatively simple configuration and can reliably prevent the first actuator 161 from rotationally moving downward too much.

Also, according to the switchover switch 100 according to the embodiment, the first actuator 161 deviates from the axis of the rotational movement when the slider 130 moves downward to a predetermined position in height.

Thereby, when the slider 130 is further depressed downward, the switchover switch 100 according to the embodiment can further move the first actuator 161 downward beyond the center of the rotational movement, and thus can achieve a further downward slide of the slider 130.

Also, according to the switchover switch 100 according to the embodiment, when the slider 130 further moves downward from the predetermined position in height after deviating from the axis of the rotational movement, the first actuator 161 slides downward together with the slider 130 along the guide rib 110C formed on the inner wall surface of the casing 110 with the angle of the rotational movement being fixed.

Thereby, the switchover switch 100 according to the embodiment can achieve over-stroke of the slider 130. At this time, according to the switchover switch 100 according to the embodiment, the cam 162 can be further depressed by the first actuator 161 sliding downward with the angle of the rotational movement of the first actuator 161 being fixed.

Also, according to the switchover switch 100 according to the embodiment, the guide rib 110C includes the second pivotal portion 110D at the upper end, and the first actuator 161 includes the lower bearing surface 161F. When the lower bearing surface 161F rides on the second pivotal portion 110D, the first actuator 161 can rotationally move with the second pivotal portion 110D being the center of the rotational movement. When the slider 130 moves downward to a predetermined position in height, the lower bearing surface 161F becomes away from the second pivotal portion 110D as a result of the rotational movement of the first actuator 161, thereby deviating from the axis of the rotational movement.

Thereby, the switchover switch 100 according to the embodiment enables the first actuator 161 to deviate from the axis of the rotational movement in a relatively simple configuration.

Also, according to the switchover switch 100 according to the embodiment, when the slider 130 returns upward to the predetermined position in height, the upper bearing surface 161A of the first actuator 161 contacts the first pivotal portion 112C of the cover 112. From there, when the slider 130 returns further upward from the predetermined position in height, the first actuator 161 rotationally moves while being pivotally supported by the first pivotal portion 112C. Thereby, the first actuator 161 is pressed upward by the cam projection 162C of the cam 162, thereby rotationally moving upward with the first pivotal portion 112C being the center of the rotational movement.

Thereby, the switchover switch 100 according to the embodiment can return the first actuator 161 to a rotationally movable state in a relatively simple configuration.

According to the switchover switch 100 according to the embodiment including the cam 162, when the first actuator 161 rotationally moves upward to a predetermined position in height with the first pivotal portion 112C being the center of the rotational movement, the cam projection 162C instantaneously slides up over the lower tilt surface 161C by the action of the biasing force applied from the torsion spring 163, thereby releasing the raising of the second actuator 164 and instantaneously switching the contact target of the movable contact member 165 from the second stationary contact 172 to the first stationary contact 171.

Although the embodiments of the present invention have been described above in detail, the present invention is not limited to these embodiments and can be changed or modified in various ways within the scope of the present invention recited in the claims.

(Modified Example of the Movable Unit 160)

Figure 33:
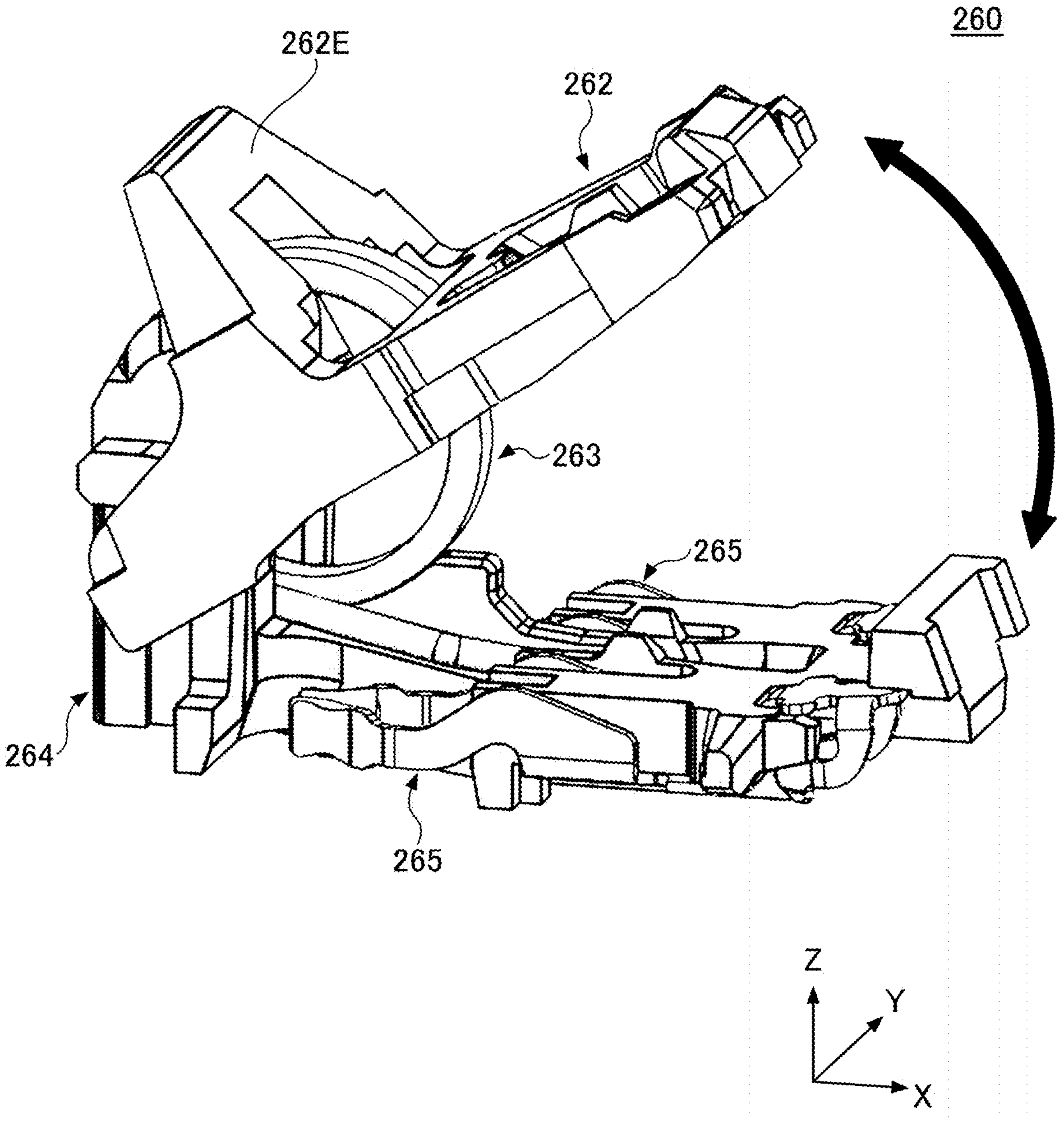
FIG. 33 is a perspective view of an outer appearance of a movable unit according to a modified example (in a state in which a cam is fully opened)
Figure 34:
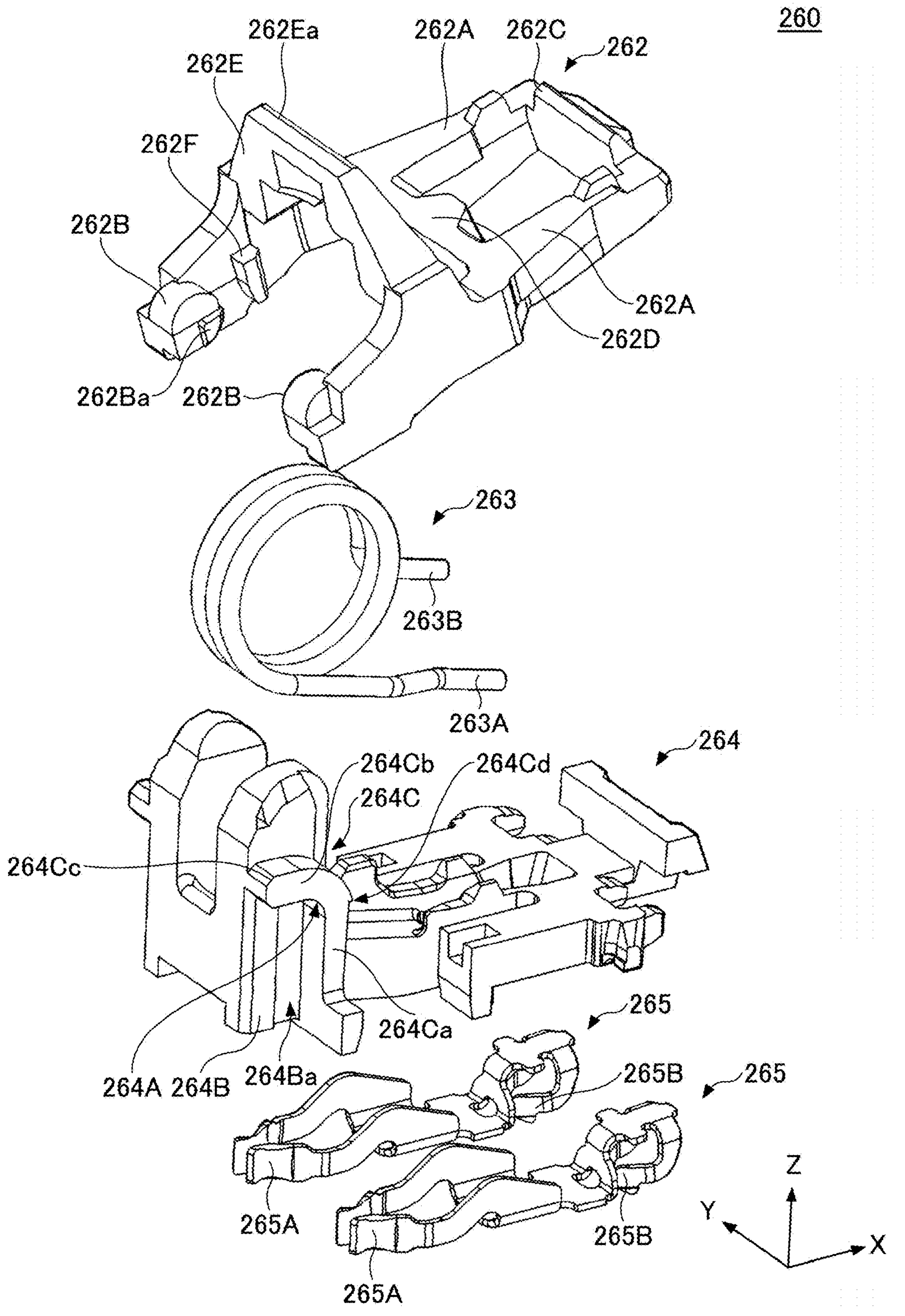
FIG. 34 is an exploded perspective view of the movable unit according to the modified example.
Figure 35:
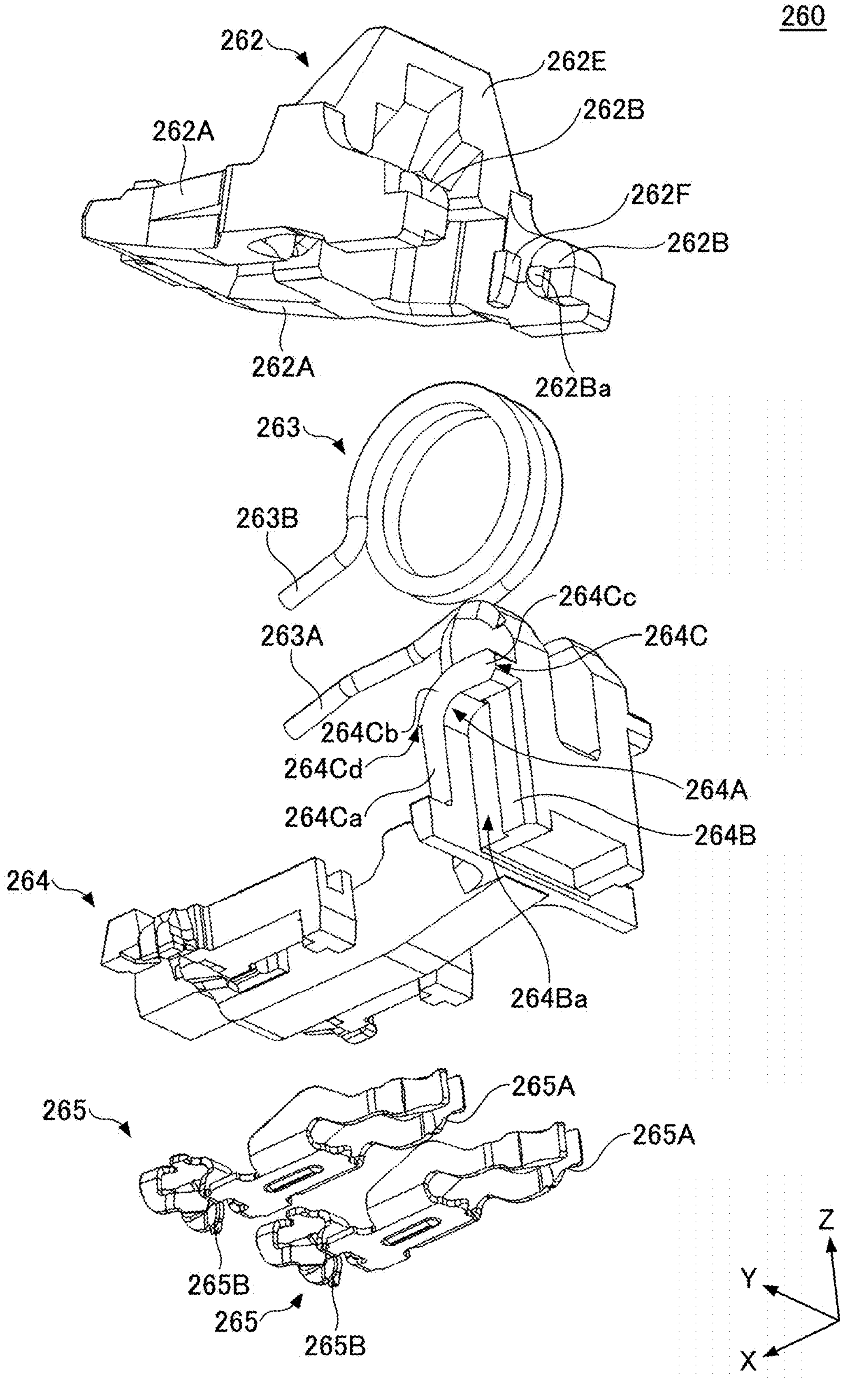
FIG. 35 is an exploded perspective view of the movable unit according to the modified example.

Hereinafter, a modified example of the movable unit 160 will be described. FIG. 33 is a perspective view of the outer appearance of a movable unit 260 according to the modified example (in a state in which a cam 262 is fully opened). FIGS. 34 and 35 are exploded perspective views of the movable unit 260 according to the modified example.

As illustrated in FIGS. 34 and 35, the movable unit 260 includes a cam 262, a torsion spring 263, a second actuator 264, and a pair of movable contact members 265. As illustrated in FIG. 34, the cam 262, the torsion spring 263, the second actuator 264, and the pair of movable contact members 265 are combined together and integrated. Although not illustrated in FIGS. 33 to 35, the movable unit 260 includes a first actuator 261 (see FIGS. 38A to 38C) that is similar to the first actuator 161 included in the movable unit 160.

The cam 262 is a rotationally movable arm-shaped member extending obliquely upward from the negative X-axis side toward the positive X-axis side in the space 110A of the casing 110. The cam 262 includes a pair of left and right arms 262A each extending obliquely upward from the negative X-axis side toward the positive X-axis side. The rear end portion (end portion on the negative X-axis side) of each of the pair of arms 262A is provided with an approximately cylindrical rotational movement pivotal portion 262B projecting inward. According to the cam 262, the rotational movement pivotal portion 262B is pivotally supported by a pivotal support 264A. The pivotal support 264A is provided at the rear end portion (end portion on the negative X-axis side) of the second actuator 264. The cam 262 is biased upward (in the positive Z-axis direction) by the torsion spring 263 that is the biasing member. The cam 262 includes a cam projection 262C at the tip end portion (end portion on the positive X-axis side). The cam projection 262C has a curved tip end portion and has a shape projecting upward. By the cam projection 262C being pressed upward while sliding over a lower tilt surface 261C (see FIGS. 38A and 38B) of the first actuator 261, the cam 262 rotationally moves downward with the rotational movement pivotal portion 262B being the center of the rotational movement, while elastically deforming a torsion spring 263. According to the cam 262, when the slider 130 is depressed to a predetermined position in height, the cam projection 262C slides up over the lower tilt surface 261C of the first actuator 261, and the rotational movement pivotal portion 262B raises the pivotal support 264A of the second actuator 264. Thereby, the cam 262 performs switching of a contact target of the movable contact members 265 held by the second actuator 264 from the first stationary contact 171 to the second stationary contact 172.

Also, the cam 262 includes a connecting portion 262D and a pressing portion 262E. The connecting portion 262D is provided between the pair of left and right arms 262A at the center of the cam 262 in the forward-rearward direction (X-axis direction) and is a beam-shaped portion connecting the pair of left and right arms 262A. For example, the connecting portion 262D can increase torsional rigidity of the cam 262. The pressing portion 262E is a bridge-shaped portion connecting the pair of left and right arms 262A at a rear side (negative X-axis side) of the connecting portion 262D of the cam 262. The pressing portion 262E has a shape projecting upward (positive Z-axis direction) and is formed so as to bridge over the torsion spring 263 disposed between the pair of left and right arms 262A. The upper surface of the pressing portion 262E is a pressing surface 262Ea to which a pressing force is to be applied from a user when the movable unit 160 is embedded in the space 110A of the casing 110. Thereby, according to the cam 262, when the movable unit 160 is embedded in the space 110A of the casing 110, the user can readily recognize a to-be-depressed position of the cam 262, and the user can readily depress a rear portion (portion on the negative X-axis side) of the cam 262. Further, the pressing portion 262E also serves to increase torsional rigidity of the cam 262.

According to the cam 262, the inner surface of each of the pair of rotational movement pivotal portions 262B is provided with a projection 262Ba so as to project inward.

According to the cam 262, the inner surface of each of the pair of arms 262A is provided with a wall-shaped projecting portion 262F at a position forward (positive X-axis direction) of the rotational movement pivotal portion 262B by a predetermined distance. The projecting portion 262F projects inward and extends in the upward-downward (Z-axis direction).

The projecting portion 262F has a tapered surface 262Fa at a part on the lower side (negative Z-axis side) of the rear-side (negative X-axis side) surface. Thereby, the gap between the projecting portion 262F and the rotational movement pivotal portion 262B is partially widened, so that a support wall 264C can be readily inserted into the gap between the projecting portion 262F and the rotational movement pivotal portion 262B during assembling.

The torsion spring 263 is a metal member having elasticity. The torsion spring 263 biases the upper surface of the second actuator 264 downward by one arm 263A and biases the cam 262 upward by the other arm 263B.

The second actuator 264 is an example of the "retaining member". The pair of left and right pivotal supports 264A of the second actuator 264, which are provided at a rear end portion, pivotally support the pair of left and right rotational movement pivotal portions 262B of the cam 262. Also, the second actuator 264 retains the pair of left and right movable contact members 265. The second actuator 264 is pressed against the inner bottom surface of the casing 110 by the action of a biasing force applied from the torsion spring 263. When the slider 130 is depressed to a predetermined position in height, the rotational movement pivotal portions 262B of the cam 262 instantaneously raise the pivotal supports 264A of the second actuator 264. Thereby, the second actuator 264 instantaneously performs switching of contact positions of first contact portions 265A, provided at respective rear end portions of the pair of movable contact members 265, from the first stationary contact 171 to the second stationary contact 172, and performs a snap-action movement.

Each of the pair of left and right side wall surfaces at the rear end portion of the second actuator 264 is provided with a sliding region 264B in which the rotational movement pivotal portion 262B of the cam 262 is disposed so as to be slidable in the upward-downward direction. The sliding region 264B is a planar region having a constant width in the forward-rearward direction (X-axis direction) and extending in the upward-downward direction (Z-axis direction). A groove 264Ba is formed at a portion forward (positive X-axis side) of the sliding region 264B. The groove 264Ba has a constant width in the forward-rearward direction (X-axis direction) and extends in the upward-downward direction (Z-axis direction). By the projection 262Ba of the rotational movement pivotal portion 262B of the cam 262 being fit into the groove 264Ba, the groove 264Ba can guide the slide of the rotational movement pivotal portion 262B of the cam 262 in the upward-downward direction (Z-axis direction).

The support wall 264C is provided at each of the left and right side wall surfaces at the rear end portion of the second actuator 264. The support wall 264C projects outward and encloses a front side and an upper side of the sliding region 264B.

The support wall 264C includes a vertical portion 264Ca extending linearly in the upward-downward direction, a curved portion 264Cb extending upward and rearward in an arc shape from the upper end of the vertical portion 264Ca, and a horizontal portion 264Cc extending linearly rearward from a rear end portion of the curved portion 264Cb.

The support wall 264C supports the rotational movement pivotal portion 262B of the cam 262 so as to be rotationally movable by the rotational movement pivotal portion 262B of the cam 262 contacting the curved portion 264Cb. That is, the inner peripheral surface of the curved portion 264Cb is the pivotal support 264A.

Also, by the rotational movement pivotal portion 262B of the cam 262 contacting the vertical portion 264Ca, the support wall 264C restricts the movement of the rotational movement pivotal portion 262B of the cam 262 forward (positive X-axis direction) of the sliding region 264B, and supports the rotational movement pivotal portion 262B of the cam 262 so as to be slidable in the upward-downward direction (Z-axis direction).

Also, by the rotational movement pivotal portion 262B of the cam 262 contacting the horizontal portion 264Cc, the support wall 264C restricts the movement of the rotational movement pivotal portion 262B of the cam 262 upward (positive Z-axis direction) of the sliding region 264B.

The forward (positive X-axis side) surface of the support wall 264C is provided with a step 264Cd at a boundary position between the vertical portion 264Ca and the curved portion 264Cb. The step 264Cd is a portion that is higher in the surface on the curved portion 264Cb side. The step 264Cd stops the projecting portion 262F of the cam 262. Thereby, the step 264Cd can reliably maintain a state in which the cam 262 is depressed downward and locked to the support wall 264C of the second actuator 264 without any unintentional and unnecessary release due to vibration or the like.

The movable contact member 265 is a conductive member extending in the X-axis direction. A second contact portion 265B, provided at the other end of the movable contact member 265 (the end on the positive X-axis side), contacts the third stationary contact 173. The first contact portion 265A, provided at one end of the movable contact member 265 (the end on the negative X-axis side), contacts the first stationary contact 171 in the first conduction state or contacts the second stationary contact 172 in the second conduction state. For example, the movable contact member 265 is formed by machining a thin metal plate. The first contact portion 265A has a shape that holds the first stationary contact 171 and the second stationary contact 172 from both left and right sides. The first contact portion 265A also has a shape that is elastically deformable in the leftward-rightward direction. Thereby, the first contact portion 265A can reliably hold the first stationary contact 171 and the second stationary contact 172 from both left and right sides. Thus, it is possible to suppress degradation in contact with the first stationary contact 171 and the second stationary contact 172.

(Outline of Movements of the Movable Unit 260)

Hereinafter, an outline of the movements of the movable unit 260 will be described with reference to FIGS. 33, 36, and 37.

Figure 36:
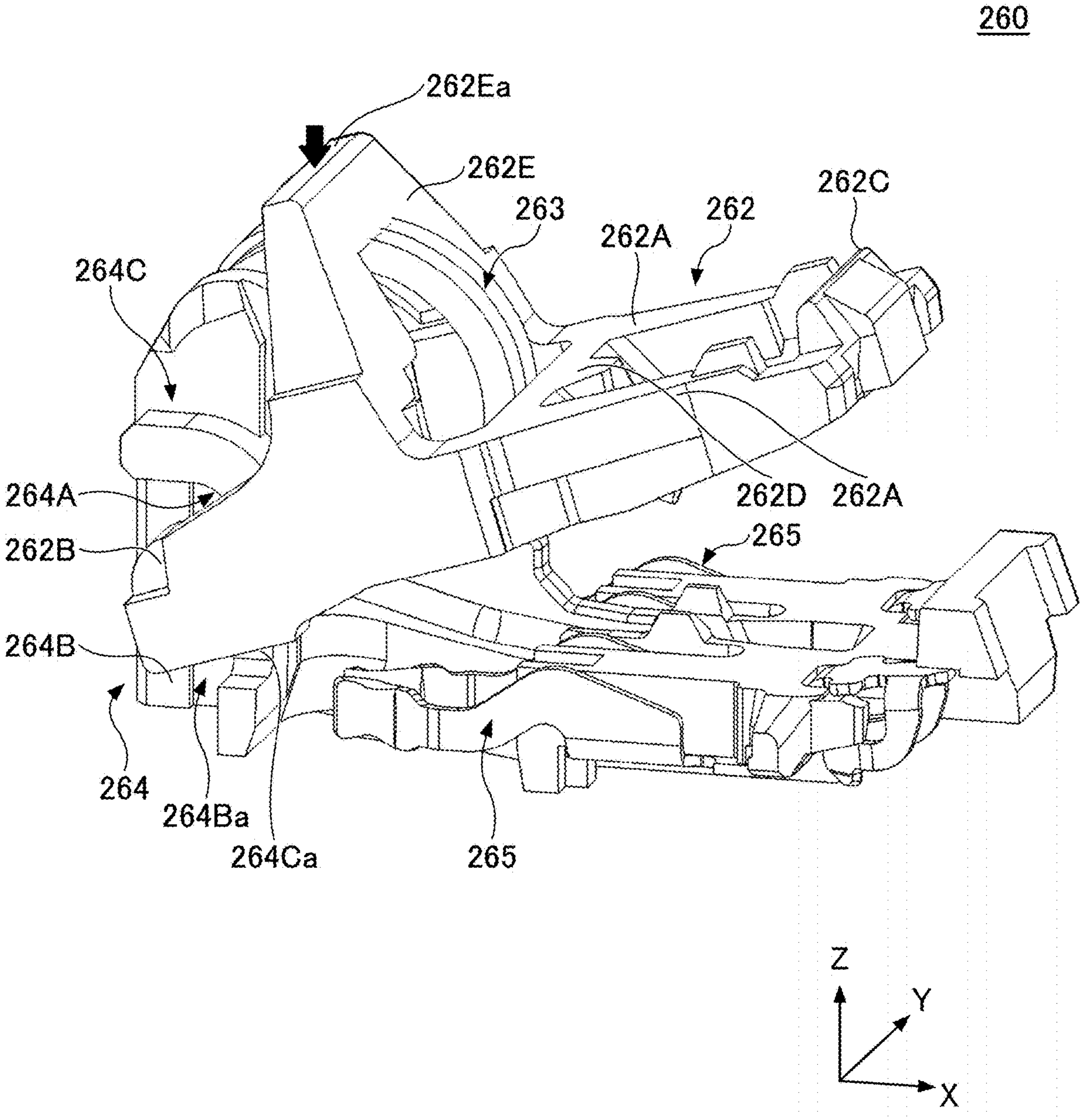
FIG. 36 is a perspective view of an outer appearance of the movable unit according to the modified example (in a state in which the cam is locked)

FIG. 36 is a perspective view of the outer appearance of the movable unit 260 according to the modified example (in a state in which the cam 262 is locked). FIG. 37 is a cross-sectional view of the movable unit 260 according to the modified example (in a state in which the cam 262 is locked).

As illustrated in FIG. 33, when the pressing portion 262E of the cam 262 is not depressed downward (negative Z-axis direction), the cam 262 of the movable unit 260 is in a state of being maximally opened upward (positive Z-axis direction) by the action of a biasing force applied from the torsion spring 263.

The movable unit 260 as illustrated in FIG. 33 is in a state of normal use. That is, the rotational movement pivotal portion 262B of the cam 262 is locked to the pivotal support 264A (see FIGS. 36 and 37) of the second actuator 264, and the cam 262 is rotationally movable in the upward-downward direction with the center being the pivotal support 264A of the second actuator 264.

Figure 37:
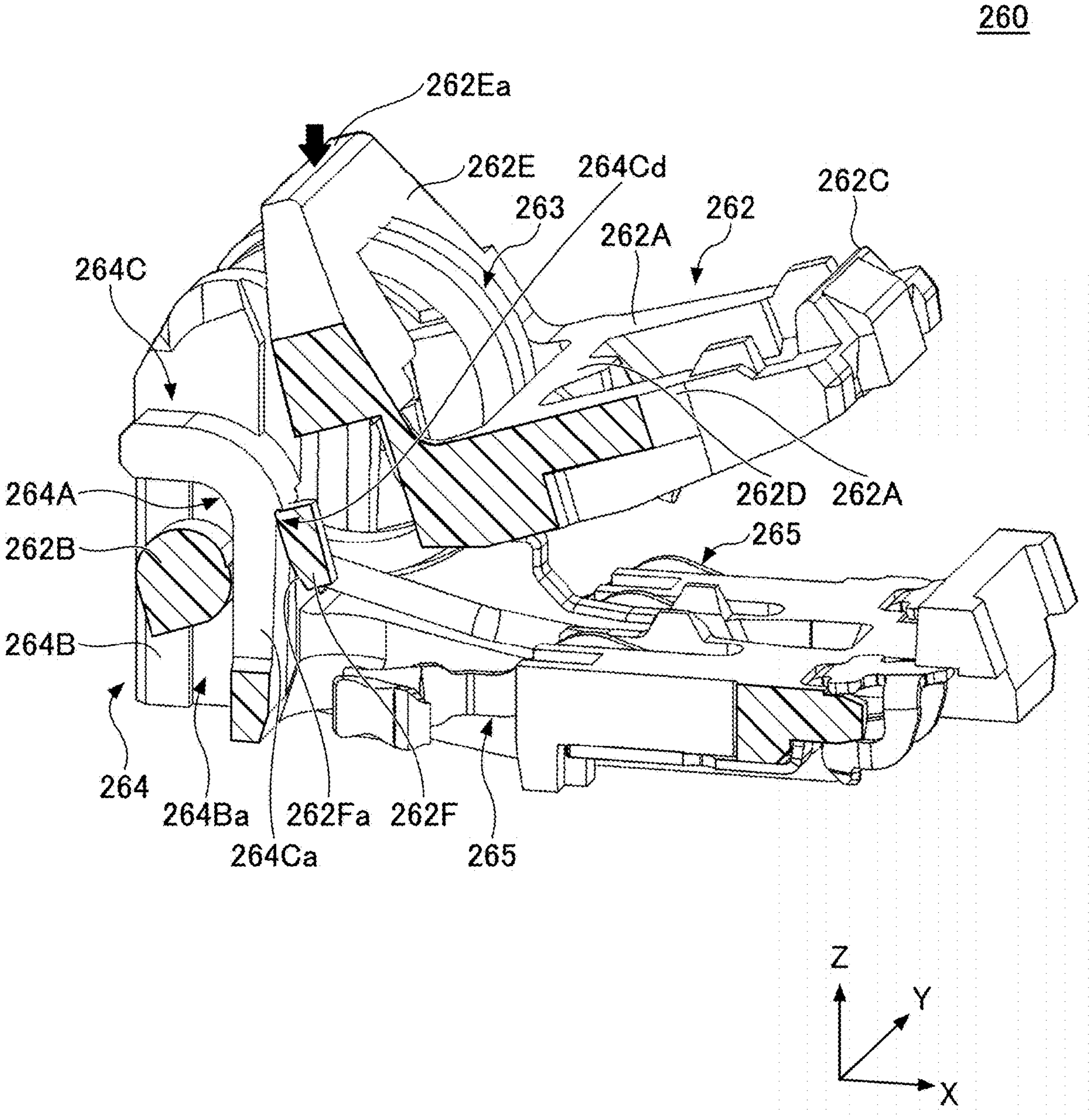
FIG. 37 is a cross-sectional view of the movable unit according to the modified example (in a state in which the cam is locked)

Meanwhile, as illustrated in FIGS. 36 and 37, when the pressing surface 262Ea of the pressing portion 262E of the cam 262 is depressed downward (negative Z-axis direction), the cam 262 of the movable unit 260 is slightly rotationally moved downward (negative Z-axis direction), and the rotational movement pivotal portion 262B of the cam 262 slides over the sliding region 264B of the side wall surface of the second actuator 264 downward (negative Z-axis direction) along the vertical portion 264Ca of the support wall 264C of the second actuator 264. Thereby, the cam 262 is entirely depressed.

When the cam 262 is entirely depressed by a predetermined amount or more, the vertical portion 264Ca of the support wall 264C of the second actuator 264 is held between the rotational movement pivotal portion 262B of the cam 262 and the projecting portion 262F of the cam 262 by the action of the biasing force applied from the torsion spring 263, as illustrated in FIG. 37. Thereby, as illustrated in FIGS. 36 and 37, the cam 262 is slightly rotationally moved downward (negative Z-axis direction) and locked to the second actuator 264 with the base end portion being depressed. At this time, an upward (positive Z-axis direction) slide of the rotational movement pivotal portion 262B is restricted by friction between the rotational movement pivotal portion 262B and the support wall 264C and by friction between the projecting portion 262F and the support wall 264C.

Further, as illustrated in FIG. 37, according to the cam 262, the projecting portion 262F of the cam 262 is stopped by the step 264Cd of the support wall 264C of the second actuator 264, and thus the lock of the cam 262 becomes more reliable.

The movable unit 260 as illustrated in FIGS. 36 and 37 is in an embedded state in the casing 110. In this state, the movable unit 260 is locked such that the cam 262 is depressed downward (negative Z-axis direction) and is slightly rotationally moved downward (negative Z-axis direction). Thereby, when the movable unit 260 is embedded in the casing 110, the cam projection 262C of the cam 262 can be readily disposed below the pressing surface 130A of the slider 130 (i.e., a position at which the cam projection 262C can be engaged with the pressing surface 130A).

Further, the movable unit 260 can release the lock of the cam 262 by the cam projection 262C of the cam 262 being depressed in response to the slider 130 being depressed. Thereby, after the movable unit 260 is embedded in the casing 110, the cam 262 can be readily returned to the state of normal use as illustrated in FIG. 33.

(Procedure of Production Method for the Switchover Switch 100)

Figure 38A:
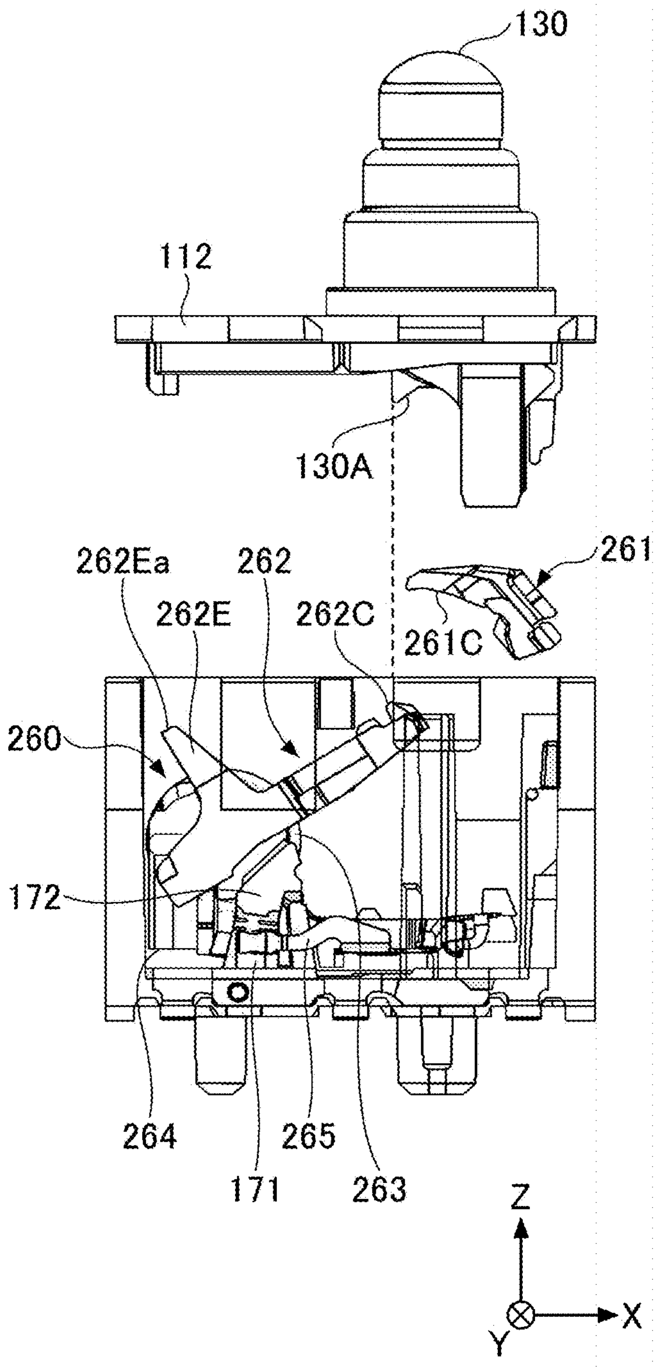
FIG. 38A is a view describing a procedure of a production method for a switchover switch according to the modified example.
Figure 38B:
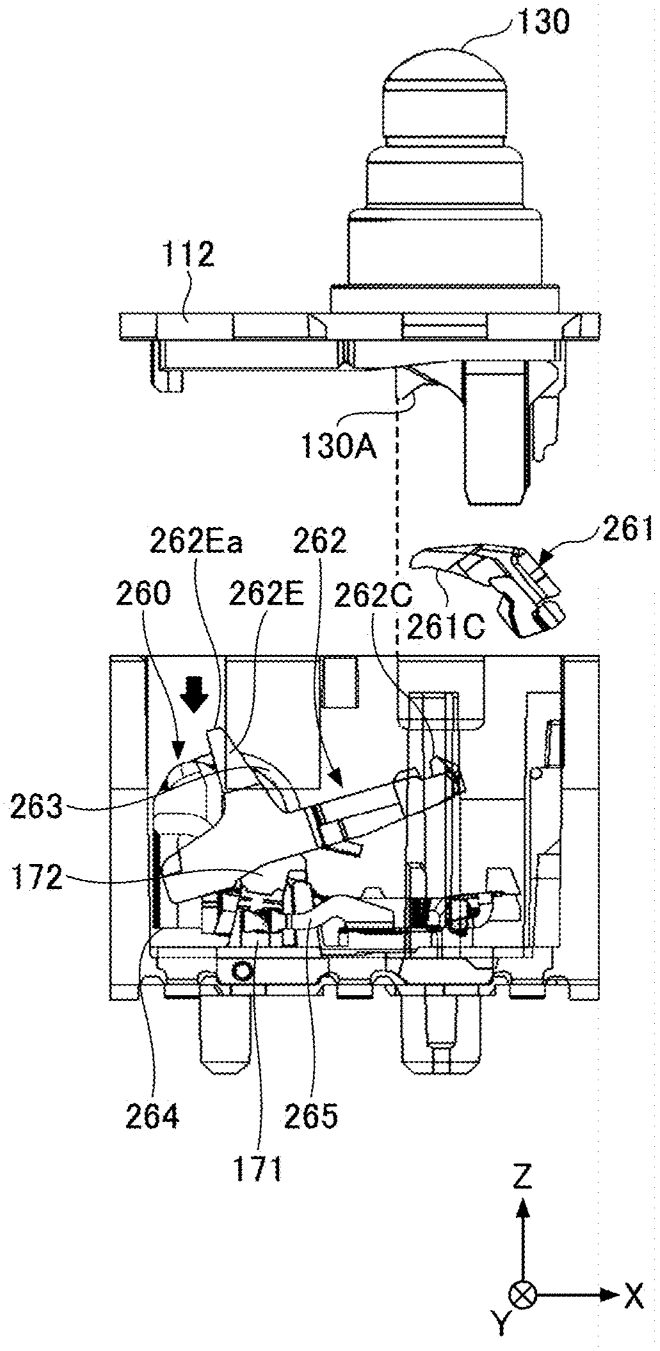
FIG. 38B is a view describing a procedure of the production method for the switchover switch according to the modified example.
Figure 38C:
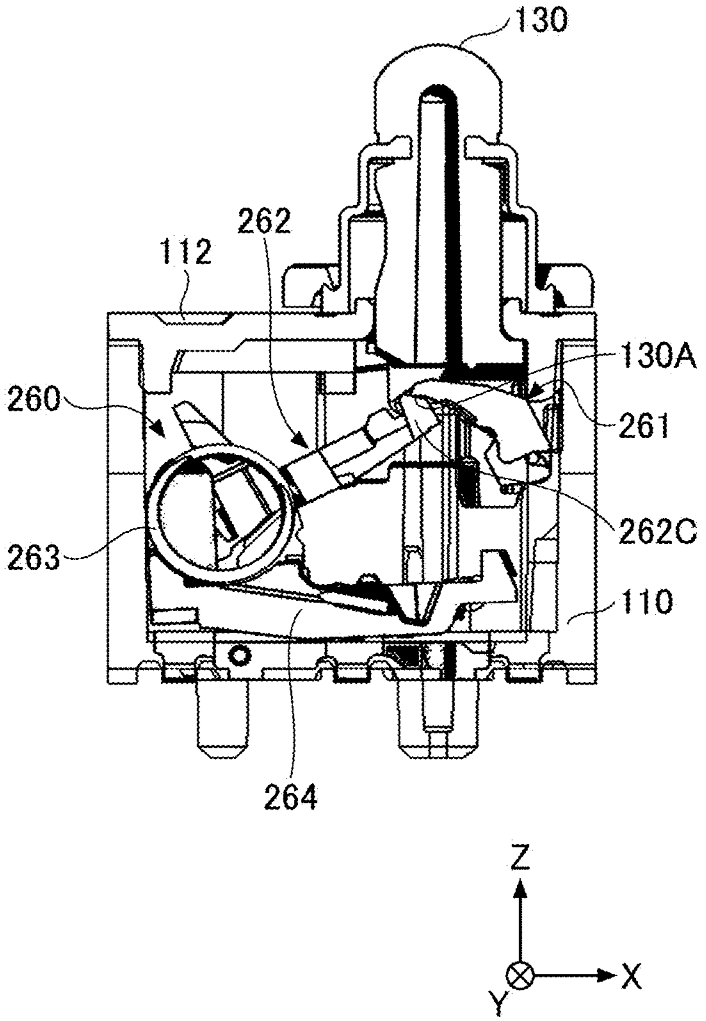
FIG. 38C is a view describing a procedure of the production method for the switchover switch according to the modified example.

FIGS. 38A to 38C are views describing a procedure of a production method for the switchover switch 100 according to the modified example.

As illustrated in FIG. 38A, the movable unit 260 is embedded in the casing 110. At this time, as illustrated in FIG. 38A, when the cam 262 of the movable unit 260 is in a fully opened state, the cam projection 262C of the cam 262 is positioned on the rear side (negative X-axis side) of the pressing surface 130A of the slider 130. Therefore, when the first actuator 261, the slider 130, and the cover 112 are embedded in the casing 110, the cam projection 262C of the cam 262 cannot be disposed at a position at which the cam projection 262C can be engaged with the pressing surface 130A of the slider 130.

Therefore, as illustrated in FIG. 38B, by pressing the pressing surface 262Ea of the pressing portion 262E of the cam 262 downward (negative Z-axis direction), the cam 262 is depressed downward (negative Z-axis direction) and slightly rotationally moved downward (negative Z-axis direction), and is locked in this state (a locking step). Thereby, the cam projection 262C of the cam 262 is positioned forward (positive X-axis side) of the pressing surface 130A of the slider 130. By this, when the first actuator 261, the slider 130, and the cover 112 are embedded in the casing 110 (a movable unit embedding step), the cam projection 262C of the cam 262 can be disposed at a position at which the cam projection 262C of the cam 262 can be engaged with the pressing surface 130A of the slider 130.

Further, by depressing the cam projection 262C of the cam 262 by depressing the slider 130, the lock of the cam 262 can be released (a lock releasing step). Thereby, as illustrated in FIG. 38C, the movable unit 260 can be readily returned to the state of normal use, i.e., the cam projection 262C of the cam 262 can be engaged with the pressing surface 130A of the slider 130.

At the time of normal use, the movements of the movable unit 260 are similar to those of the movable unit 160. That is, when the cam 262 is rotationally moved downward in response to the slider 130 being depressed, the second actuator 264 performs a snap-action movement by the action of the biasing force applied from the torsion spring 263, and the contact target of the movable contact member 265 can be switched from the first stationary contact 171 to the second stationary contact 172.

(Details of the Movements of the Movable Unit 260)

FIGS. 39 to 44 are schematic views describing details of movements of the movable unit 260 according to the modified example.

Figure 39:
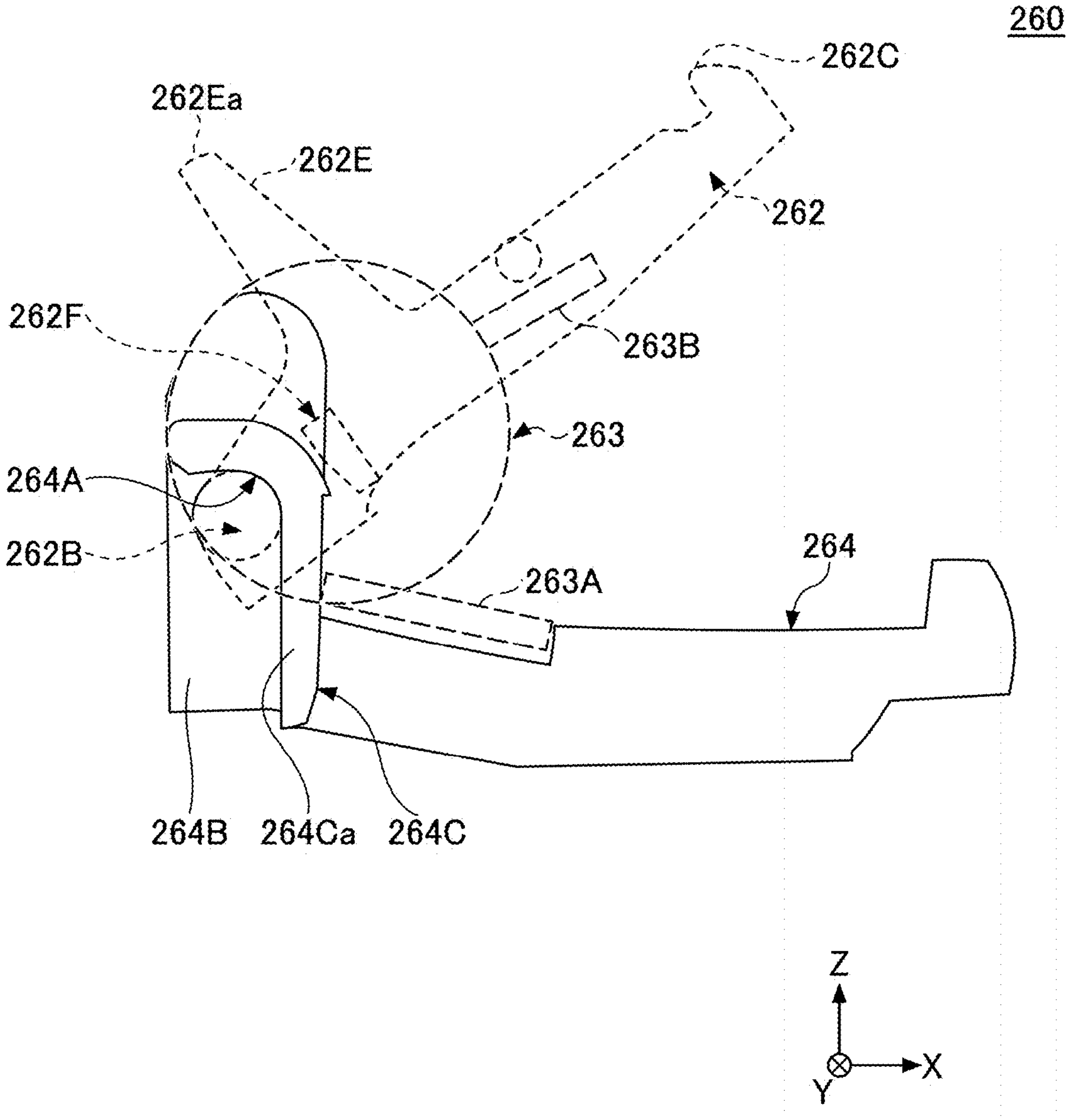
FIG. 39 is a schematic view describing details of movements of the movable unit according to the modified example.

FIG. 39 illustrates a state in which the cam 262 of the movable unit 260 is in a fully opened position. The cam 262 of the movable unit 260 is biased in an opening rotational movement direction by the action of the biasing force applied from the arm 263B of the torsion spring 263. Thereby, as illustrated in FIG. 39, when the pressing portion 262E of the cam 262 is not depressed downward (negative Z-axis direction), the movable unit 260 is in a state in which the cam 262 is maximally opened upward (positive Z-axis direction) by the action of the biasing force applied from the arm 263B of the torsion spring 263. The movable unit 260 as illustrated in FIG. 33 is in a state of normal use. That is, the rotational movement pivotal portion 262B of the cam 262 is locked to the pivotal support 264A of the second actuator 264 by the action of the biasing force applied from the torsion spring 263, and the cam 262 is rotationally movable in the upward-downward direction with the center being the rotational movement pivotal portion 262B locked to the pivotal support 264A of the second actuator 264.

The cam 262 of the movable unit 260 is provided with the pressing portion 262E at a position between the rear end portion and the middle portion in the forward-rearward direction (X-axis direction) such that the pressing portion 262E projects upward (positive Z-axis direction).

Figure 40:
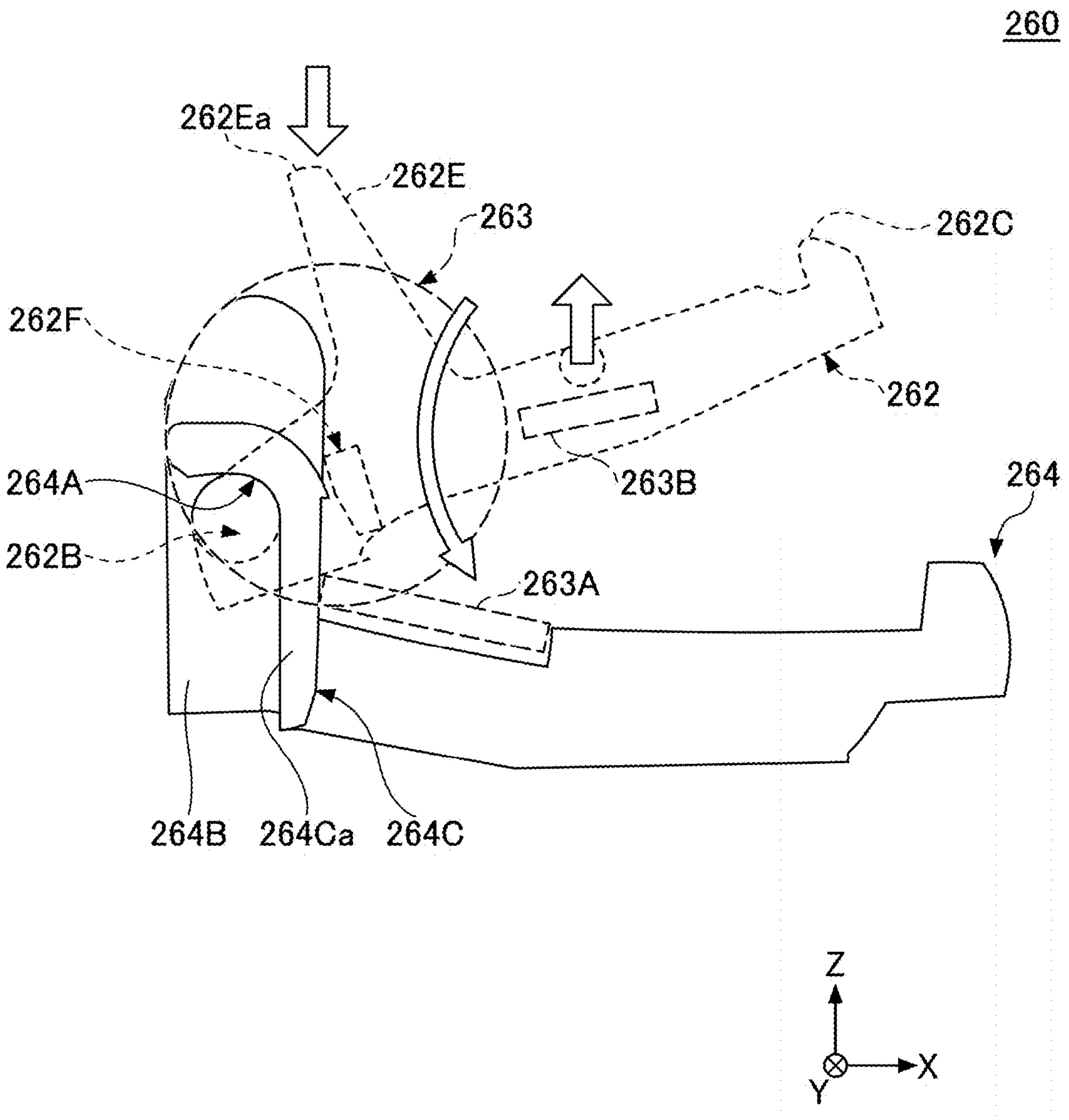
FIG. 40 is a schematic view describing the details of the movements of the movable unit according to the modified example.
Figure 41:
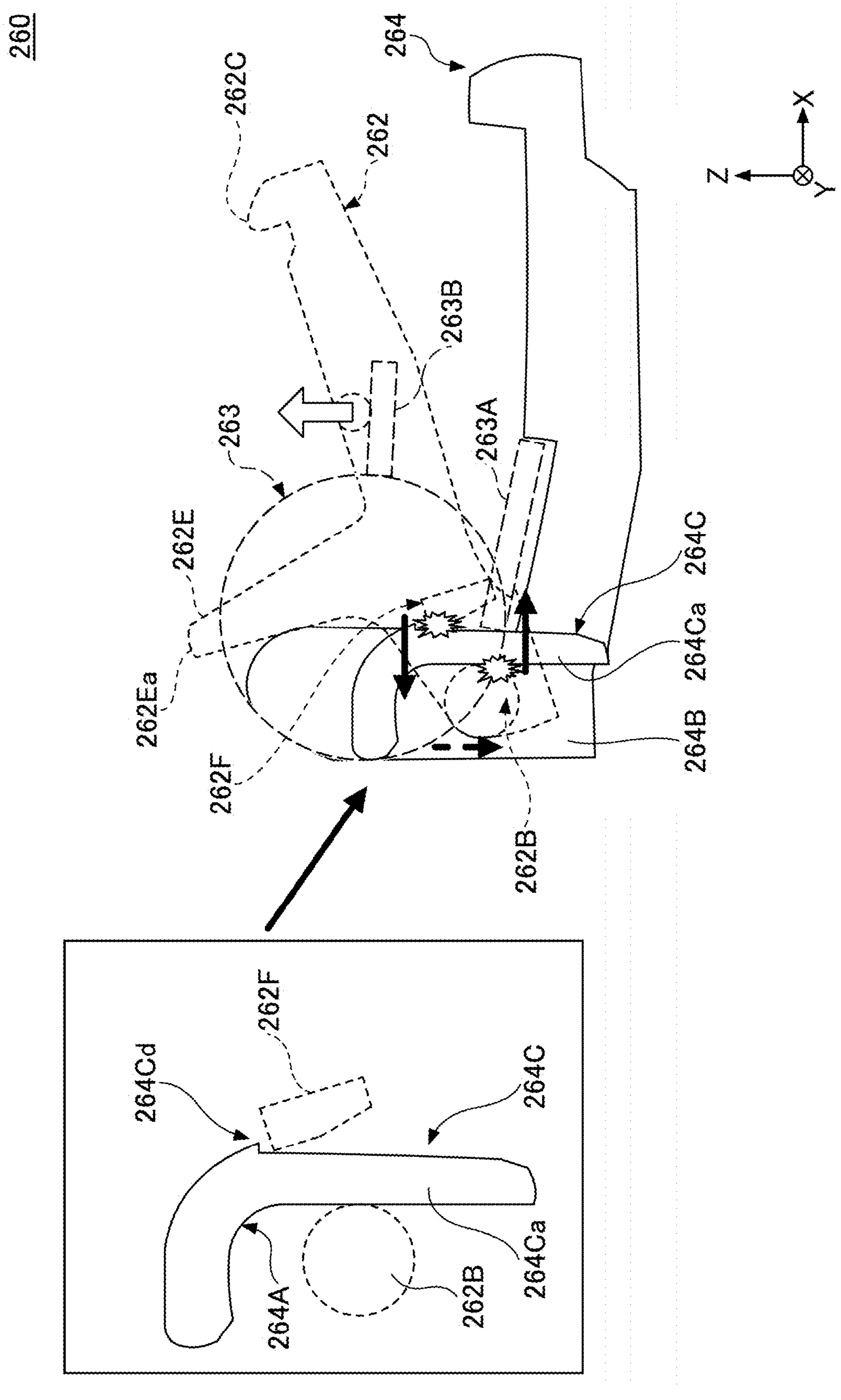
FIG. 41 is a schematic view describing the details of the movements of the movable unit according to the modified example.

As illustrated in FIG. 40, when the pressing portion 262E of the cam 262 is depressed downward (negative Z-axis direction), the movable unit 260 is slightly rotationally moved downward (negative Z-axis direction) against the biasing force applied from the torsion spring 263, with the center being the rotational movement pivotal portion 262B of the cam 262. When the pressing portion 262E of the cam 262 is further depressed downward (negative Z-axis direction) as illustrated in FIG. 41, the rotational movement pivotal portion 262B of the cam 262 slides over the sliding region 264B of the side wall surface of the second actuator 264 downward (negative Z-axis direction) along the vertical portion 264Ca of the support wall 264C of the second actuator 264. Thereby, the cam 262 is entirely depressed.

Further, as illustrated in FIG. 41, when the cam 262 is entirely depressed by a predetermined amount or more, the biasing force applied from the torsion spring 263 biases the cam 262 to open around the rotational movement pivotal portion 262B of the depressed cam 262. Thus, the vertical portion 264Ca of the support wall 264C of the second actuator 264 is held between the rotational movement pivotal portion 262B of the cam 262 being biased forward (positive X-axis direction) and the projecting portion 262F of the cam 262 being biased rearward (negative X-axis direction). Thereby, as illustrated in FIG. 41, in a state in which the cam 262 is entirely depressed, the cam 262 is slightly rotationally moved counterclockwise with the center being the rotational movement pivotal portion 262B, and is locked to the support wall 264C of the second actuator 264. At this time, the upward (positive Z-axis direction) slide of the rotational movement pivotal portion 262B is restricted by friction between the rotational movement pivotal portion 262B and the support wall 264C and by friction between the projecting portion 262F and the support wall 264C.

In addition, as illustrated in FIG. 41, the projecting portion 262F of the cam 262 is stopped by the step 264Cd of the support wall 264C of the second actuator 264, and the lock of the cam 262 becomes more reliable.

Figure 42:
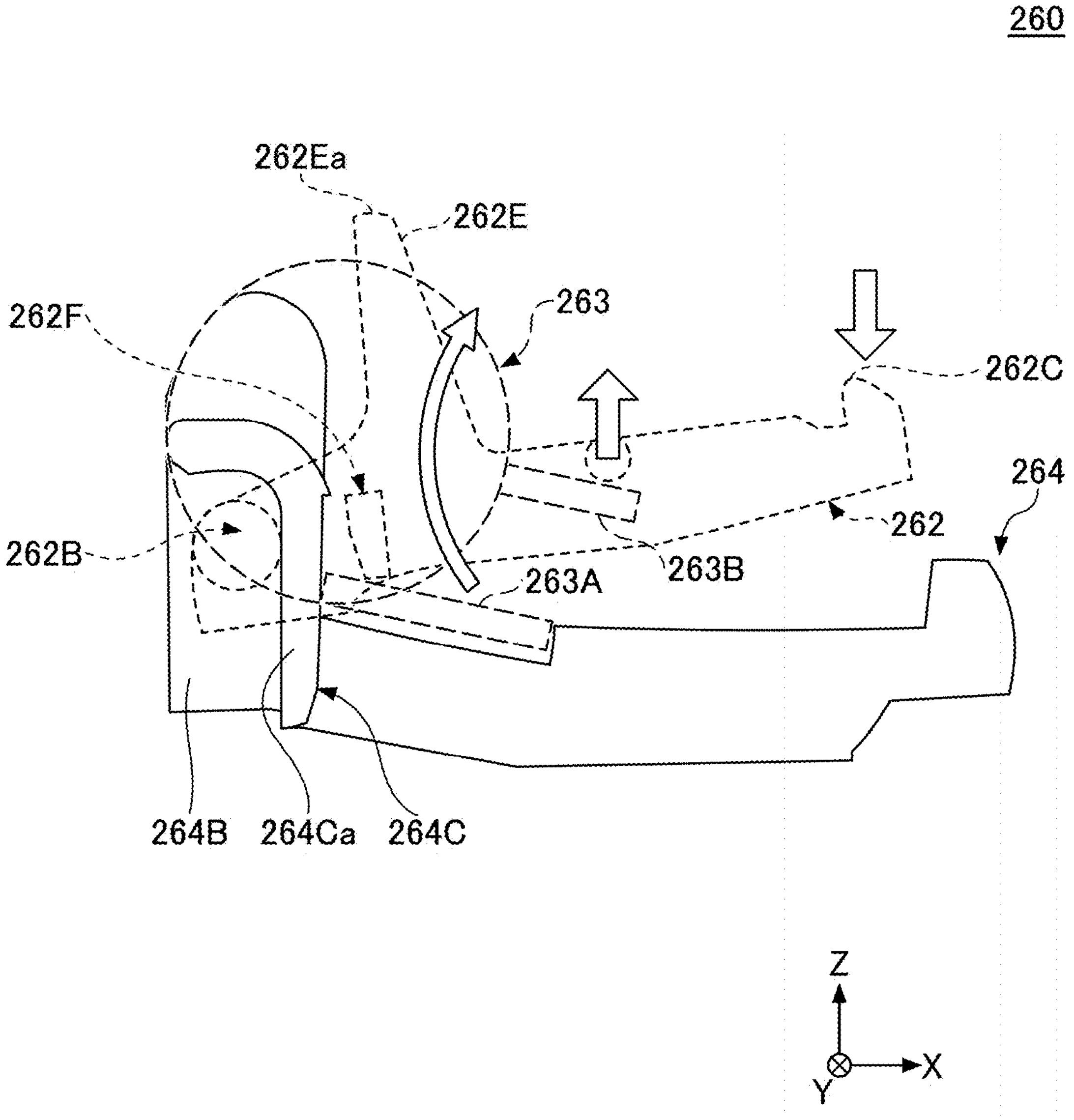
FIG. 42 is a schematic view describing the details of the movements of the movable unit according to the modified example.

Then, as illustrated in FIG. 42, by depressing the cam projection 262C of the cam 262 in the state in which the cam 262 is locked, the movable unit 260 causes the rotational movement pivotal portion 262B of the cam 262 to slide over the sliding region 264B of the second actuator 264 upward (positive Z-axis direction) by the action of the biasing force applied from the torsion spring 263. As a result, the support wall 264C is no longer held between the rotational movement pivotal portion 262B of the cam 262 and the projecting portion 262F of the cam 262, and the projecting portion 262F of the cam 262 is no longer stopped at the step 264Cd. Thereby, the lock of the cam 262 can be released.

Figure 43:
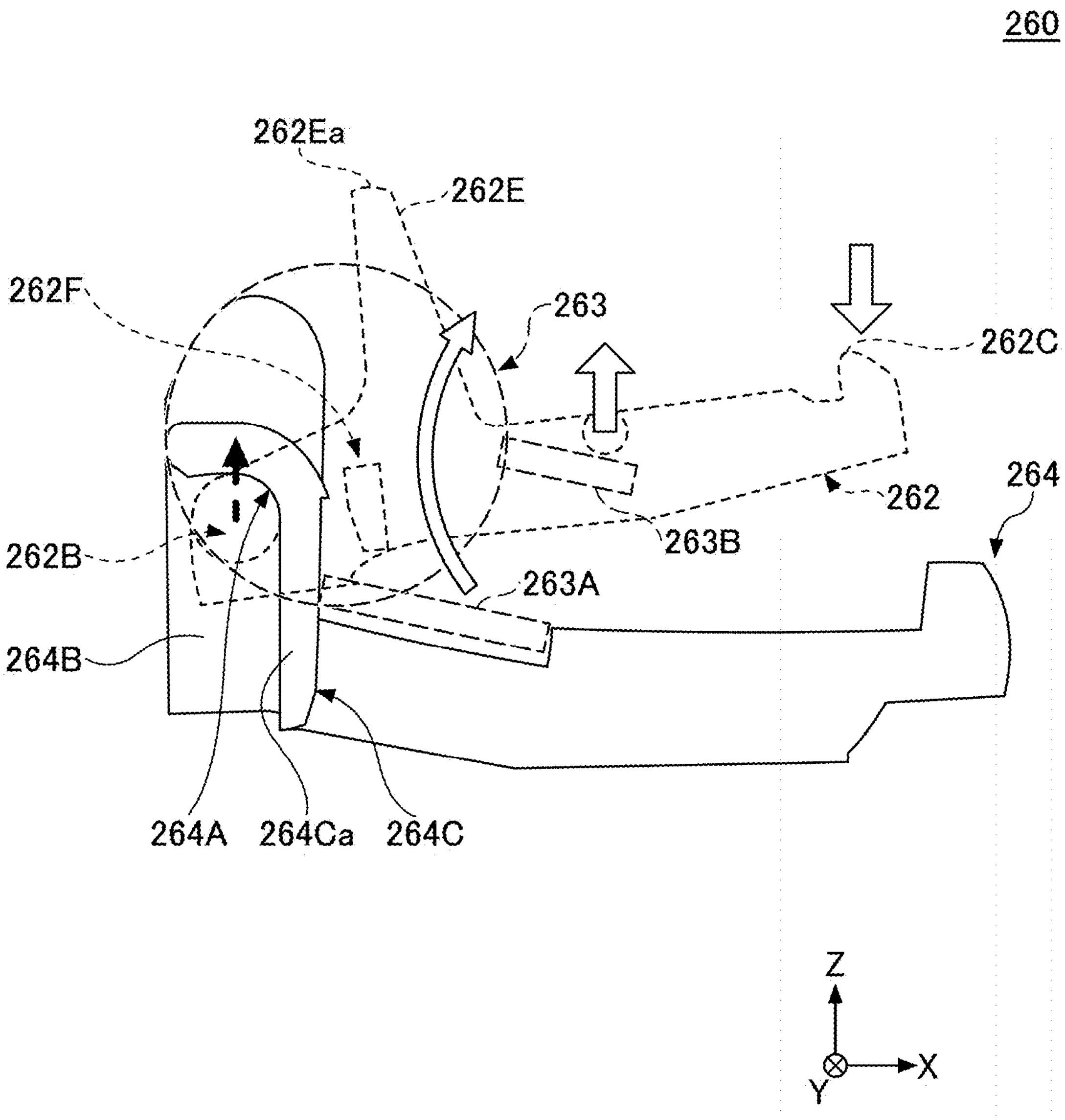
FIG. 43 is a schematic view describing the details of the movements of the movable unit according to the modified example.

As illustrated in FIG. 43, when the rotational movement pivotal portion 262B of the cam 262 contacts the curved portion 264Cb of the support wall 264C of the second actuator 264, the upward (positive Z-axis direction) slide of the rotational movement pivotal portion 262B of the cam 262 is restricted, and the rotational movement pivotal portion 262B of the cam 262 is locked to the pivotal support 264A of the second actuator 264 by the action of the biasing force applied from the torsion spring 263.

Figure 44:
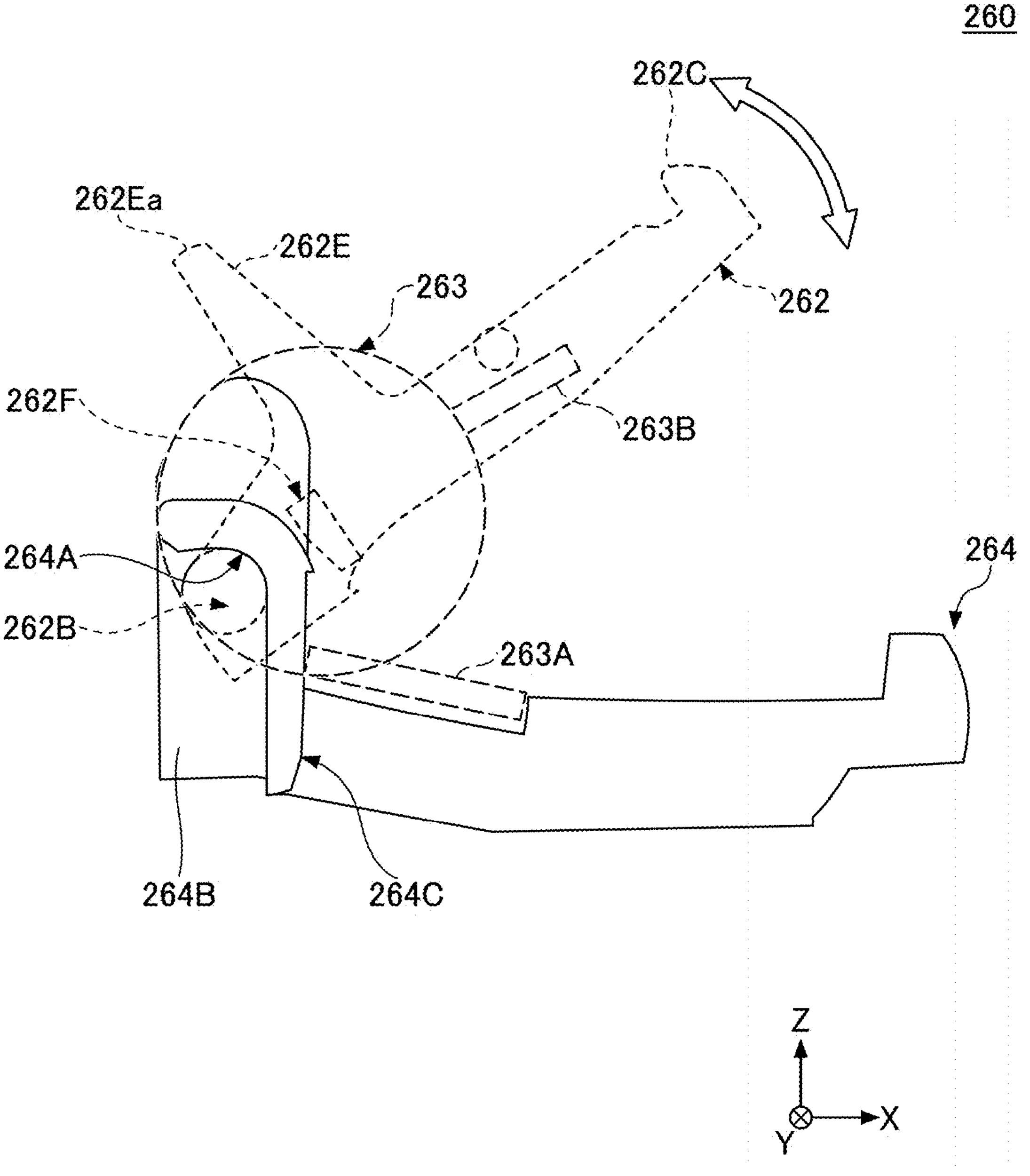
FIG. 44 is a schematic view describing the details of the movements of the movable unit according to the modified example.

Thus, as illustrated in FIG. 44, the movable unit 260 returns to the state of normal use, and the cam 262 becomes rotationally moveable in the upward-downward direction with the center being the rotational movement pivotal portion 262B locked to the pivotal support 264A of the second actuator 264.

As described above, the movable unit 260 according to the modified example is the movable unit 260 to be provided in the interior of the switchover switch 100 that includes the casing 110 and the slider 130 configured to slide in the upward-downward direction in response to the slider 130 being depressed. The movable unit 260 includes: the cam 262 configured to be rotationally moved downward by the tip end portion of the cam 262 being depressed in response to the slider 130 being depressed; the second actuator 264 configured to retain the movable contact member 265 and support the rotational movement pivotal portion 262B of the base end portion of the cam 262 so as to be movable rotationally and slidable in the upward-downward direction; and the torsion spring 263 interposed between the cam 262 and the second actuator 264 and configured to bias the cam 262 upward. The second actuator 264 performs the snap-action movement by the action of the biasing force applied from the torsion spring 263 upon the cam 262 rotationally moving downward, thereby performing switching of the contact target of the movable contact member 265 from the first stationary contact 171 to the second stationary contact 172. By the base end portion being depressed in the state in which the cam 262 is opened upward upon embedment in the casing 110, the cam 262 is locked in the state in which the cam 262 is rotationally moved downward and the rotational movement pivotal portion 262B slides downward.

Thereby, when the movable unit 260 according to the modified example is embedded in the casing 110, the tip end portion of the cam 262 can be disposed at a position that can be engaged with the pressing surface 130A of the slider 130. Therefore, according to the movable unit 260 according to the modified example, it is possible to provide a snap-action type switchover switch that is compact and is able to be readily assembled.

Especially, the movable unit 260 according to the modified example can lock the cam 262 by utilizing the biasing force of the torsion spring 263. Thus, it is possible to suppress an increase in the number of parts involved with the lock of the cam 262.

The movable unit 260 according to the modified example is not locked to the second actuator 264 unless the pressing portion 262E of the cam 262 is pressed. The reason for this is as follows. Specifically, according to the movable unit 260 according to the modified example, at the time of normal use, the cam 262 just rotationally moves with the center being the rotational movement pivotal portion 262B. At that time, the support wall 264C of the second actuator 264 does not overlap a rotational movement trajectory of the projecting portion 262F of the cam 262 (the projecting portion 262F rotationally moves externally of the curved portion 264Cb of the support wall 264C).

Also, the movable unit 260 according to the modified example is housed in the interior of the casing 110. Thus, at the time of normal use, the pressing portion 262E of the cam 262 is not pressed mistakenly. Therefore, according to the movable unit 260 according to the modified example, the cam 262 is not mistakenly locked to the second actuator 264 at the time of normal use.

Also, according to the movable unit 260 according to the modified example, at the time of normal use, the rotational movement pivotal portion 262B of the cam 262 is maintained to contact the curved portion 264Cb of the support wall 264C by the action of the biasing force applied from the torsion spring 263. Therefore, the movable unit 260 according to the modified example has no risk that the rotational movement pivotal portion 262B of the cam 262 unintentionally slides downward of the curved portion 264Cb of the support wall 264C at the time of normal use.

In the modified example as described above, the cam is locked by both of: the holding of the support wall 264C between the rotational movement pivotal portion 262B and the projecting portion 262F; and the stopping of the projecting portion 262F at the step 264Cd. However, this is by no means a limitation. The cam 262 may be locked by either one thereof.

According to the embodiment, it is possible to provide a snap-action type switchover switch that is compact and is able to be readily assembled.

What is claimed is:

1. A movable unit to be provided in an interior of a switchover switch that includes a casing and a slider configured to slide in an upward-downward direction in response to the slider being depressed, the movable unit comprising:

a cam configured to be rotationally moved downward by a tip end portion of the cam being depressed in response to the slider being depressed;

a retaining member configured to retain a movable contact member and support a rotational movement pivotal portion of a base end portion of the cam so as to be movable rotationally and slidable in the upward-downward direction; and a biasing member interposed between the cam and the retaining member and configured to bias the cam upward, wherein the retaining member performs a snap-action movement by action of a biasing force applied from the biasing member upon the cam being rotationally moved downward, thereby performing switching of a contact target of the movable contact member from a first stationary contact to a second stationary contact, and by the base end portion being depressed in a state in which the cam is opened upward, the cam is locked in a state in which the cam is rotationally moved downward and the rotational movement pivotal portion slides downward.

2. The movable unit according to claim 1, wherein by the tip end portion being depressed in a state in which the cam is locked to the retaining member, the state in which the cam is locked to the retaining member is released.

3. The movable unit according to claim 1, wherein the cam includes a pressing portion that is provided at the base end portion so as to project upward, and is configured to be depressed.

4. A switchover switch, comprising:

the movable unit of claim 1;

the casing; and the slider.

5. A production method for the switchover switch of claim 4, the production method comprising:

depressing the base end portion in the state in which the cam of the movable unit is opened upward, thereby locking the cam in the state in which the cam is rotationally moved downward and the rotational movement pivotal portion slides downward; and embedding the movable unit in a state in which the cam is locked, in the interior of the casing.

6. The production method according to claim 5, further comprising:

depressing the tip end portion of the cam of the movable unit embedded in the interior of the casing by depressing the slider, thereby releasing the state in which the cam is locked.

7. The movable unit according to claim 1, wherein by the base end portion being depressed in the state in which the cam is opened upward, the cam is locked to the retaining member by the action of the biasing force applied from the biasing member in the state in which the cam is rotationally moved downward and the rotational movement pivotal portion slides downward.

8. The movable unit according to claim 7, wherein the cam includes
a projecting portion provided to be closer to the tip end portion than is the rotational movement pivotal portion,
the retaining member includes
a support wall disposed between the rotational movement pivotal portion and the projecting portion,
the cam is locked to the retaining member by the support wall of the retaining member being held between the rotational movement pivotal portion and the projecting portion.

9. The movable unit according to claim 8, wherein the projecting portion includes
a tapered surface that partially widens a gap with the rotational movement pivotal portion.

10. The movable unit according to claim 8, wherein
by the base end portion being depressed, the cam is provided with the biasing force that is applied from the biasing member and causes the cam to open upward, and
by the action of the provided biasing force, the rotational movement pivotal portion and the projecting portion hold the support wall of the retaining member therebetween, thereby locking the cam to the retaining member.

11. The movable unit according to claim 10, wherein the support wall of the retaining member includes
a curved portion configured to support the rotational movement pivotal portion so as to be rotationally movable, and
a vertical portion that extends from the curved portion downward, is configured to support the rotational movement pivotal portion so as to be slidable in the upward-downward direction, and is held between the rotational movement pivotal portion and the projecting portion.

12. The movable unit according to claim 10, wherein the support wall of the retaining member includes
a step configured to stop the projecting portion in a state of holding the support wall of the retaining member.

13. The movable unit according to claim 11, wherein the support wall of the retaining member includes
a step configured to stop the projecting portion in a state of holding the support wall of the retaining member.

* * * * *